United States Patent
Morris

(10) Patent No.: US 10,708,168 B1
(45) Date of Patent: Jul. 7, 2020

(54) ROUTING METHODS, SYSTEMS, AND COMPUTER PROGRAM PRODUCTS

(71) Applicant: SITTING MAN, LLC, Madison, GA (US)

(72) Inventor: Robert Paul Morris, Madison, GA (US)

(73) Assignee: SITTING MAN, LLC, Madison, GA (US)

( * ) Notice: Subject to any disclaimer, the term of this patent is extended or adjusted under 35 U.S.C. 154(b) by 0 days.

(21) Appl. No.: 16/826,159

(22) Filed: Mar. 20, 2020

Related U.S. Application Data

(63) Continuation of application No. 16/454,043, filed on Jun. 26, 2019, now Pat. No. 10,652,134, which is a continuation of application No. 16/195,827, filed on Nov. 19, 2018, now Pat. No. 10,447,575, which is a continuation of application No. 16/181,286, filed on Nov. 5, 2018, which is a continuation of application (Continued)

(51) Int. Cl.
| | |
|---|---|
| *H04L 12/66* | (2006.01) |
| *H04L 12/715* | (2013.01) |
| *H04L 12/723* | (2013.01) |
| *H04L 12/707* | (2013.01) |
| *H04L 12/751* | (2013.01) |
| *H04L 12/721* | (2013.01) |
| *H04L 12/741* | (2013.01) |

(52) U.S. Cl.
CPC ............. *H04L 45/04* (2013.01); *H04L 12/66* (2013.01); *H04L 45/02* (2013.01); *H04L 45/24* (2013.01); *H04L 45/50* (2013.01); *H04L 45/566* (2013.01); *H04L 45/745* (2013.01)

(58) Field of Classification Search
CPC ....... H04L 45/04; H04L 45/745; H04L 45/24; H04L 45/50; H04L 45/566; H04L 12/66; H04L 45/02
See application file for complete search history.

(56) References Cited

U.S. PATENT DOCUMENTS

| | | | |
|---|---|---|---|
| 5,195,181 | A | 3/1993 | Bryant et al. |
| 5,353,283 | A | 10/1994 | Tsuchiya |

(Continued)

FOREIGN PATENT DOCUMENTS

| | | |
|---|---|---|
| CN | 101247253 A | 8/2008 |
| CN | 101399688 A | 4/2009 |

(Continued)

OTHER PUBLICATIONS

Rekhter, et. al, "Application of the Border Gateway Protocol in the Internet", RFC 1268, pp. 1-13, Internet Engineering Task Force, http://tools.ietf.org/rfc/rfc1268.txt, Oct. 1991.

(Continued)

*Primary Examiner* — Mohamed A Kamara
(74) *Attorney, Agent, or Firm* — Patrick E. Caldwell, Esq.; The Caldwell Firm, LLC

(57) ABSTRACT

In various embodiments, a system and method are provided for generating segment routing (SR) segment lists. In one embodiment, a node receives information that identifies a path from a first node to a second node. Based on the received path, a set of segment identifiers that encodes the path is generated. A packet that is forwarded along the set of segment identifiers travels the received path.

26 Claims, 21 Drawing Sheets

Related U.S. Application Data

No. 14/274,632, filed on May 9, 2014, which is a continuation-in-part of application No. 13/727,647, filed on Dec. 27, 2012, now abandoned, and a continuation-in-part of application No. 13/727,649, filed on Dec. 27, 2012, now abandoned, and a continuation-in-part of application No. 13/727,651, filed on Dec. 27, 2012, now abandoned, and a continuation-in-part of application No. 13/727,652, filed on Dec. 27, 2012, now abandoned, and a continuation-in-part of application No. 13/727,653, filed on Dec. 27, 2012, now abandoned, and a continuation-in-part of application No. 13/727,655, filed on Dec. 27, 2012, now abandoned, and a continuation-in-part of application No. 13/727,657, filed on Dec. 27, 2012, now abandoned, and a continuation-in-part of application No. 13/727,662, filed on Dec. 27, 2012, now abandoned.

(60) Provisional application No. 61/897,234, filed on Oct. 30, 2013, provisional application No. 61/833,565, filed on Jun. 11, 2013, provisional application No. 61/831,932, filed on Jun. 6, 2013, provisional application No. 61/830,064, filed on Jun. 1, 2013, provisional application No. 61/822,978, filed on May 14, 2013, provisional application No. 61/822,386, filed on May 12, 2013.

(56) References Cited

U.S. PATENT DOCUMENTS

| | | | |
|---|---|---|---|
| 5,426,639 | A | 6/1995 | Follett et al. |
| 5,452,293 | A | 9/1995 | Wilkinson et al. |
| 5,504,747 | A | 4/1996 | Sweazey |
| 5,649,108 | A | 7/1997 | Spiegel et al. |
| 5,764,624 | A | 6/1998 | Endo et al. |
| 5,845,086 | A | 12/1998 | Doebrich et al. |
| 5,968,124 | A | 10/1999 | Takahashi et al. |
| 6,032,197 | A | 2/2000 | Birdwell et al. |
| 6,205,429 | B1 | 3/2001 | Peng |
| 6,374,303 | B1 | 4/2002 | Armitage et al. |
| 6,574,195 | B2 | 6/2003 | Roberts |
| 6,577,600 | B1 | 6/2003 | Bare |
| 6,631,484 | B1 | 10/2003 | Born |
| 6,647,428 | B1 | 11/2003 | Bannai et al. |
| 6,650,640 | B1 | 11/2003 | Muller et al. |
| 6,675,218 | B1 | 1/2004 | Mahler et al. |
| 6,728,220 | B2 | 4/2004 | Behzadi |
| 6,816,460 | B1 | 11/2004 | Ahmed et al. |
| 6,963,570 | B1 | 11/2005 | Agarwal |
| 6,990,108 | B2 | 1/2006 | Karlsson et al. |
| 6,996,126 | B2 | 2/2006 | Deml et al. |
| 7,012,919 | B1 | 3/2006 | So et al. |
| 7,023,846 | B1 | 4/2006 | Andersson et al. |
| 7,031,253 | B1 | 4/2006 | Katukam et al. |
| 7,031,607 | B1 | 4/2006 | Smith |
| 7,047,114 | B1 | 5/2006 | Rogers |
| 7,061,921 | B1 | 6/2006 | Sheth |
| 7,065,040 | B2 | 6/2006 | Nagamine |
| 7,068,654 | B1 | 6/2006 | Joseph et al. |
| 7,072,346 | B2 | 7/2006 | Hama |
| 7,082,140 | B1 | 7/2006 | Hass |
| 7,088,721 | B1 | 8/2006 | Droz et al. |
| 7,154,416 | B1 | 12/2006 | Savage |
| 7,174,387 | B1 | 2/2007 | Shand et al. |
| 7,174,390 | B2 | 2/2007 | Schulter et al. |
| 7,177,311 | B1 | 2/2007 | Hussain et al. |
| 7,180,887 | B1 | 2/2007 | Schwaderer et al. |
| 7,181,742 | B2 | 2/2007 | Hooper |
| 7,254,138 | B2 | 8/2007 | Sandstrom |
| 7,260,097 | B2 | 8/2007 | Casey |
| 7,269,132 | B1 | 9/2007 | Casey et al. |
| 7,286,479 | B2 | 10/2007 | Bragg |
| 7,286,566 | B1 | 10/2007 | Parruck et al. |
| 7,315,541 | B1 | 1/2008 | Housel et al. |
| 7,330,440 | B1 | 2/2008 | Bryant et al. |
| 7,340,535 | B1 | 3/2008 | Alam |
| 7,359,377 | B1 | 4/2008 | Kompella et al. |
| 7,366,865 | B2 | 4/2008 | Lakshmanamurthy et al. |
| 7,373,401 | B1 | 5/2008 | Azad |
| 7,403,542 | B1 | 7/2008 | Thompson |
| 7,420,992 | B1 | 9/2008 | Fang et al. |
| 7,430,210 | B2 | 9/2008 | Havala et al. |
| 7,460,473 | B1 | 12/2008 | Kodama et al. |
| 7,462,639 | B2 | 12/2008 | Georges et al. |
| 7,463,639 | B1 | 12/2008 | Rekhter |
| 7,466,661 | B1 | 12/2008 | Previdi et al. |
| 7,471,669 | B1 | 12/2008 | Sabesan et al. |
| 7,529,224 | B2 | 5/2009 | Basso et al. |
| 7,551,632 | B2 | 6/2009 | Thubert et al. |
| 7,564,803 | B1 | 7/2009 | Minei et al. |
| 7,577,143 | B1 | 8/2009 | Kompella |
| 7,602,778 | B2 | 10/2009 | Guichard et al. |
| 7,610,330 | B1 | 10/2009 | Quinn et al. |
| 7,619,982 | B2 | 11/2009 | Blair et al. |
| 7,636,299 | B2 | 12/2009 | Asa et al. |
| 7,660,892 | B2 | 2/2010 | Choong et al. |
| 7,673,072 | B2 | 3/2010 | Boucher et al. |
| 7,675,861 | B2 | 3/2010 | Metzger et al. |
| 7,706,306 | B2 | 4/2010 | Bardalai et al. |
| 7,773,630 | B2 | 8/2010 | Huang et al. |
| 7,782,834 | B2 | 8/2010 | Chitrapu |
| 7,787,361 | B2 | 8/2010 | Rahman et al. |
| 7,813,356 | B2 | 10/2010 | Roberts |
| 7,817,667 | B2 | 10/2010 | Frederiksen et al. |
| 7,835,393 | B2 | 11/2010 | Ren et al. |
| 7,885,259 | B2 | 2/2011 | Filsfils |
| 7,885,294 | B2 | 2/2011 | Patel et al. |
| 7,894,352 | B2 | 2/2011 | Kompella et al. |
| 7,894,458 | B2 | 2/2011 | Jiang et al. |
| 7,933,272 | B2 | 4/2011 | Morris |
| 7,940,695 | B1 | 5/2011 | Bahadur et al. |
| 7,944,853 | B2 | 5/2011 | Eglin et al. |
| 7,970,931 | B2 | 6/2011 | Ventakaramaiah et al. |
| 7,983,174 | B1 | 7/2011 | Monaghan et al. |
| 8,000,267 | B2 | 8/2011 | Solis et al. |
| 8,004,967 | B2 | 8/2011 | Wang |
| 8,028,298 | B2 | 9/2011 | Moore |
| 8,064,441 | B2 | 11/2011 | Wijnands et al. |
| 8,065,439 | B1 | 11/2011 | Johnson et al. |
| 8,068,417 | B1 | 11/2011 | Roberts |
| 8,073,968 | B1 | 12/2011 | Shah et al. |
| 8,248,920 | B2 | 8/2012 | Tallet |
| 8,248,969 | B2 | 8/2012 | Yan |
| 8,254,272 | B1 | 8/2012 | Vasseur |
| 8,259,585 | B1 | 9/2012 | P et al. |
| 8,275,313 | B1 | 9/2012 | Myers et al. |
| 8,301,738 | B1 | 10/2012 | Alex |
| 8,310,957 | B1 | 11/2012 | Rekhter |
| 8,339,973 | B1 | 12/2012 | Pichumani et al. |
| 8,380,846 | B1 | 2/2013 | Abu-Ghazaleh et al. |
| 8,422,514 | B1 | 4/2013 | Kothari et al. |
| 8,456,987 | B1 | 6/2013 | Valluri et al. |
| 8,509,056 | B1 | 8/2013 | Arya et al. |
| 8,537,840 | B1 | 9/2013 | Raszuk et al. |
| 8,542,706 | B2 | 9/2013 | Wang et al. |
| 8,611,335 | B1 | 12/2013 | Wu et al. |
| 8,619,817 | B1 | 12/2013 | Everson et al. |
| 8,630,167 | B2 | 1/2014 | Smith |
| 8,631,483 | B2 | 1/2014 | Soni et al. |
| 8,675,488 | B1 | 3/2014 | Sidebottom et al. |
| 8,693,341 | B2 | 4/2014 | Rajamanickam et al. |
| 8,705,533 | B1 | 4/2014 | Venkatraman et al. |
| 8,711,883 | B2 | 4/2014 | Kang et al. |
| 8,724,627 | B2 | 5/2014 | Filsfils et al. |
| 8,743,679 | B2 | 6/2014 | Gerstel et al. |
| 8,751,686 | B2 | 6/2014 | Filsfils et al. |
| 8,762,532 | B2 | 6/2014 | Kohlenz et al. |
| 8,792,384 | B2 | 7/2014 | Banerjee et al. |
| 8,798,047 | B1 | 8/2014 | Wadekar et al. |
| 8,813,220 | B2 | 8/2014 | Knapp et al. |
| 8,825,900 | B1 | 9/2014 | Gross et al. |

(56) References Cited

U.S. PATENT DOCUMENTS

| | | |
|---|---|---|
| 8,831,025 B2 | 9/2014 | Finney et al. |
| 8,838,705 B2 | 9/2014 | Zwaal et al. |
| 8,867,363 B2 | 10/2014 | Mohapatra et al. |
| 8,873,409 B2 | 10/2014 | Filsfils et al. |
| 8,891,532 B1 | 11/2014 | Smith et al. |
| 8,892,772 B1 | 11/2014 | Filsfils et al. |
| 8,908,517 B2 | 12/2014 | Filsfils et al. |
| 8,913,613 B2 | 12/2014 | Srinivasan et al. |
| 8,948,179 B2 | 2/2015 | Zhao et al. |
| 8,953,590 B1 | 2/2015 | Aggarwal et al. |
| 8,982,710 B2 | 3/2015 | Meilik et al. |
| 9,014,049 B2 | 4/2015 | Filsfils et al. |
| 9,015,299 B1 | 4/2015 | Shah |
| 9,030,934 B2 | 5/2015 | Shah et al. |
| 9,036,463 B2 | 5/2015 | Bashandy et al. |
| 9,036,474 B2 | 5/2015 | Dibirdi et al. |
| 9,049,233 B2 | 6/2015 | Frost et al. |
| 9,065,750 B2 | 6/2015 | Vasseur et al. |
| 9,094,335 B2 | 7/2015 | Subramanian et al. |
| 9,112,734 B2 | 8/2015 | Edwards et al. |
| 9,118,572 B2 | 8/2015 | Sajassi et al. |
| 9,124,652 B1 | 9/2015 | Jain et al. |
| 9,143,395 B2 | 9/2015 | Bashandy et al. |
| 9,178,796 B2 | 11/2015 | Previdi et al. |
| 9,178,805 B2 | 11/2015 | Goel |
| 9,185,022 B2 | 11/2015 | Vasseur et al. |
| 9,197,508 B2 | 11/2015 | Vasseur et al. |
| 9,231,726 B2 | 1/2016 | Lee et al. |
| 9,253,041 B2 | 2/2016 | Previdi et al. |
| 9,258,174 B1 | 2/2016 | Gerstel et al. |
| 9,282,031 B2 | 3/2016 | Liu et al. |
| 9,300,584 B1 | 3/2016 | Filsfils et al. |
| 9,319,312 B2 | 4/2016 | Filsfils et al. |
| 9,369,371 B2 | 6/2016 | Filsfils et al. |
| 9,369,387 B2 | 6/2016 | Filsfils et al. |
| 9,391,704 B2 | 7/2016 | Gerstel et al. |
| 9,401,858 B2 | 7/2016 | Francois et al. |
| 9,444,677 B2 | 9/2016 | Kumar et al. |
| 9,462,043 B2 | 10/2016 | Frost et al. |
| 9,479,403 B2 | 10/2016 | Filsfils et al. |
| 9,491,686 B2 | 11/2016 | Bosch et al. |
| 9,503,363 B2 | 11/2016 | Sivabalan et al. |
| 9,525,619 B2 | 12/2016 | Filsfils et al. |
| 9,544,232 B2 | 1/2017 | Srinivasan et al. |
| 9,548,959 B2 | 1/2017 | Boutros et al. |
| 9,559,954 B2 | 1/2017 | Filsfils et al. |
| 9,565,160 B2 | 2/2017 | Previdi et al. |
| 9,571,349 B2 | 2/2017 | Previdi et al. |
| 9,590,850 B2 | 3/2017 | Filsfils et al. |
| 9,634,867 B2 | 4/2017 | Lee et al. |
| 9,634,924 B2 | 4/2017 | Filsfils et al. |
| 9,634,929 B2 | 4/2017 | Boutros et al. |
| 9,647,944 B2 | 5/2017 | Filsfils et al. |
| 9,660,897 B1 | 5/2017 | Gredler |
| 9,698,910 B2 | 7/2017 | Filsfils et al. |
| 9,705,815 B2 | 7/2017 | Mattson et al. |
| 9,749,227 B2 | 8/2017 | Frost et al. |
| 9,780,909 B2 | 10/2017 | Wood et al. |
| 9,813,333 B2 | 11/2017 | Zhao et al. |
| 9,825,845 B2 | 11/2017 | Wang et al. |
| 9,825,856 B2 | 11/2017 | Yong et al. |
| 9,832,115 B2 | 11/2017 | Cai et al. |
| 9,847,939 B2 | 12/2017 | Patel et al. |
| 9,858,241 B2 | 1/2018 | Srinivasan et al. |
| 9,912,577 B2 | 3/2018 | Filsfils et al. |
| 9,929,946 B2 | 3/2018 | Filsfils et al. |
| 9,942,057 B2 | 4/2018 | Bryant et al. |
| 9,979,601 B2 | 5/2018 | Filsfils et al. |
| 9,979,629 B2 | 5/2018 | Sivabalan et al. |
| 10,063,475 B2 | 8/2018 | Previdi et al. |
| 10,142,160 B1 | 11/2018 | Adams et al. |
| 10,212,076 B1 | 2/2019 | Morris |
| 10,382,334 B2 | 8/2019 | Previdi et al. |
| 2001/0037401 A1 | 11/2001 | Soumiya et al. |
| 2001/0040895 A1 | 11/2001 | Templin |
| 2001/0052053 A1 | 12/2001 | Nemirovsky et al. |
| 2002/0057651 A1 | 5/2002 | Roberts |
| 2002/0057699 A1 | 5/2002 | Roberts |
| 2002/0080786 A1 | 6/2002 | Roberts |
| 2002/0099856 A1 | 7/2002 | Shitama |
| 2002/0101868 A1 | 8/2002 | Clear et al. |
| 2002/0103631 A1 | 8/2002 | Feldmann et al. |
| 2002/0103732 A1 | 8/2002 | Bundy et al. |
| 2002/0176371 A1 | 11/2002 | Behzadi |
| 2002/0191541 A1 | 12/2002 | Buchanan et al. |
| 2003/0016678 A1 | 1/2003 | Maeno |
| 2003/0026271 A1 | 2/2003 | Erb et al. |
| 2003/0039212 A1 | 2/2003 | Lloyd et al. |
| 2003/0058790 A1 | 3/2003 | Nagamine |
| 2003/0099194 A1 | 5/2003 | Lee et al. |
| 2003/0099203 A1 | 5/2003 | Rajan et al. |
| 2003/0118051 A1 | 6/2003 | Ooms |
| 2003/0126272 A1 | 7/2003 | Corl et al. |
| 2003/0133412 A1 | 7/2003 | Iyer et al. |
| 2003/0142674 A1 | 7/2003 | Casey |
| 2003/0142685 A1 | 7/2003 | Bare |
| 2003/0179742 A1 | 9/2003 | Ogier et al. |
| 2003/0231634 A1 | 12/2003 | Henderson et al. |
| 2004/0032856 A1 | 2/2004 | Sandstrom |
| 2004/0160958 A1 | 8/2004 | Oh |
| 2004/0174879 A1 | 9/2004 | Basso et al. |
| 2004/0196840 A1 | 10/2004 | Amrutur et al. |
| 2004/0196854 A1 | 10/2004 | Thubert et al. |
| 2004/0202158 A1 | 10/2004 | Takeno et al. |
| 2004/0218535 A1 | 11/2004 | Liong et al. |
| 2004/0219922 A1 | 11/2004 | Gage et al. |
| 2004/0240442 A1 | 12/2004 | Grimminger et al. |
| 2004/0249951 A1 | 12/2004 | Grabelsky et al. |
| 2005/0066017 A1 | 3/2005 | Bogia |
| 2005/0071130 A1 | 3/2005 | Benjamin et al. |
| 2005/0073958 A1 | 4/2005 | Atlas et al. |
| 2005/0105515 A1 | 5/2005 | Reed et al. |
| 2005/0174998 A1 | 8/2005 | Vesterinen et al. |
| 2005/0213513 A1 | 9/2005 | Ngo et al. |
| 2005/0232303 A1 | 10/2005 | Deforche et al. |
| 2005/0240943 A1 | 10/2005 | Smith et al. |
| 2005/0259586 A1 | 11/2005 | Hafid et al. |
| 2005/0259655 A1 | 11/2005 | Cuervo et al. |
| 2006/0002304 A1 | 1/2006 | Ashwood-Smith |
| 2006/0013209 A1 | 1/2006 | Somasundaram |
| 2006/0039371 A1* | 2/2006 | Castro ............... H04L 45/02 370/389 |
| 2006/0045088 A1 | 3/2006 | Nguyen |
| 2006/0056397 A1 | 3/2006 | Aizu et al. |
| 2006/0067318 A1* | 3/2006 | Gorodetsky ........... H04L 45/74 370/392 |
| 2006/0075134 A1 | 4/2006 | Aalto et al. |
| 2006/0080421 A1 | 4/2006 | Hu |
| 2006/0092940 A1 | 5/2006 | Ansari et al. |
| 2006/0126272 A1 | 6/2006 | Horio et al. |
| 2006/0146696 A1 | 7/2006 | Li et al. |
| 2006/0182034 A1 | 8/2006 | Klinker et al. |
| 2006/0187817 A1 | 8/2006 | Charzinski et al. |
| 2006/0215544 A1 | 9/2006 | Asa et al. |
| 2006/0239199 A1 | 10/2006 | Blair et al. |
| 2006/0239201 A1 | 10/2006 | Metzger et al. |
| 2006/0262735 A1 | 11/2006 | Guichard et al. |
| 2006/0274716 A1 | 12/2006 | Oswal et al. |
| 2007/0019647 A1 | 1/2007 | Roy et al. |
| 2007/0053342 A1 | 3/2007 | Sierecki et al. |
| 2007/0058638 A1 | 3/2007 | Guichard et al. |
| 2007/0064715 A1 | 3/2007 | Lloyd et al. |
| 2007/0112975 A1 | 5/2007 | Cassar |
| 2007/0133406 A1 | 6/2007 | Vasseur |
| 2007/0147363 A1 | 6/2007 | Oswal et al. |
| 2007/0171825 A1 | 7/2007 | Roberts et al. |
| 2007/0171826 A1 | 7/2007 | Roberts et al. |
| 2007/0189291 A1 | 8/2007 | Tian |
| 2007/0230362 A1 | 10/2007 | Bardalai et al. |
| 2007/0237160 A1 | 10/2007 | Natarajan et al. |
| 2007/0245034 A1 | 10/2007 | Retana et al. |
| 2008/0002699 A1 | 1/2008 | Rajsic |
| 2008/0025203 A1 | 1/2008 | Tallet |
| 2008/0034116 A1 | 2/2008 | Li et al. |

(56) References Cited

U.S. PATENT DOCUMENTS

| | | |
|---|---|---|
| 2008/0037117 A1 | 2/2008 | Seki et al. |
| 2008/0075016 A1 | 3/2008 | Ashwood-Smith |
| 2008/0075117 A1 | 3/2008 | Tanaka |
| 2008/0084881 A1 | 4/2008 | Dharwadkar et al. |
| 2008/0101227 A1 | 5/2008 | Fujita et al. |
| 2008/0101239 A1 | 5/2008 | Goode |
| 2008/0101367 A1 | 5/2008 | Weinman |
| 2008/0172497 A1 | 7/2008 | Mohan et al. |
| 2008/0189393 A1 | 8/2008 | Wagner |
| 2008/0192762 A1 | 8/2008 | Kompella et al. |
| 2008/0212465 A1 | 9/2008 | Yan |
| 2008/0225864 A1 | 9/2008 | Aissaoui et al. |
| 2008/0253367 A1 | 10/2008 | Ould-Brahim |
| 2008/0259820 A1 | 10/2008 | White et al. |
| 2008/0279201 A1 | 11/2008 | Lu et al. |
| 2009/0041038 A1 | 2/2009 | Martini et al. |
| 2009/0049194 A1 | 2/2009 | Csaszar et al. |
| 2009/0067445 A1 | 3/2009 | Diguet et al. |
| 2009/0080431 A1 | 3/2009 | Rekhter |
| 2009/0135815 A1 | 5/2009 | Pacella |
| 2009/0141721 A1 | 6/2009 | Filsfils |
| 2009/0161576 A1 | 6/2009 | Morris |
| 2009/0175274 A1 | 7/2009 | Aggarwal et al. |
| 2009/0213858 A1 | 8/2009 | Dolganow et al. |
| 2009/0252161 A1 | 10/2009 | Morris |
| 2009/0285101 A1 | 11/2009 | Lu |
| 2009/0290486 A1 | 11/2009 | Wang |
| 2009/0296710 A1 | 12/2009 | Agrawal et al. |
| 2009/0310481 A1 | 12/2009 | Deng et al. |
| 2009/0323694 A1 | 12/2009 | Miki et al. |
| 2009/0323696 A1 | 12/2009 | Schwan et al. |
| 2010/0010975 A1 | 1/2010 | Morris |
| 2010/0010992 A1 | 1/2010 | Morris |
| 2010/0011048 A1 | 1/2010 | Morris |
| 2010/0014424 A1 | 1/2010 | Agrawal et al. |
| 2010/0063983 A1 | 3/2010 | Groarke et al. |
| 2010/0088717 A1 | 4/2010 | Candelore et al. |
| 2010/0103937 A1 | 4/2010 | O'Neil |
| 2010/0124220 A1 | 5/2010 | Morris |
| 2010/0124231 A1 | 5/2010 | Kompella |
| 2010/0128628 A1 | 5/2010 | Wu et al. |
| 2010/0142401 A1 | 6/2010 | Morris |
| 2010/0142548 A1 | 6/2010 | Sheth |
| 2010/0145602 A1 | 6/2010 | Morris |
| 2010/0145963 A1 | 6/2010 | Morris |
| 2010/0146132 A1 | 6/2010 | Morris |
| 2010/0161732 A1 | 6/2010 | Morris |
| 2010/0195516 A1 | 8/2010 | McReynolds et al. |
| 2010/0202455 A1 | 8/2010 | Sundaram et al. |
| 2010/0220739 A1 | 9/2010 | Ishiguro |
| 2010/0232435 A1 | 9/2010 | Jabr et al. |
| 2010/0241742 A1 | 9/2010 | Douceur et al. |
| 2010/0250777 A1 | 9/2010 | Morris |
| 2010/0265943 A1 | 10/2010 | Dong et al. |
| 2010/0272110 A1 | 10/2010 | Allan et al. |
| 2010/0284309 A1 | 11/2010 | Allan et al. |
| 2010/0290480 A1 | 11/2010 | Westphal et al. |
| 2011/0007670 A1 | 1/2011 | Yan |
| 2011/0060844 A1 | 3/2011 | Allan et al. |
| 2011/0063986 A1 | 3/2011 | Denecheau et al. |
| 2011/0090913 A1 | 4/2011 | Kim et al. |
| 2011/0216779 A1 | 9/2011 | Peterson et al. |
| 2011/0228780 A1 | 9/2011 | Ashwood-Smith et al. |
| 2011/0261722 A1 | 10/2011 | Awano |
| 2011/0268114 A1 | 11/2011 | Wijnands et al. |
| 2011/0273980 A1 | 11/2011 | Smith |
| 2011/0280123 A1 | 11/2011 | Wijnands et al. |
| 2011/0286326 A1 | 11/2011 | Awano |
| 2011/0286452 A1 | 11/2011 | Balus et al. |
| 2012/0020357 A1* | 1/2012 | Matsubara ............... H04L 69/08 370/392 |
| 2012/0044944 A1 | 2/2012 | Kotha et al. |
| 2012/0063526 A1 | 3/2012 | Xiao et al. |
| 2012/0069740 A1 | 3/2012 | Lu et al. |
| 2012/0069845 A1 | 3/2012 | Carney et al. |
| 2012/0075988 A1 | 3/2012 | Lu et al. |
| 2012/0076014 A1 | 3/2012 | Bragg |
| 2012/0082034 A1 | 4/2012 | Vasseur |
| 2012/0092986 A1 | 4/2012 | Chen |
| 2012/0106560 A1 | 5/2012 | Gumaste |
| 2012/0120808 A1 | 5/2012 | Nandagopal et al. |
| 2012/0120959 A1 | 5/2012 | Krause |
| 2012/0147768 A1 | 6/2012 | Johnsson et al. |
| 2012/0163384 A1 | 6/2012 | Takase et al. |
| 2012/0170461 A1 | 7/2012 | Long |
| 2012/0179796 A1 | 7/2012 | Nagaraj et al. |
| 2012/0213225 A1 | 8/2012 | Subramanian et al. |
| 2012/0218884 A1 | 8/2012 | Kini et al. |
| 2012/0236860 A1 | 9/2012 | Kompella et al. |
| 2012/0239799 A1 | 9/2012 | Wang et al. |
| 2012/0287818 A1 | 11/2012 | Corti et al. |
| 2012/0307629 A1 | 12/2012 | Vasseur et al. |
| 2013/0003728 A1 | 1/2013 | Kwong et al. |
| 2013/0051237 A1 | 2/2013 | Ong |
| 2013/0058345 A1 | 3/2013 | Kano |
| 2013/0077476 A1 | 3/2013 | Enyedi et al. |
| 2013/0077624 A1 | 3/2013 | Keesara et al. |
| 2013/0077625 A1 | 3/2013 | Khera et al. |
| 2013/0077626 A1 | 3/2013 | Keesara et al. |
| 2013/0114402 A1 | 5/2013 | Ould-Brahim et al. |
| 2013/0142052 A1 | 6/2013 | Burbidge et al. |
| 2013/0188634 A1 | 7/2013 | Magee |
| 2013/0219034 A1 | 8/2013 | Wang et al. |
| 2013/0227108 A1 | 8/2013 | Dunbar et al. |
| 2013/0232193 A1 | 9/2013 | Ali et al. |
| 2013/0250809 A1 | 9/2013 | Hui et al. |
| 2013/0258842 A1 | 10/2013 | Mizutani |
| 2013/0266012 A1 | 10/2013 | Dutta et al. |
| 2013/0266013 A1 | 10/2013 | Dutta et al. |
| 2013/0322248 A1 | 12/2013 | Guo |
| 2013/0343204 A1 | 12/2013 | Geib et al. |
| 2014/0003425 A1 | 1/2014 | Zhao et al. |
| 2014/0010083 A1 | 1/2014 | Hamdi et al. |
| 2014/0056300 A1 | 2/2014 | Zhao et al. |
| 2014/0067911 A1 | 3/2014 | Block et al. |
| 2014/0098675 A1 | 4/2014 | Frost et al. |
| 2014/0160925 A1 | 6/2014 | Xu et al. |
| 2014/0169370 A1 | 6/2014 | Filsfils et al. |
| 2014/0173078 A1 | 6/2014 | McCord et al. |
| 2014/0185618 A1 | 7/2014 | Perlman et al. |
| 2014/0189045 A1 | 7/2014 | Morris |
| 2014/0189081 A1 | 7/2014 | Morris |
| 2014/0189152 A1 | 7/2014 | Morris |
| 2014/0189153 A1 | 7/2014 | Morris |
| 2014/0189154 A1 | 7/2014 | Morris |
| 2014/0189155 A1 | 7/2014 | Morris |
| 2014/0189156 A1 | 7/2014 | Morris |
| 2014/0189159 A1 | 7/2014 | Morris |
| 2014/0192677 A1 | 7/2014 | Chew et al. |
| 2014/0198634 A1 | 7/2014 | Kumar et al. |
| 2014/0204946 A1 | 7/2014 | Li |
| 2014/0211794 A1 | 7/2014 | Frost et al. |
| 2014/0215087 A1 | 7/2014 | Zhao et al. |
| 2014/0233385 A1 | 8/2014 | Beliveau et al. |
| 2014/0254596 A1 | 9/2014 | Filsfils et al. |
| 2014/0269266 A1 | 9/2014 | Filsfils et al. |
| 2014/0269421 A1 | 9/2014 | Previdi et al. |
| 2014/0269422 A1 | 9/2014 | Filsfils et al. |
| 2014/0269698 A1 | 9/2014 | Filsfils et al. |
| 2014/0269699 A1 | 9/2014 | Filsfils et al. |
| 2014/0269721 A1 | 9/2014 | Bashandy et al. |
| 2014/0269725 A1 | 9/2014 | Filsfils et al. |
| 2014/0269727 A1 | 9/2014 | Filsfils et al. |
| 2014/0286195 A1 | 9/2014 | Fedyk |
| 2014/0317259 A1 | 10/2014 | Previdi et al. |
| 2014/0328207 A1 | 11/2014 | Agrawal et al. |
| 2014/0341222 A1 | 11/2014 | Filsfils et al. |
| 2014/0369356 A1 | 12/2014 | Bryant et al. |
| 2015/0003455 A1 | 1/2015 | Haddad et al. |
| 2015/0003458 A1 | 1/2015 | Li et al. |
| 2015/0003463 A1 | 1/2015 | Li et al. |
| 2015/0023328 A1 | 1/2015 | Thubert et al. |
| 2015/0109902 A1 | 4/2015 | Kumar et al. |
| 2015/0156035 A1 | 6/2015 | Foo et al. |

(56) References Cited

U.S. PATENT DOCUMENTS

| | | |
|---|---|---|
| 2015/0188804 A1 | 7/2015 | Ashwood-Smith |
| 2015/0195197 A1 | 7/2015 | Yong et al. |
| 2015/0200843 A1 | 7/2015 | Frost et al. |
| 2015/0207671 A1 | 7/2015 | Farkas et al. |
| 2015/0236959 A1 | 8/2015 | Cai et al. |
| 2015/0256456 A1 | 9/2015 | Previdi et al. |
| 2015/0263940 A1 | 9/2015 | Kini et al. |
| 2015/0271066 A1 | 9/2015 | Frost et al. |
| 2015/0271102 A1 | 9/2015 | Antich |
| 2015/0326473 A1 | 11/2015 | Dunbar et al. |
| 2015/0326675 A1 | 11/2015 | Kini et al. |
| 2015/0381406 A1 | 12/2015 | Francois et al. |
| 2016/0006614 A1 | 1/2016 | Zhao |
| 2016/0021000 A1 | 1/2016 | Previdi et al. |
| 2016/0028640 A1 | 1/2016 | Zhang et al. |
| 2016/0173366 A1 | 6/2016 | Saad et al. |
| 2016/0191372 A1 | 6/2016 | Zhang et al. |
| 2016/0254987 A1 | 9/2016 | Eckert et al. |
| 2016/0254988 A1 | 9/2016 | Eckert et al. |
| 2016/0254991 A1 | 9/2016 | Eckert et al. |
| 2016/0352629 A1 | 12/2016 | Wang et al. |
| 2016/0352654 A1 | 12/2016 | Filsfils et al. |
| 2016/0373317 A1 | 12/2016 | Ali et al. |
| 2017/0005877 A1 | 1/2017 | Papadimitriou |
| 2017/0019330 A1 | 1/2017 | Filsfils et al. |
| 2017/0041223 A1 | 2/2017 | Akashi |
| 2017/0048138 A1 | 2/2017 | Sivabalan et al. |
| 2017/0064717 A1 | 3/2017 | Filsfils et al. |
| 2017/0104673 A1 | 4/2017 | Bashandy et al. |
| 2017/0111261 A1 | 4/2017 | Francois et al. |
| 2017/0111277 A1 | 4/2017 | Previdi et al. |
| 2017/0230274 A1 | 8/2017 | Filsfils et al. |
| 2017/0302561 A1 | 10/2017 | Filsfils et al. |
| 2017/0302571 A1 | 10/2017 | Frost et al. |
| 2017/0324497 A1 | 11/2017 | Ruffini et al. |
| 2017/0324654 A1 | 11/2017 | Previdi et al. |
| 2017/0331672 A1 | 11/2017 | Fedyk et al. |
| 2017/0346718 A1 | 11/2017 | Psenak et al. |
| 2017/0346737 A1 | 11/2017 | Previdi et al. |
| 2017/0366453 A1 | 12/2017 | Previdi et al. |
| 2018/0034728 A1 | 2/2018 | Filsfils et al. |
| 2018/0041420 A1 | 2/2018 | Saad et al. |
| 2018/0083871 A1 | 3/2018 | Filsfils et al. |
| 2018/0109450 A1 | 4/2018 | Filsfils et al. |
| 2018/0131616 A1 | 5/2018 | LaBerge et al. |
| 2018/0302320 A1 | 10/2018 | Aranha et al. |
| 2019/0349303 A1 | 11/2019 | Previdi et al. |

FOREIGN PATENT DOCUMENTS

| | | |
|---|---|---|
| CN | 101496357 A | 7/2009 |
| CN | 101803293 A | 8/2010 |
| CN | 101841442 A | 9/2010 |
| CN | 101616466 B | 12/2010 |
| CN | 102098222 A | 6/2011 |
| CN | 102132533 A | 7/2011 |
| CN | 102299852 A | 12/2011 |
| CN | 102498694 A | 6/2012 |
| CN | 101931548 B | 9/2012 |
| CN | 102714625 A | 10/2012 |
| EP | 2974164 A1 | 1/2016 |
| EP | 2974176 A1 | 1/2016 |
| WO | 2009018728 A1 | 2/2009 |
| WO | 2015063618 A1 | 5/2015 |
| WO | 2015094296 A1 | 6/2015 |

OTHER PUBLICATIONS

Rekhter, Y. et al (ed), "A Border Gateway Protocol 4 {BGP-4)", RFC 4271, pp. 1-104, Internet Engineering Task Force, http://tools.ietf.org/rfc/rfc4271.txt, Jan. 2006.

Response to Final Office Action dated Apr. 30, 2019 for U.S. Appl. No. 16/153,050.

Roberts, Lawrence, "A Radical New Router", IEEE Spectrum, Jul. 2009, pp. 1-6.

Rosen et al. "Multiprotocol Label Switching Architecture," RFC 3031, Jan. 2001, 61 pages.

Rosen et al., "BGP/MPLS IP Virtual Private Networks (VPNs)," Network Working Group, RFC 4364, Standards Track, Feb. 2006, 47 pages; https://tools.ietf.org/pdf/rfc4364.pdf.

Rosen et al., "BGP/MPLS VPNs", Cisco Systems, Inc., Network Working Group, Request for Comments: 2547; Mar. 1999, pp. 1-25.

Sivabalan et al., "PCE-Initiated Traffic Engineering Path Setup in Segment Routed Networks; draft-sivabalan-pcesegmentrouting-00," Internet Engineering Task Force, IETF, Standard Working Draft, Internet Society (ISOC) 4, Rue Des Falaises CH-1205, Geneva, Switzerland, Jun. 2013, pp. 1-16.

Steenstrup, M., "Inter-Domain Policy Routing Protocol Specification: Version 1", RFC 1479, pp. 1-108, Internet Engineering Task Force, http://tools.ietf.org/rfc/rfc1479.txt, Jul. 1993.

Tian et al., "Source Routed MPLS LSP Using Domain Wide Label," draft-tian-mpls-lsp-source-route-01.txt, Redback Networks, Network Working Group, Internet Draft, Jul. 2004, pp. 1-12.

U.S. Appl. No. 15/961,828_Nov. 13, 2019_NOA.

U.S. Appl. No. 16/264,580_Oct. 30, 2019_NOA.

U.S. Appl. No. 16/454,030_Nov. 8, 2019_NOA.

Vasseur et al., "A Link-Type Sub-TLV to Convey the Number of Traffic Engineering Label Switched Paths Signaled with Zero Reserved Bandwidth Across a Link," Cisco Systems, Inc., Network Working Group, Request for Comments 5330, Oct. 2008, 16 pages.

Vasseur et al., "Path Computation Element (PCE) Communication Protocol (PCEP) Request for Comments: 5440," Cisco Systems, Internet Engineering Task Force, IETF, Standard, Internet Society (ISOC) 4, Rue Des Falaises CH-1205, Geneva, Switzerland, chapters 4-8, Mar. 2009, pp. 1-87.

Waitzman, D., et al, "Distance Vector Multicast Routing Protocol", RFC 1075, pp. 1-24, Internet Engineering Task Force, http://tools.ietf.org/rfc/rfc1075.txt, Nov. 1988.

Wang et al., "Research and Implementation of a Scalable Secure Active Network Node", Proceedings of the First International Conference on Machine Learning and Cybernetics, IEEE, Nov. 2002, pp. 111-115.

Wetherall et al., "The Active IP Option," Proceedings of the 7th Workshop of ACM SIGOPS Systems Support for Worldwide Applications, Sep. 1996, pp. 33-40.

Wijnands et al., "Multicast Extensions for LDP," Cisco Systems, Inc., Yuji Kamite and Hitoshi Fukuda, NTT Communications, Network Working Group; Internet Draft; Mar. 2005, pp. 1-12.

Notice of Allowance dated May 28, 2019 for U.S. Appl. No. 16/101,386.

Notice of Allowance dated May 28, 2019 for U.S. Appl. No. 16/195,816.

Notice of Allowance dated May 31, 2019 for U.S. Appl. No. 16/101,382.

Notice of Allowance dated Jun. 1, 2019 for U.S. Appl. No. 15/961,826.

Notice of Allowance dated Jun. 4, 2019 for U.S. Appl. No. 15/961,828.

Notice of Allowance dated Jun. 4, 2019 for U.S. Appl. No. 15/961,832.

Notice of Allowance dated Jun. 7, 2019 for U.S. Appl. No. 16/101,380.

Notice of Allowance dated Jun. 14, 2019 for U.S. Appl. No. 16/195,832.

Notice of Allowance dated Jun. 24, 2019 for U.S. Appl. No. 16/101,386.

Notice of Allowance dated Jul. 3, 2019 for U.S. Appl. No. 16/153,196.

Notice of Allowance dated Jul. 12, 2019 for U.S. Appl. No. 16/195,827.

Notice of Allowance dated Jul. 22, 2019 for U.S. Appl. No. 16/101,387.

Notice of Allowance dated Jul. 22, 2019 for U.S. Appl. No. 16/153,050.

Notice of Allowance dated Jul. 22, 2019 for U.S. Appl. No. 16/153,168.

Notice of Allowance dated Jul. 31, 2019 for U.S. Appl. No. 16/101,380.

Notice of Allowance dated Aug. 5, 2019 for U.S. Appl. No. 16/101,146.

(56) References Cited

OTHER PUBLICATIONS

Notice of Allowance dated Aug. 9, 2019 for U.S. Appl. No. 16/153,223.
Notice of Allowance dated Aug. 12, 2019 for U.S. Appl. No. 16/153,262.
Notice of Allowance dated Aug. 13, 2019 for U.S. Appl. No. 16/195,827.
Notice of Allowance dated Sep. 5, 2019 for U.S. Appl. No. 16/264,580.
Office Action dated Jan. 22, 2019 for U.S. Appl. No. 16/153,223.
Office Action dated Jan. 24, 2019 for U.S. Appl. No. 16/153,262.
Office Action dated Feb. 7, 2019 for U.S. Appl. No. 16/153,168.
Office Action dated Feb. 26, 2019 for U.S. Appl. No. 16/153,146.
Office Action dated Mar. 12, 2019 for U.S. Appl. No. 16/153,196.
Office Action dated Mar. 14, 2019 for U.S. Appl. No. 16/195,827.
Office Action dated Mar. 21, 2019 for U.S. Appl. No. 16/195,816.
Office Action dated Mar. 21, 2019 for U.S. Appl. No. 16/195,830.
Office Action Summary in U.S. Appl. No. 13/727,662 dated Apr. 10, 2015.
Oran, D., (ed.), "OSI IS-IS Intrad-omain Routing Protocol", RFC 1142, pp. 1-193, Internet Engineering Task Force, http://tools.ietf.org/rfc/rfc1142.txt, Feb. 1990 _.
Pao, D. et al, "Efficient Hardware Architecture for Fast IP Address Lookup" IEEE, Proceedings Twenty First Annual Joint Conference of the IEEE Computer and Communications Societies, Jun. 23-27, 2002, vol. 2, pp. 555-561.
Perkins, C. et al, "Ad hoc On-Demand Distance Vector (AODV) Routing", RFC 3561, pp. 1-37, Internet Engineering Task Force, http://lools.ietf.org/rfc/rfc3561.lxl, Jul. 2003.
Pignataro et al., "Seamless Bidirectional Forwarding Detection (S-BFD) for IPv4, IPv6 and MPLS," draftietf-bfd-seamless-ip-06, Internet Engineering Task Force, Internet-Draft, May 6, 2016, 8 pages.
Pignataro et al.,"Seamless Bidirectional Forwarding Detection (S-BFD)," draft-ietf-bfd-seamless-base-11, Internet Engineering Task Force, Internet-Draft, May 6, 2016, 21 pages.
Postel, J et al "Comments on the IP Source Route Option" RFC unnumbered, IETF 1987, 18 pages.
Postel, J. et al. "Darpa Internet Program Protocol Specification RFC 791", Sep. 1981, prepared for DARPA by Information Sciences Institute, University of Southern California, 50 pages, IETF.
Postel, J; "Internet Protocol, DARPA Internet Protocol Specification", RFC 791 ,pp. 1-45, Internet Engineering Task Force (IETF), http://tools.iefl.org/rfc/rfc791.txt, Sep. 1981.
Postel, John (ed.), Editor; "Transmission Control Protocol—DARPA Internet Protocol Specification", RFC 793, pp. 1-85, USC/Information Sciences Institute, http://tools.ietf.org/rfc/rfc793.txt, Sep. 1981.
Previdi et al., "IS-IS Extensions for Segment Routing," draft-ietf-isis-segment-routing-extensions-05, IS-IS for IP Internets, Internet-Draft, Jun. 30, 2015, pp. 1-37.
Previdi et al., "IS-IS Extensions for Segment Routing," draft-ietf-isis-segment-routing-extensions-06, IS-IS for IP Internets, Internet-Draft, Dec. 14, 2015, pp. 1-39.
Previdi et al., "Segment Routing Egress Peer Engineering BGPLS Extensions", Network Working Group Internet-Draft, < draft-previdi-idr-bgpls-segment-routing-epe-01 >, Internet Engineering Task Force Trust, Oct. 25, 2014, 16 pages.
Previdi et al., "Segment Routing with IS-IS Routing Protocol, draft-previdi-filsfils-isis-segment-routing-00," Cisco Systems, Inc., IS-IS for IP Internets, Internet-Draft, Mar. 12, 2013, pp. 1-27.
Previdi et al., "Segment Routing with IS-IS Routing Protocol, draft-previdi-filsfils-isis-segment-routing-02," Cisco Systems, Inc., Internet-Draft Mar. 20, 2013, pp. 1-27.
Psenak et al. "OSPF Extensions for Segment Routing," draft-ietf-ospf-segment-routing-extensions-05, Open Shortest Path First IGP, Internet-Draft, Jun. 26, 2015, pp. 1-29.
Quinn et al., "Network Service Header—draft-quinn-sfc-nsh-07.txt," Network Working Group, Internet-Draft, Feb. 24, 2015, pp. 1-43.
Raszuk, R., "MPLS Domain Wide Labels," NTT 13, draft-raszuk-mpls-domain-widelabels-00, MPLS Working Group, Internet-Draft, Jul. 14, 2013, pp. 1-6.
Reconsideration After Non-Final Rejection dated Apr. 9, 2019 for U.S. Appl. No. 16/153,114.
Reconsideration After Non-Final Rejection dated May 17, 2019 for U.S. Appl. No. 16/264,580.
Reconsideration After Non-Final Rejection dated May 20, 2019 for U.S. Appl. No. 16/264,580.
Rekhter et al.,"Carrying Label Information in BGP-4," Request for Comments 3107, The Internet Society, May 2001, 8 pages.
Filsfils et al., "Segment Routing Architecture," Cisco Systems, Inc., draft-filsfils-rtgwg-segment-routing-00, Jun. 28, 2013, pp. 1-28.
Filsfils et al., "Segment Routing Architecture," Cisco Systems, Inc., draft-filsfils-rtgwgsegment-routing-01, Network Working Group, Internet-Draft, Oct. 21, 2013, pp. 1-28.
Filsfils et al., "Segment Routing Architecture," Cisco Sytems, Inc., draft-filsfilsrtgwg-segment-routing-01, Network Working Group, Internet-Draft, Oct. 21, 2013, pp. 1-28.
Filsfils et al., "Segment Routing Architecture," draft-ietf-spring-segment-routing-07, Network Working Group, Internet-Draft, Dec. 15, 2015, pp. 1-24.
Filsfils et al., "Segment Routing Interoperability with LDP," Cisco Systems, Inc., draft-filsfils-springsegment-routing-ldp-interop-01; Apr. 18, 2014, pp. 1-16.
Filsfils et al., "Segment Routing Interoperability with LDP," Cisco Systems, Inc., draft-filsfils-spring-segment-routingldp-interop-01.txt, Apr. 18, 2014, pp. 1-16.
Filsfils et al., "Segment Routing Use Cases," draft-filsfils-rtgwg-segment-routing-use-cases-01, Network Working Group, Internet-Draft, Jul. 14, 2013, pp. 1-46.
Filsfils et al., "Segment Routing Use Cases," draft-filsfils-rtgwg-segment-routing-use-cases-02, Network Working Group, Internet-Draft, Oct. 21, 2013, pp. 1-36.
Filsfils et al., "Segment Routing with MPLS Data Plane," draft-ietf-spring-segment-routing-mpls-05, Network Working Group, Internet-Draft, Jul. 6, 2016, 15 pages.
Final Rejection dated Mar. 28, 2019 for U.S. Appl. No. 16/101,386.
Final Rejection dated Jun. 13, 2019 for U.S. Appl. No. 16/153,114.
Final Rejection dated Jun. 14, 2019 for U.S. Appl. No. 16/195,823.
Final Rejection dated Jun. 17, 2019 for U.S. Appl. No. 16/195,827.
Final Rejection dated Jul. 12, 2019 for U.S. Appl. No. 16/264,580.
Final Rejection dated Jul. 22, 22019 for U.S. Appl. No. 16/195,830.
Frost et al., "MPLS Generic Associated Channel (G-Ach) Advertisement Protocol," Cisco Systems, Inc., draft-ietfmpls-gach-adv-00, Internet-Draft, Jan. 27, 2012, pp. 1-17.
Frost et al., "MPLS Generic Associated Channel (G-Ach) Advertisement Protocol," Cisco Systems, Inc., draft-ietfmpls-gach-adv-08, Internet-Draft, Jun. 7, 2013, pp. 1-22.
Frost et al., "MPLS Generic Associated Channel (G-Ach) Advertisement Protocol," Cisco Systems, Inc., Request for Comments 7212, Jun. 2014, pp. 1-23.
Fuller, V, et al, "Classless Inter-Domain Routing (CIDR): An Address Assignment and Aggregation Strategy", RFC 1519, pp. 1-24, Internet Engineering Task Force (IEFT), http:I/tools.ieft.org/rfc/rfc1519.txt, Jun. 1999.
Fuller, V. et al, "Classless Inter-Domain Routing (CIDR): an Address Assignment and Aggregation Strategy" RFC 1519, Network Working Group, CIDR Address Strategy, Sep. 1993, 24 pages.
Geib, R., "Segment Routing Based OAM Use Case," IETF 87, Berlin, Jul./Aug. 2013, pp. 1-3.
Geib, R., "Use Case for a Scalable and Topology Aware MPLS data plan moniotoring System," Deutsch Telekom, draft-geib-spring-oam-usecase-01, Internet-Draft, Feb. 5, 2014, pp. 1-10.
Geib, R., "Use Case for a Scalable and Topology Aware MPLS data plan monitoring System," Deutsch Telekom, draft-geib-spring-oam-usecase-00, Internet-Draft, Oct. 17, 2013, pp. 1-7.
Gerla, M., et al, "Fisheye State Routing Protocol (FSR) for Ad Hoc Netvvorks", draft-ieff-manet-fsr-03.txt, pp. 1-17, Internet Engineering Task Force,http:f/tools.ietf.org/html/draft-ietf-manet-fsr-03.txt, Jun. 2002.
Glenn, R. et al, "The NULL Encryption Algorithm and Its Use With Ipsec" RFC 2410, Network Working Group, Nov. 1998, 6 pages.

(56) References Cited

OTHER PUBLICATIONS

Gredler et al., "Advertising MPLS Labels in IS-IS draftgredler-isis-label-advertisement-00," Juniper Networks, Inc., Internet-Draft, Apr. 5, 2013, pp. 1-13.
Gredler et al., "Advertising MPLS LSPs in the IGP," hannes@juniper.net, IETF87, Berlin, draft-gredler-ospf-label-advertisement-03, May 21, 2013, pp. 1-17.
Guilbaud, "Google-Localizing Packet Loss in a Large Complex Network," Nicolas Guilbaud and Ross Cartlidge, Google Presentation, Feb. 5, 2013, pp. 1-43.
Halpern et al., "Service Function Chaining (SFC) Architecture—draft-ietf-sfc-architecture-09," Network Workinq Group, Internet-Draft, Jun. 7, 2015, pp. 1-29.
Hass, Z., et al, "The Interzone Routing Protocol (IERP) for Ad Hoc Networks", draft-ieft-manet-zone-ierp-02.txt, pp. 1-14, Internet Engineering Task Force,http://tools.ietf.org/html/draft-ieft-manet-zone-ierp-02.txt, Jul. 2002.
Hedrick, C, "Routing Information Protoocl", RFC 1058, pp. 1-33, Internet Engineering Task Force, http://tools.ietf.org/rfc/rfc1058.txt, Jun. 1988.
Hinden et al "IPv6 Global Unicast Address Format" RFC 3587, Aug. 2003, 5 pages.
Hinden, R. et al, "An IPv6 Aggregatable Global Unicast Address Format" RFC 2374, Network Working Group, Jul. 1998, 12 pages.
Hinden, R. et al, "Internet Protocol Version 6 (IPv6) Addressing Architecture" RFC 3513, Network Working Group, Apr. 2003, 26 pages.
Hinden, R. et al, "Internet Protocol Version 6 (IPv6) Addressing Architecture", RFC 3513, pp. 1-26, Internet Engineering Task Force, http://tools.ieft.org/rfc/rfc3513.txt, Apr. 2003.
Hinden, R., et al,, "Aggregatable Global Unicast Address Format", RFC 2374, pp. 1-12, Internet Engineering Task Force, http:/tools.ietf.org/rfc/rfc2374, Jul. 1998.
Housley, R., "Using Advanced Encryption Standard (AES) CCM Mode with IPsec Encapsulating Security Payload (ESP)," Network Working Group, RFC 4309, Standards Track, Dec. 2005, 13 pages; https://tools.ietf.org/pdf/rfc4309.pdf.
Hu, Y., et al, "Flow State in Dynamic Source Routing Protocol for Mobile Ad Hoc Networks", drafl-ietf-manet-dsrflow-00.txt, pp. 1-30, Internet Engineering Task Force,http://tools.ietf.org/html/drafl-ietf-manet-dsrflow-OO.txt, Feb. 2001.
Hui. J .. et al. ""An IPv6 Routing Header for Source Routes with the Routing Protocol for Low-Power and Lossy Networks (RPL)"". RFC 6554. pp. 1-13. Internet Engineering Task Force. http://tools.ielf.org/rfc/rfc6554.txt. Mar. 2012.
Imaizumi et al., "FMEHR: An Alternative Approach to Multi-Path Forwarding on Packed Switched Networks," Networks, 2005, pp. 196-201.
Jiang, M., et al, "Cluster Based Routing Protocol (CBR)", ddrafl-ietf-manet-cbrp-spec-01.txt, pp. 1-27, Internet Engineering Task Force,http://tools.ietf.org/html/ddrafl-ietf-manet-cbrp-spec-01.txt, Aug. 1999.
Abandonment Jun. 24, 2019 for U.S. Appl. No. 15/961,832.
Abley. J .. et al. ""Deprecation of Type 0 Routing Headers in IPv6"". RFC 5095. pp. 1-7. Internet Engineering Task Force. http://tools.ielf.org/rfc/rfc5095.txt. Dec. 2007.
Advisory_Action_dated_Sep. 17, 2019_for_U.S. Appl. No. 16/195,830.
Aggarwal et al., "MPLS Upstream Label Assignment and Context Specific Label Space," Network Working Group, FRC 5331, Aug. 2008, 13 pages.
Akiya et al., "Seamless Bidirectional Forwarding Detection (BFD) for Segment Routing (SR)," draft-akiyabfd-seamless-sr-01, Internet Engineering Task Force, Internet-Draft, Dec. 5, 2013, 7 pages.
Akiya et al., "Seamless Bidirectional Forwarding Detection (BFD) for Segment Routing (SR)," draft-akiyabfd-seamless-sr-02, Internet Engineering Task Force, Internet-Draft, Jun. 7, 2014, 7 pages.
Akiya et al., "Seamless Bidirectional Forwarding Detection (BFD) for Segment Routing (SR)," draft-akiyabfd-seamless-sr-03, Internet Engineering Task Force, Internet-Draft, Aug. 23, 2014, 7 pages.
Akiya et al., "Seamless Bidirectional Forwarding Detection (BFD) for Segment Routing (SR)," draft-akiyabfd-seamless-sr-04, Internet Engineering Task Force, Internet-Draft, Feb. 23, 2015, 7 pages.
Akiya et al., "Seamless Bidirectional Forwarding Detection (BFD) for Segment Routing (SR)," draft-akiyabfdseamless-sr-00, Internet Engineering Task Force, Internet-Draft, Jun. 7, 2013, 7 pages.
Akiya, N., "Segment Routing Implications on BFD," Sep. 9, 2013, 2 pages.
Alcatel-Lucent, "Segment Routing and Path Computation Element—Using Traffic Engineering to Optimize Path Placement and Efficiency in IP/MPLS Networks," Technology White Paper, 2015, 28 pages.
Aldrin et al., "Seamless Bidirectional Forwarding Detection (S-BFD) Use Cases," draft-ietf-bfd-seamlessuse-case-08, Network Working Group, Internet-Draft, May 6, 2016, 15 pages.
Almquist, P., "Type of Service in the Internet Protocol Suite", RFC 1349, pp. 1-28, Internet Engineering Task Force, http://lools.ielf.org/rfc/rfc1349. lxl, Jul. 1992.
Awduche et al., "Overview and Principles of Internet Traffic Engineering," Network Working Group, Request for Comments, 3272, May 2002, pp. 1-71.
Awduche et al., "Requirements for Traffic Engineering Over MPLS," Network Working Group, Request for Comments, 2702, Sep. 1999, pp. 1-29.
Awduche et al., "RSVP-TE: Extensions to RSVP for LSP Tunnels," Network Working Group, Internet-Draft, Feb. 2001, pp. 1-12.
Awduche et al., "RSVP-TE: Extensions to RSVP for LSP Tunnels," Network Working Group, RFC 3209, Dec. 2001, pp. 1-61.
Backes et al., "Deutsche Telekom AG's Statement About IPR Related to Draft-Geig-Spring-OAM-Usecase-01," Aug. 23, 2012, pp. 1-2.
Backes et al., "Deutsche Telekom AG's Statement About IPR Related to Draft-Geig-Spring-OAM-Usecase-01," Feb. 5, 2014, pp. 1-2.
Baker, F. (ed), "Requirements for IP Version 4 Routers", RFC 1812, pp. 1-175, Internet Engineering Task Force, http://tools.ietf.org/rfc/rfc1812.txt, Jun. 1995.
Bates et al., "Multiprotocol Extensions for BGP-4," Network Working Group, RFC 4760, Standards Track, Jan. 2007, 47 pages; https://tools.ietf.org/pdf/rfc4760.pdf.
Bergkvist, J., et al, "Boomerang—A Simple Resource Reservation Framework for IP", drafl-ietf-manet-cbrp-spec-01.txt, pp. 1-15, Internet Engineering Task Force.http ://tools.ietf.org/html/drafl-ietf-manet-cbrp-spec-01.txt, Nov. 2000.
Bryant et al., "IP Fast Reroute Using Tunnels-draft-bryant-ipfrr-tunnels-03," Cisco Systems, Network Working Group, Internet-Draft, Nov. 16, 2007, pp. 1-30.
Bryant et al., "Remote LFA FRR," Cisco Systems, draft-ietf-rtgwg-remote-lfa-04, Network Working Group, Internet-Draft, Nov. 22, 2013, pp. 1-24.
Chandranmenon, Girish and Varghese, George. "Trading Packet Headers for Packet Processing," SIGCOMM, 1995.
Chroboczek, J., "The Babel Routing Protocol", RFC 6126, pp. 1-45, Internet Engineering Task Force, http://tools.ieft_ org/rfc/rfc6126. txt, Apr. 2011.
Cisco Systems, Inc., "Introduction to Intermediate System-to-Intermediate System Protocol," published 1992-2002; pp. 1-25.
Clausen,T. et al {ed), "Optimized Link State Routing Protocol {OSLR)", RFC 3626, pp. 1-75, Internet Engineering Task Force, http://tools.ietf.org/rfc/rfc3626.txt, Oct. 2003.
Colton, R., et al, "OSPF for IPv6", RFC 2740, pp. 1-80, Internet Engineering Task Force, http:fftools.ietf.org.rfc/rfc2740.txt, Dec. 1999.
Crabbe et al., "PCEP Extensions for MPLS-TE LSP Protection With Stateful PCE Draft-Crabbe-PCE-Stateful-PCE-Protection-00," Network Working Group, Internet-Draft, Oct. 2012, pp. 1-12.
Crabbe et al., "PCEP Extensions for MPLS-TE LSP Protection With Stateful PCE Draft-Crabbe-PCE-Stateful-PCTProtection-04," Network Working Group, Internet-Draft, May 8, 2013, pp. 1-54.
Crabbe et al., Stateful PCE Extensions for MPLS-TE LSPs, draft-crabbe-pce-stateful-pce-mpls-te-00, Network Working Group, Internet-Draft, Oct. 15, 2012, pp. 1-15.

(56) References Cited

OTHER PUBLICATIONS

Crabbe et al., "Stateful PCE Extensions for MPLS-TE LSPs," draft-crabbe-pce-statement-pce-mpls-te-01, Network Working Group, Internet-Draft, May 8, 2013, pp. 1-11.
Deering et al., "Internet Protocol, Version 6 (1Pv6) Specification," Cisco, Network Working Group, Request for Comments 2460, Dec. 1998, pp. 1-39.
Deering, S, et al, "Internet Protocol, Version 6, (IPv6) Specification", RFC 2460, pp. 1-39, Internet Engineering Task Force (IEFT), http://tools.iefl.org/rfc/rfc2460. txt, Dec. 1998.
Deering, S. (ed)., "ICMP Router Discovery Messages", RFC 1256, pp. 1-19, Internet Engineering Task Force, http://tools. ielf. org/rfc/rfc1256. !xi, Sep. 1991.
Deering, S. et al, "IPv6 Scoped Address Architecture" RFC 4007, Network Working Group, Mar. 2005, 24 pages.
Dragos Niculescu, "Survey of Active Network Research", Retrieved on Jul. 22, 2004, Jul. 1999, pp. 1-13.
Eckert et al., "Traffic Engineering for Bit Index Explicit Replication BIER-TE, draft-eckert-bier-te-arch-01," Network Working Group, Internet-Draft, Jul. 5, 2015, pp. 1-23.
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Estrin, D. et al, "A Unified Approach to Inter-Domain Routing", RFC 1322, pp. 1-38, Internet Engineering Task Force, http://lools.ielf.org/rfc/rfc1322.lxl, May 1992.
Estrin, D. et al, "Source Demand Routing: Packet Format and Forwarding Specification (Version 1 ).", RFC 1940, pp. 1-27, Internet Engineering Task Force, http://lools.ielf.org/rfc/rfc1940.lxl, May 1996.
Farinacci et al., "Generic Routing Encapsulation (GRE)," Network Working Group, RFC 2784, Standards Track, Mar. 2000, 9 pages; https://tools.ietf.org/pdf/rfc2784.pdf.
Farrel et al., "A Path Computation Element (PCE)—Based Architecture," Old Dog Consulting, Network Working Group, Request for Comments 4655, Aug. 2006, pp. 1-80.
Farrel et al., "Inter-Domain MPLS and GMPLS Traffic Enginerring—Resource Reservation Protocol-Traffic Enginerring (RSVP-TE) Extensions," Old Dog Consulting, Newtork Working Group, Request for Comments 5151, Feb. 2008, pp. 1-25.
Farrel, "Path Computation Element," Presentation, 11th Annual International Conference on Next Generation Internet and Related Technologies MPLS 2008, Oct. 19-22, 2008, 57 pages.
Fedyk et al., "Generalized Multiprotocol Label Switching (GMPLS) Control Ethernet Provider Backbone Traffic Engineering (PBB-TE)," Alcatel-Lucent, Internet Engineering Task Force (IETF), Request for Comments 6060, Mar. 2011, pp. 1-20.
Johnson, D., et al, "The Dynamic Source Routing Protocol (DSR) for Mobile Ad Hoc Networks for IPv4", RFC 4728, pp. 1-107, Internet Engineering Task Force, http://lools.ielf.org/rfc/rfc4728.lxl, Feb. 2007.
Kent et al., "Security Architecture for the Internet Protocol," Network Working Group, RFC 4301, Standards Track, Dec. 2005, 101 pages; https://tools.ietf.org/pdf/rfc4301.pdf.
Kettaf, N., et al, "Admission Control enabled On demand Routing (ACOR)", drafl-kettaf-manet-acor-03.txt pp. 1-24, Internet Engineering Task Force,http://tools.ietf.org/html/draft-kettaf-manet-acor-03.txt, Oct. 2007.
Kompella et al, "Label Switched Paths (LSP) Hierarchy with Generalized Multi-Protocol Label Switching (GMPLS) Traffic Enginerring (TE)," Juniper Networks, Network Working Group, Request for Comments 4206, Oct. 2005, pp. 1-14.
Kompella et al., "Detecting Multi-Protocol Label Switched (MPLS) Data Plane Failures," Juniper Networks, Inc., Network Working Group, Request for Comments 4379, Feb. 2006, pp. 1-50.
Kompella et al., "Virtual Private LAN Service (VPLS) Using BGP for Auto-Discovery and Signaling," Network Working Group, Request for Comments 4761, Juniper Networks, Jan. 2007, pp. 1-28.
Kumar et al., "Label Switched Path (LSP) Ping/Trace for Segment Routing Networks Using MPLS Dataplane," Cisco Systems, Inc., draft-kumar-mpls-spring-lsp-ping-00, Oct. 21, 2013, pp. 1-12.
Kumar et al., "Label Switched Path (LSP) Ping/Trace for Segment Routing Networks Using MPLS Dataplane," draft-ietf-mpls-spring-lsp-ping-00, Network Work Group, Internet Draft, May 10, 2016, 17 pages.
Kumar et al., "Label Switched Path (LSP) Ping/Trace for Segment Routing Networks Using MPLS Dataplane," draftkumarkini-mpls-spring-lsp-ping-00, Network Work Group, Internet-Draft, Jan. 2, 2014, pp. 1-15.
Kumar et al., "OAM Requirements for Segment Routing Network," draft-kumar-spring-sr-oam-requirement-00, Spring, Internet-Draft, Feb. 14, 2014, 6 pages.
Kumar et al., "OAM Requirements for Segment Routing Network," draft-kumar-spring-sr-oam-requirement-01, Spring; Internet-Draft, Jul. 1, 2014, 6 pages.
Kumar et al., "OAM Requirements for Segment Routing Network," draft-kumar-spring-sr-oam-requirement-02, Spring, Internet-Draft, Dec. 31, 2014, 6 pages.
Kumar et al., "OAM Requirements for Segment Routing Network," draft-kumar-spring-sr-oam-requirement-03, Spring, Internet-Draft, Mar. 9, 2015, 6 pages.
Li et al., "IS-IS Extensions for Traffic Engineering," Redback Networks, Inc., Network Working Group, Request for Comments 5305, Oct. 2008, 17 pages.
Li, T. (ed), "Recommendataion for a Routing Architecture", RFC 6115, pp. 1-73, Internet Engineering Task Force, http:/ftools.ietf.org/rfc/rfc6115.txt, Feb. 2011.
Lougheed, K., et al, (ed.),"A Border Gateway Protocol 3 (BGP-3)", RFC 1267, pp. 1-35, Internet Engineering Task Force, http://tools.ietf.org/rfc/rfc1267.txt, Oct. 1991.
Mahalingam et al., "Virtual eXtensible Local Area Network (VXLAN): A Framework for Overlaying Virtualized Layer 2 Networks over Layer 3 Networks," Network Working Group, RFC 7348, Aug. 2014, 22 pages; https://tools.ietf.org/pdf/rfc7348.pdf.
Metaswitch Networks, "PCE—An Evolutionary Approach to SDN," Metaswitch Networks White Paper, 2010, 21 pages; http://www.metaswitch.com/sites/default/files/metaswitch-white-paper-pce-an-evolutionary-approach-to-sdn.pdf.
Moy, J, "OSPF Version 2", RFC 2328, pp. 1-13, Internet Engineering Task Force, http://tools.ietf.org/rfc/rfc2328.txt, Oct. 1991.
Neumann, A., et al, "Better Approach to Mobile Ad-hoc Netvvorking (BAT.MAN.)", draft-wunderlich-openmesh- manet-routing-00. txt pp. 1-24, Internet Engineering Task Force,http://tools.ietf.org/html/drafl-wunderlich-openmesh-manet-routing-003.txt, Apr. 2008.
NOA_mailed_Aug. 22, 2019_for U.S. Appl. No. 16/153,262.
NOA_mailed_Aug. 26, 2019_for U.S. Appl. No. 16/153,114.
Non-Final Rejection filed Apr. 17, 2019 for U.S. Appl. No. 16/195,832.
Non-Final Rejection dated Apr. 4, 2019 for U.S. Appl. No. 16/153,114.
Non-Final Rejection dated May 6, 2019 for U.S. Appl. No. 16/264,580.
Non-Final Rejection dated May 15, 2019 for U.S. Appl. No. 16/181,286.
Non-Final Rejection dated Jun. 10, 2019 for U.S. Appl. No. 16/296,195.
Non-Final Rejection dated Jun. 14, 2019 for U.S. Appl. No. 16/269,524.
Non-Final Rejection dated Jul. 31, 2019 for U.S. Appl. No. 16/454,040.
Non-Final Rejection dated Aug. 1, 2019 for U.S. Appl. No. 16/454,030.
Non-Final Rejection dated Aug. 1, 2019 for U.S. Appl. No. 16/454,043.
Non-Final_Rejection_dated Sep. 12, 2019 for U.S. Appl. No. 16/195,823.
Notice of Allowance filed Mar. 29, 2019 for U.S. Appl. No. 16/101,382.
Notice of Allowance filed Mar. 29, 2019 for U.S. Appl. No. 16/101,387.
Notice of Allowance filed Apr. 17, 2019 for U.S. Appl. No. 16/153,146.
Notice of Allowance filed Apr. 19, 2019 for U.S. Appl. No. 16/195,816.
Notice of Allowance filed Apr. 12, 2019 for U.S. Appl. No. 16/101,386.
Notice of Allowance dated Mar. 1, 2019 for U.S. Appl. No. 15/961,826.

(56) References Cited

OTHER PUBLICATIONS

Notice of Allowance dated Mar. 7, 2019 for U.S. Appl. No. 15/961,832.
Notice of Allowance dated Mar. 27, 2019 for U.S. Appl. No. 15/961,828.
Notice of Allowance dated Apr. 17, 2019 for U.S. Appl. No. 16/153,146.
Notice of Allowance dated Apr. 19, 2019 for U.S. Appl. No. 16/195,816.
Notice of Allowance dated Apr. 25, 2019 for U.S. Appl. No. 16/153,223.
Notice of Allowance dated Apr. 29, 2019 for U.S. Appl. No. 16/153,196.
Notice of Allowance dated Apr. 30, 2019 for U.S. Appl. No. 15/961,826.
Notice of Allowance dated May 16, 2019 for U.S. Appl. No. 16/153,262.
Notice of Allowance dated May 17, 2019 for U.S. Appl. No. 16/153,050.
Notice of Allowance dated May 22, 2019 for U.S. Appl. No. 16/101,382.
Notice of Allowance dated May 24, 2019 for U.S. Appl. No. 16/101,387.

* cited by examiner

ROUTING METHODS, SYSTEMS, AND COMPUTER PROGRAM PRODUCTS

RELATED APPLICATIONS

The present application is a continuation of and claims priority to U.S. application Ser. No. 16/454,043 filed Jun. 26, 2019 and entitled "ROUTING METHODS, SYSTEMS, AND COMPUTER PROGRAM PRODUCTS" which, in turn, is a continuation of and claims priority to U.S. application Ser. No. 16/195,827 filed Nov. 19, 2018 and entitled "ROUTING METHODS, SYSTEMS, AND COMPUTER PROGRAM PRODUCTS" which, in turn, is a continuation of and claims priority to U.S. application Ser. No. 16/181,286 filed Nov. 5, 2018 and entitled "ROUTING METHODS, SYSTEMS, AND COMPUTER PROGRAM PRODUCTS" which, in turn, is a continuation of and claims priority to U.S. application Ser. No. 14/274,632 filed May 9, 2014 and entitled "Methods, Systems, and Computer Program Products for Associating a Name with a Network Path" which, in turn, is a continuation-in-part of and claims priority to: U.S. application Ser. No. 13/727,647 filed Dec. 27, 2012 and entitled "Methods, Systems, and Computer Program Products for Identifying a Protocol Address based on Path Information," U.S. application Ser. No. 13/727,649 filed Dec. 27, 2012 and entitled "Methods, Systems, and Computer Program Products for Assigning an Interface Identifier to a Network Interface," U.S. application Ser. No. 13/727,651 filed Dec. 27, 2012 and entitled "Methods, Systems, and Computer Program Products for Routing Based on a Nested Protocol Address," U.S. application Ser. No. 13/727,652 filed Dec. 27, 2012 and entitled "Methods, Systems, and Computer Program Products for Routing Based on a Scope-Specific Address," U.S. application Ser. No. 13/727,653 filed Dec. 27, 2012 and entitled "Methods, Systems, and Computer Program Products for Identifying a Protocol Address in a Scope-Specific Address Space," U.S. application Ser. No. 13/727,655 filed Dec. 27, 2012 and entitled "Methods, Systems, and Computer Program Products for Determining a Shared Identifier for a Hop in a Network," U.S. application Ser. No. 13/727,657 filed Dec. 27, 2012 and entitled "Methods, Systems, and Computer Program Products for Determining a Protocol Address For a Node," and U.S. application Ser. No. 13/727,662 filed Dec. 27, 2012 and entitled "Methods, Systems, and Computer Program Products for Routing Based on a Path-Based Protocol Address," where U.S. application Ser. No. 14/274,632 further claims priority to U.S. Provisional Application No. 61/822,978 filed May 14, 2013 and entitled "Methods, Systems, and Computer Program Products For Transmitting Data Via A Scope-Specific Protocol Address," U.S. Provisional Application No. 61/822,386 filed May 12, 2013 and entitled "Methods, Systems, and Computer Program Products For Associating a Name With a Network Path," U.S. Provisional Application No. 61/897,234 filed Oct. 30, 2013 and entitled "Methods, Systems, and Computer Program Products For Transmitting Data Via A Variable Length Protocol Address," U.S. Provisional Application No. 61/830,064 filed Jun. 1, 2013 and entitled "Methods, Systems, and Computer Program Products For Adjusting A Separator Field For A Protocol Address," U.S. Provisional Application No. 61/831,932 filed Jun. 6, 2013 and entitled "Methods, Systems, and Computer Program Products for Source Routing," and U.S. Provisional Application No. 61/833,565 filed Jun. 11, 2013 and entitled "Methods, Systems, and Computer Program Products For Changing Protocol Address By A Network Relay," the entire contents of all of the above are herein incorporated by reference.

BACKGROUND

It is unlikely that the designers of the early network, which is referred to as the "Internet" expected it to become as large as it has become. The fact that the global Internet Protocol (IP) address space for 32-bit addresses has been fully allocated is evidence of this. As the Internet grows, new problems will arise and some current problems are getting worse. For example, while network speeds and bandwidth are increasing, so are causes of network latency.

The Internet Engineering Task Force (IETF) has taken steps at various times in the past and are presently taking steps to address a number of problems resulting from the Internet's growth. Problems addressed by the IETF are described in a number of "Request for Comments" (RFC) documents published by the IETF. Documents referenced herein and included by reference include: "Request for Comments" (RFC) document RFC 791 edited by J. Postel, titled "Internet Protocol, DARPA Internet Protocol Specification", published by the IETF in September, 1981; "Request for Comments" (RFC) document RFC 1519 by V. Fuller, et al, titled "Classless Inter-Domain Routing (CIDR): An Address Assignment and Aggregation Strategy", published by the Internet Engineering Task Force (IEFT), in June, 1999; "Request for Comments" (RFC) document RFC 2460 by S. Deering, et al, titled "Internet Protocol, Version 6, (IPv6) Specification", published by the IETF in December, 1998; "Request for Comments" (RFC) document RFC 3513 by R. Hinden, et al, titled "Internet Protocol Version 6 (IPv6) Addressing Architecture", published by the IETF in April, 2003; and "Request for Comments" (RFC) document RFC 2374 by R. Hinden, et al, titled ""Aggregatable Global Unicast Address Format", published by the IETF in July, 1998.

RFC 791 states, "The internet protocol implements two basic functions: addressing and fragmentation". RFC 791 goes on to state, "A distinction is made between names, addresses, and routes. A name indicates what we seek. An address indicates where it is. A route indicates how to get there. The internet protocol deals primarily with addresses. It is the task of higher level (i.e., host-to-host or application) protocols to make the mapping from names to addresses. The internet module maps internet addresses to local net addresses. It is the task of lower level (i.e., local net or gateways) procedures to make the mapping from local net addresses to routes".

As demonstrated in the RFCs listed above, addressing has been a source of a number of problems. In order to address a number of current and future problems facing the Internet, the subject matter described herein challenges the distinctions asserted in RFC 791 between and among names, addresses, and routes.

Accordingly, there exists a need for methods, systems, and computer program products for routing based on a path-based protocol address.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a method and apparatus are configured for receiving information that identifies an explicit path from a first node to a second node in a communications network, wherein the information comprises an identification of a sequence of nodes or links defining the explicit path for a packet to traverse through the communications network; generating a set of segment identifiers, wherein the set of segment identifiers encodes the explicit path, each segment identifier within the set of segment identifiers is included in one or more respective segment routing forwarding tables stored at each node along the explicit path, and generating the set of segment identifiers comprises selecting a segment identifier type from among a nodal segment identifier type in which a nodal segment identifier is assigned uniquely to a single node within the network, or an adjacency segment identifier type in which an adjacency segment identifier is assigned to a link between two contiguous nodes; and storing the set of segment identifiers at the first node, wherein the first node is configured to add the set of segment identifiers to a header of the packet.

In one embodiment, a system and method are provided for generating segment routing (SR) segment lists. In one embodiment, a node receives information that identifies a path from a first node to a second node. Based on the received path, a set of segment identifiers that encodes the path is generated. A packet that is forwarded along the set of segment identifiers travels the received path.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
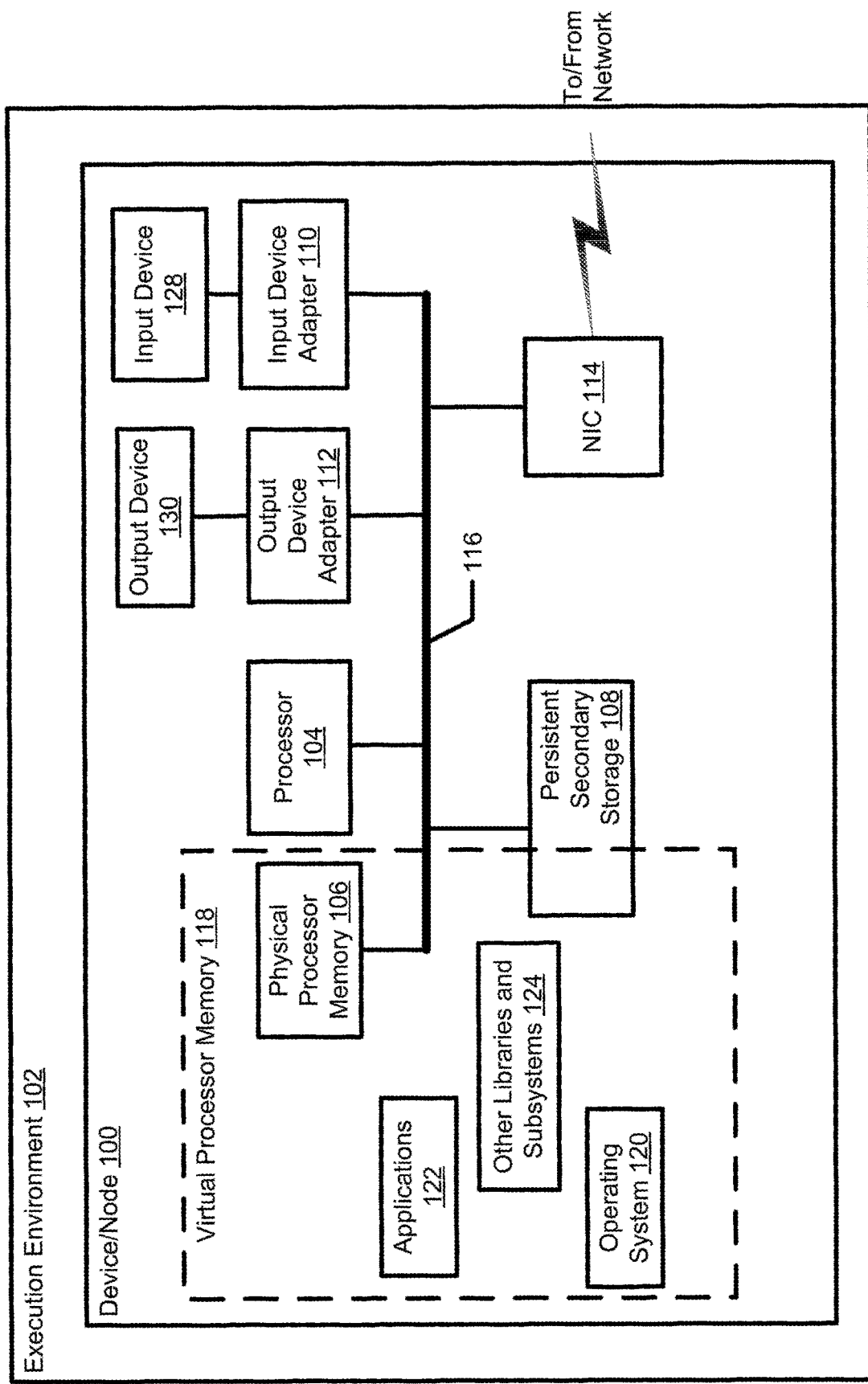
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

The use of "including", "comprising", "having", and variations thereof are meant to encompass the items listed thereafter and equivalents thereof as well as additional items and equivalents thereof. Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided to", "received from", "identified to", "interoperated" and similar terms and their variants.

As used herein, any reference to an entity "in" an association is equivalent to describing the entity as "included in and/or identified by" the association, unless explicitly indicated otherwise.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety. In case of conflict, the present disclosure, including definitions, will control. In addition, the materials, methods, and examples are illustrative only and not intended to be limiting.

An exemplary device included in an execution environment that may be programmed, adapted, modified, and/or otherwise configured according to the subject matter is illustrated in FIG. 1. An "execution environment", as used herein, is an arrangement of hardware and, in some aspects, software that may be further modified, transformed, and/or otherwise configured to include and/or otherwise host an arrangement of components to perform a method of the subject matter described herein. An execution environment includes and/or is otherwise provided by one or more devices. The execution environment is said to be the execution environment "of" the device and/or devices. An execution environment may be and/or may include a virtual execution environment including software components operating in a host execution environment. Exemplary devices included in and/or otherwise providing suitable execution environments that may be adapted, programmed, and/or otherwise modified according to the subject matter include a workstation, a desktop computer, a laptop or notebook computer, a server, a handheld computer, a mobile telephone or other portable telecommunication device, a media playing device, a gaming system, a tablet computer, a portable electronic device, a handheld electronic device, a multiprocessor device, a distributed system, a consumer electronic device, a router, a network server, or any other type and/or form of computing, telecommunications, network, and/or media device that is suitable to perform the subject matter described herein. Those skilled in the art will understand that the components illustrated in FIG. 1 are exemplary and may vary by particular execution environment.

FIG. 1 illustrates a hardware device 100 included in an execution environment 102. FIG. 1 illustrates that execution environment 102 includes a processor 104, such as one or more microprocessors; a physical processor memory 106 including storage locations identified by addresses in a physical memory address space of processor 104; a persistent secondary storage 108, such as one or more hard drives and/or flash storage media; an input device adapter 110, such as a key or keypad hardware, a keyboard adapter, and/or a mouse adapter; an output device adapter 112, such as a display and/or an audio adapter to present information to a user; a network interface component, illustrated by a network interface adapter 114, to communicate via a network such as a LAN and/or WAN; and a mechanism that operatively couples elements 104-114, illustrated as a bus 116. Elements 104-114 may be operatively coupled by various means. Bus 116 may comprise any type of bus architecture, including a memory bus, a peripheral bus, a local bus, and/or a switching fabric.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs). Processor 104 may access instructions and data via one or more memory address spaces in addition to the physical memory address space. A memory address space includes addresses identifying locations in a processor memory. The addresses in a memory address space are included in defining a processor memory. Processor 104 may have more than one processor memory. Thus, processor 104 may have more than one memory address space. Processor 104 may access a location in a processor memory by processing an address identifying the location. The processed address may be identified by an operand of an instruction and/or may be identified by a register and/or other portion of processor 104.

FIG. 1 illustrates a virtual processor memory 118 spanning at least part of physical processor memory 106 and may span at least part of persistent secondary storage 108. Virtual memory addresses in a memory address space may be mapped to physical memory addresses identifying locations in physical processor memory 106. An address space including addresses that identify locations in a virtual processor memory is referred to as a "virtual memory address space"; its addresses are referred to as "virtual memory addresses"; and its processor memory is referred to as a "virtual processor memory" or "virtual memory". The term "processor memory" may refer to physical processor memory, such as processor memory 106, and/or may refer to virtual processor memory, such as virtual processor memory 118, depending on the context in which the term is used.

Physical processor memory 106 may include various types of memory technologies. Exemplary memory technologies include static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Ferroelectric RAM (FRAM), RAMBUS DRAM (RDRAM) Direct DRAM (DRDRAM), and/or XDR™ DRAM. Physical processor memory 106 may include volatile memory as illustrated in the previous sentence and/or may include non-volatile memory such as non-volatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include a removable data storage medium. The drives and their associated computer readable media provide volatile and/or nonvolatile storage for computer-executable instructions, data structures, program components, and other data.

Execution environment 102 may include software components stored in persistent secondary storage 108, in remote storage accessible via a network, and/or in a processor memory. FIG. 1 illustrates execution environment 102 including an operating system 120, one or more applications 122, and other program code and/or data components illustrated by other libraries and subsystems 124. In an aspect, some or all software components may be stored in locations accessible to processor 104 in a shared memory address space shared by the software components. The software components accessed via the shared memory address space may be stored in a shared processor memory defined by the shared memory address space. In another aspect, a first software component may be stored in one or more locations accessed by processor 104 in a first address space and a second software component may be stored in one or more locations accessed by processor 104 in a second address space. The first software component is stored in a first processor memory defined by the first address space and the second software component is stored in a second processor memory defined by the second address space.

Execution environment 102 may receive user-provided information via one or more input devices illustrated by an input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding network interfaces such as a serial port, a parallel port, and/or a universal serial bus (USB) port. Input device adapter 110 may receive input and provide a representation to bus 116 to be received by processor 104, physical processor memory 106, and/or other components included in execution environment 102.

An output device 130 in FIG. 1 exemplifies one or more output devices that may be included in and/or that may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. FIG. 1 illustrates network interface adapter (NIA) 114 as a network interface component included in execution environment 102 to operatively couple device 100 to a network. A network interface component includes a network interface hardware (NIH) component and optionally a network interface software (NIS) component. Exemplary network interface components include network interface controllers, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., AMPS, TDMA, CDMA, GSM, GPRS UMTS, and/or PCS network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component to operatively couple the device to a network. Further, the terms "device" and "node" used herein refer to one or more devices and nodes, respectively, providing and/or otherwise included in an execution environment unless clearly indicated otherwise.

As used herein, the term "network protocol" refers to a set of rules, conventions, and/or schemas that govern how nodes exchange information over a network. The set may define, for example, a convention and/or a data structure. The term "network path" as used herein refers to a sequence of nodes in a network that are communicatively coupled to transmit data in one or more data units of a network protocol between a pair of nodes in the network.

A "data unit", as the term is used herein, is an entity specified according to a network protocol to transmit data between a pair of nodes in a network path to send the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node and a payload portion to include a representation of data to be delivered to the identified destination node.

Various address types are specified defining a vocabulary for one or more address portions of an IP data unit. The terms "data unit", "frame", "data packet", and "packet" are used interchangeably herein. One or more data units of a first network protocol may transmit a "message" of a second network protocol. For example, one or more data units of the IP protocol may include a TCP message. In another example, one or more TCP data units may transmit an HTTP message. A message may be empty.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint that may be represented in a data unit of the network protocol. For example, 192.168.1.1 is an IP protocol address represented in a human readable format that may be represented in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

Since a protocol endpoint is included in a node and is accessible via a network via a network interface, a protocol address identifies a node and identifies a network interface of the node. A network interface may include one or more NICs operatively coupled to a network.

A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

The term "hop" as used herein refers to a pair of consecutive nodes in a network path to transmit, via a network protocol, data sent from a source node to a destination node. A "hop path" is thus a sequence of hops in a network that respectively include a sequence of pairs of consecutive nodes included in transmitting data from a first path end node of the network path to a second path end node of the network path.

The term "path-based protocol address" as used herein refers to a protocol address for a network protocol that includes one or more path segment identifiers that identify one or more respective portions of a network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of interface identifiers that identify a sequence of network interfaces in a network path. A "NIC-based protocol address" is a type of network-interface-based protocol address that includes a plurality of identifiers that identify a sequence of network interface components. A "hop-based protocol address" is a type path-based protocol address since a hop is a type of network path.

Given the above definitions, note that the terms "network path" and "hop" may be defined in terms of network interfaces. A "network path" and a "hop path" include a sequence of network interfaces in a network that are included in transmitting data between a pair of path end nodes in the network. A "hop" refers to at least part of a network path that includes a pair of consecutive network interfaces in a sequence of network interfaces in a network path. A "network path" is thus a sequence of hops in a network that respectively includes a sequence of pairs of consecutive network interfaces included in transmitting data from a first path end node of the network path to a second path end node of the network path.

The term "network topology" or "topology", for short, as used herein refers to a representation of protocol endpoints and/or nodes in a network, and representations of hops representing communicative couplings between and/or among the protocol endpoints and/or nodes in the network. A network may have different network topologies with respect to different network protocols. A network topology may represent physical communicative couplings between nodes in the network. A network topology may represent logical couplings between protocol endpoints and/or nodes of a particular network protocol or a particular type of network protocol.

The domain name system (DNS) of the Internet operates based on an application layer protocol defined by the DNS. The nodes in the DNS are communicatively coupled via the DNS protocol and may be represented by a logical network topology. A DNS system includes nodes connected via the DNS protocol. The DNS system has a network topology defined by nodes that include protocol endpoints of the DNS protocol. In still another example, a token-ring network has a circular topology at the link layer but may have a star topology at the physical layer.

As used herein, an "entity-specific address space" refers to an address space defined for a specific entity where the addresses in the address space operate as identifiers in the context of the entity. An address from an entity-specific address space is referred to herein as an "entity-specific address". An address is "entity-specific" in that what it identifies is based on the entity to which it is specific. Another address having the same form and content may identify a different entity when in an address space specific to another entity. Addresses in an entity-specific address space operate as identifiers in the context of an entity to which they are "specific" as defined by the specific association of the address space and the entity. Without knowledge of the entity to which an entity-specific address space is specific, what an address in the entity-specific address space identifies is indeterminate. The terms "entity-specific address" and "entity-specific identifier" are used interchangeably herein. An entity-specific address may identify an entity included in the entity to which the address is specific or may identify an entity external to the entity to which the address is specific. The fact that an address is entity-specific does not define a scope for the address.

A portion of a network is a type of entity. A type of entity-specific address space described herein is a scope-specific address space. As used herein, a "scope-specific address space", specific to a particular region of a network, is an address space defined for the particular network region, where an address in the scope-specific protocol address operates as identifier, according to a network protocol, of a protocol endpoint in a node outside of the particular region when processed in the context of a node in the particular region. The region is indicated by the span of an indicated scope. The terms "region" and "zone" are used interchangeably herein. An address from a scope-specific address space is referred to herein as a "scope-specific protocol address". An address is "scope-specific" in that what protocol endpoint it identifies depends on the region to which it is specific. Another address having the exact same form and content may identify a different protocol endpoint when in an address space that is specific to another region. A protocol address in a scope-specific address space serves as an identifier in the context of a node in a region to which the scope-specific address space is "specific" as defined by an association of the address space and the region indicated by the scope. Without knowledge of the particular region to which a scope-specific address space is specific, what a scope-specific protocol address in the scope-specific address space identifies is indeterminate. The terms "scope-specific protocol address" and "scope-specific protocol identifier" are used interchangeably herein. Types of scope-specific address spaces indicating exemplary spans include site-specific, LAN-specific, subnet-specific, city-specific, business-specific, and node-specific.

For a network protocol, an address in a scope-specific address space serves as an identifier of a protocol endpoint in a node. Data may be received via the protocol endpoint from a network via one or more network interfaces that operatively couple the node to the network. Data may be sent via the protocol endpoint to transmit over the network via the one or more network interfaces in the node. Since a protocol endpoint of a network protocol is included in a node and is accessible via a network via a network interface, a protocol address identifying the protocol endpoint also identifies the node and identifies a network interface of the node.

As used herein, a "node-specific address space" is a scope-specific address space defined for a specific node in a network, where the addresses in the node-specific address space operate as identifiers of nodes and/or network interfaces in the network when processed in the context of the specific node. An address from a node-specific address space is referred to herein as a "node-specific address". An address is "node-specific" in that what it identifies depends on the node to which is defined as specific. Another address having the exact same form and content may identify a different node when in an address space specific to another node. Addresses in a node-specific address space operate as identifiers in the context of a node to which they are "specific" as defined by the specific association of the address space and the node. Without knowledge of the node to which a node-specific address space is specific, addresses in the node-specific address space are indeterminate. The terms "node-specific address" and "node-specific identifier" are used interchangeably herein. A node-specific address space is a type of scope-specific address space.

The term "node" is defined above. Note that an identifier of a network interface in a network also identifies a node that includes the network interface. Thus, a network interface-specific address is also a node-specific address. Network interfaces in a node may have their own respective network interface-specific address spaces that are also node-specific. The network interface-specific address spaces may be combined to form a node-specific address space and/or may be managed as separate address spaces. The adjectives "node-specific" and "network interface-specific" may be used interchangeably.

A scope-specific identifier differs from a scoped address as described in "Request for Comments" (RFC) document RFC 4007 by S. Deering, et al, titled "IPv6 Scoped Address Architecture", published by the IETF in December, 2006 and further described in application Ser. No. 11/962,285, by the present inventor, filed on 2007 Dec. 21, entitled "Methods and Systems for Sending Information to a zone Included in an Internet Network". A scoped address space is shared by nodes in a given scope. While a link-local scoped address is specific to a particular node, a link-local scoped address simply identifies a network interface component local to the particular node. A loop-back internet address is specific to a node as well. Neither link-local scoped addresses nor loop-back addresses identify one node to another. As such, neither serves as a node-specific identifier as defined above.

A "scoped address" is described by RFC 3513 and RFC 4007 as an identifier that, in a particular region of a network, serves as a protocol address of a network interface and/or a node in the particular region. The extent of the particular region is referred to as the scope of the region and thus the scope within which the identifier serves as a protocol address. A particular region included within a scope is indicated by its span. A scoped address is a valid protocol address only within a particular region as indicated by the address's indicated scope. Examples of scope indicators include node-scope where identifiers are valid only to a single node in the indicated span, LAN-scope where identifiers are valid for nodes in the span of a particular LAN, and subnet-scope where identifiers are valid only for nodes in a particular subnet. RFC 3513 currently defines support for link-local scope, site-local scope, and global scope. A data unit transmitted with a scoped address should not be delivered to node that does not have a network interface in the span indicated by the scope.

"Path information" is any information that identifies a network path and/or a hop path for data transmitted via one or more specified network protocols. Path information may be identified by identifying network interfaces, NICs, nodes, and/or hops included in a network path. "Address information" is any information that identifies a protocol address that, for a network protocol, identifies a protocol endpoint. Address information may identify a unicast protocol address for a network protocol. In identifying a protocol endpoint, a protocol address identifies a node and a network interface.

Those skilled in the art will understand upon reading the descriptions herein that the subject matter disclosed herein is not restricted to the network protocols described and/or their corresponding OSI layers. For ease of illustration, the subject matter is described in terms of protocols that correspond to OSI layer three, also referred to as network layer protocols, in general. Particular descriptions are based on versions of the Internet Protocol (IP). Address information may identify one or more protocol addresses. Exemplary protocol addresses include IP addresses, IPX addresses, DECNet addresses, VINES Internet Protocol addresses, and Datagram Delivery Protocol (DDP) addresses, HTTP URLS, TCP port and IP address pairs, and the like.

The term "path-based address" is defined above. A "node-based address" is a path-based address where some or all of the address includes node identifiers that identify a sequence of nodes in a network path. A "network-interface-based address" is a path-based address where some or all of the address includes identifiers of network interfaces in a sequence in a network path. A "NIC-based address" is a type of network-interface-based address that identifies a sequence of network interface components. A "hop-based address" is a path-based address where some or all of the address identifies one or more hops in a network path. The protocol address types defined are not mutually exclusive.

The term "metric space", as used herein, refers to a set, as defined in mathematics, where a distance between elements of the set is defined according to a metric. Metric spaces defined in Euclidean geometry are well-known examples. Those skilled in the art of metric spaces, such as Euclidian spaces, will appreciate that a one-to-one mapping may be determined and/or otherwise identified for mapping addresses from a first coordinate space having a first origin for a metric space to addresses from a second coordinate space having a second origin in the metric space. Given a mapping rule between a first scope-specific address space and a second scope-specific address space and a mapping between the second scope-specific address space and a third scope-specific address space based on a third coordinate space identifying a third origin in the metric space, a mapping from the first coordinate space to the third coordinate space may be determined. A mapping between coordinate spaces for a metric space may be included a coordinate shift and/or a rotation, for example. The mapping may be pre-specified and accessible to the nodes in one or both address spaces. Mapping between locations in a number of different metric spaces is well known in mathematics. For example, a top half of the surface of sphere may be mapped to a plane. Some will further appreciate that some metric spaces may be mapped to other metric spaces. Some of these mappings are one-to-one and/or onto.

Figure 2:
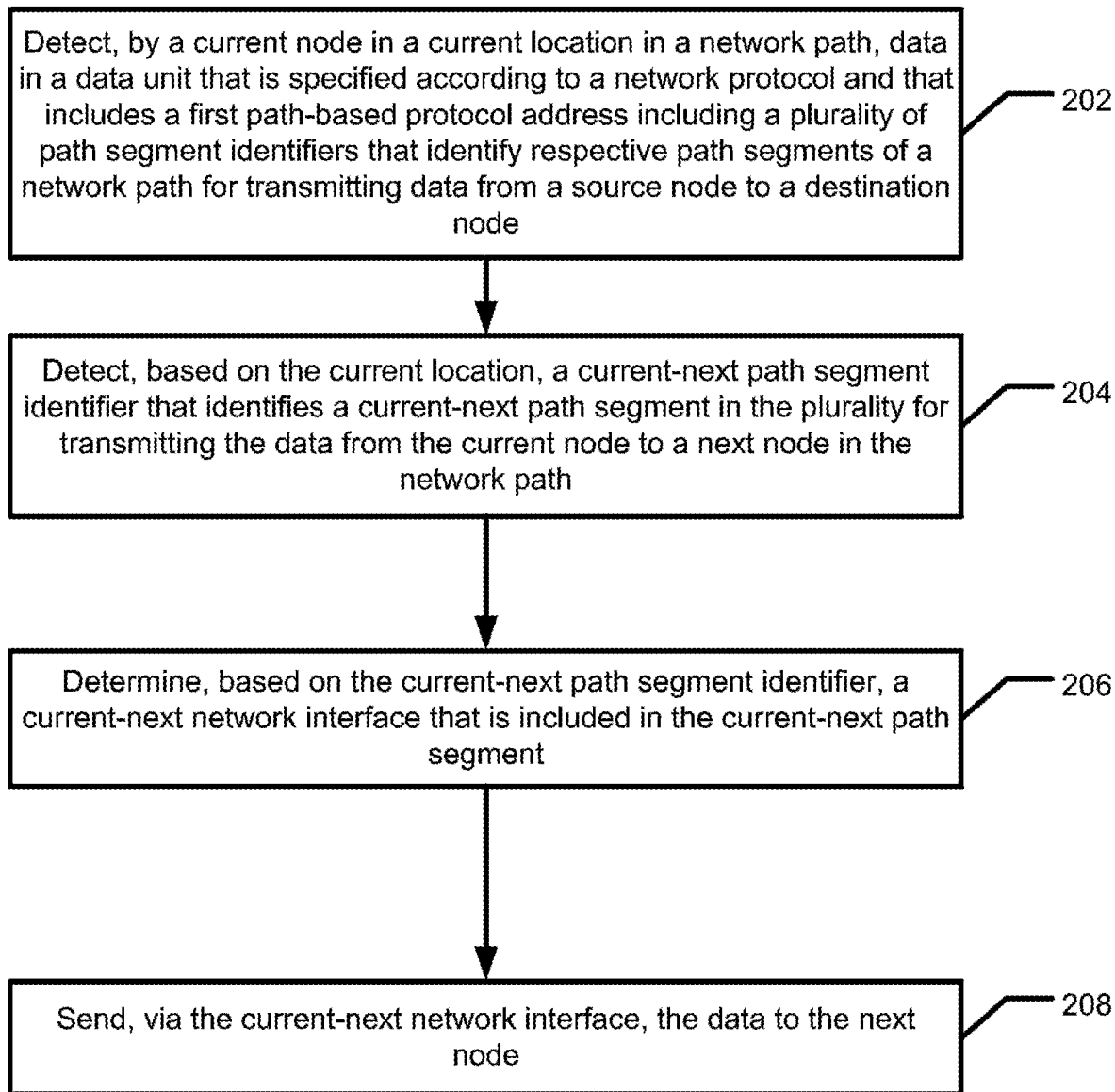
FIG. 2 is a flow diagram illustrating a method for routing based on a path-based protocol address according to an aspect of the subject matter described herein.
Figure 3:
FIG. 3 is a block diagram illustrating an arrangement of components for routing based on a path-based protocol address according to another aspect of the subject matter described herein.

FIG. 3 illustrates an arrangement of components in a system that operates in an execution environment, such as execution environment 102 in FIG. 1. The arrangement of components in the system operates to perform the method illustrated in FIG. 2. The system illustrated includes an in-data handler component 302, a routing component 304, a forwarding component 306, and an out-data handler component 308. The execution environment includes a processor, such as the processor 104, to process an instruction, during operation of the system, in at least one of the in-data handler component 302, the routing component 304, the forwarding component 306, and the out-data handler component 308.

Figure 4A:
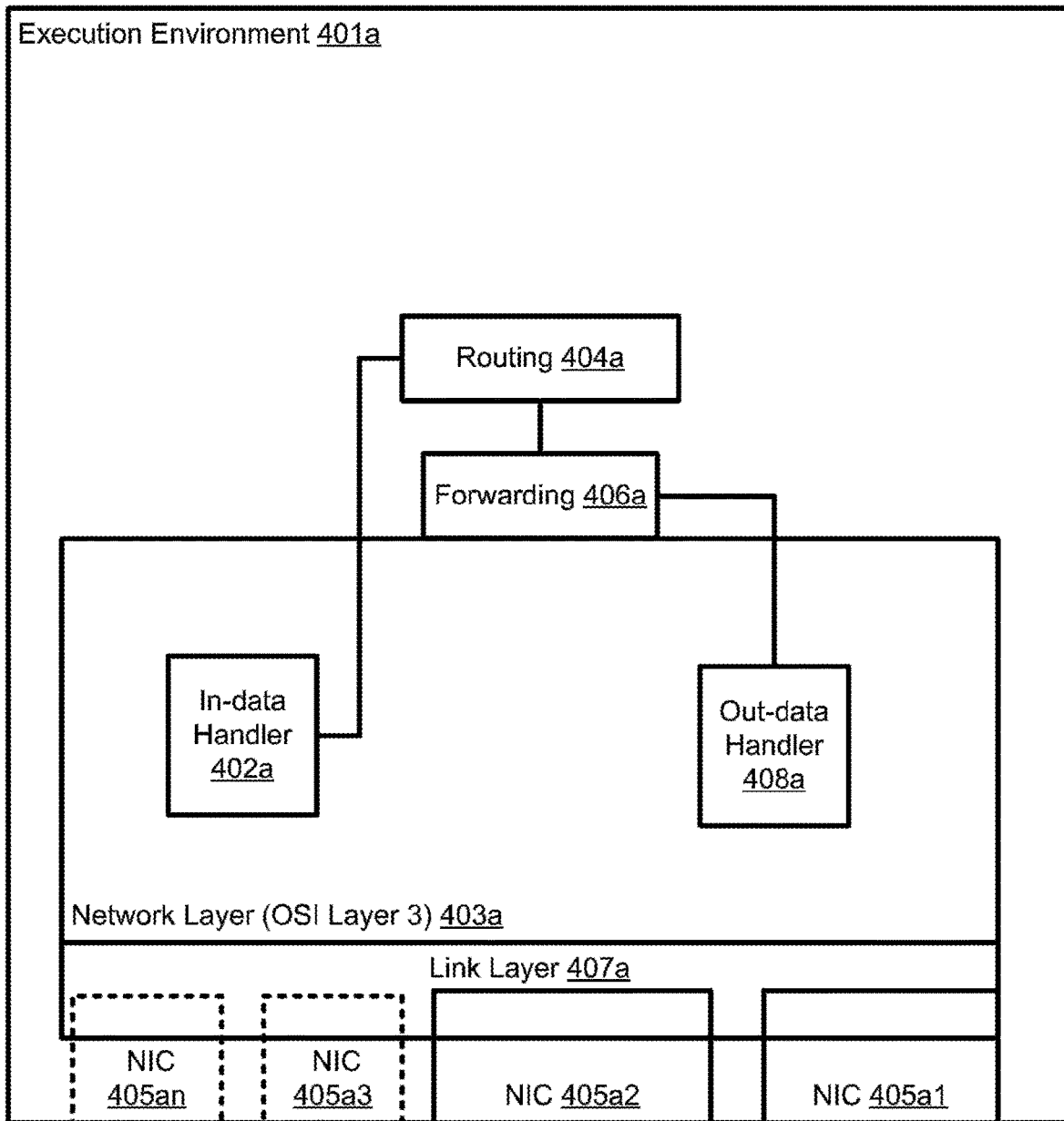
FIG. 4A is a block diagram illustrating an arrangement of components for routing based on a path-based protocol address according to another aspect of the subject matter described herein.
Figure 4B:
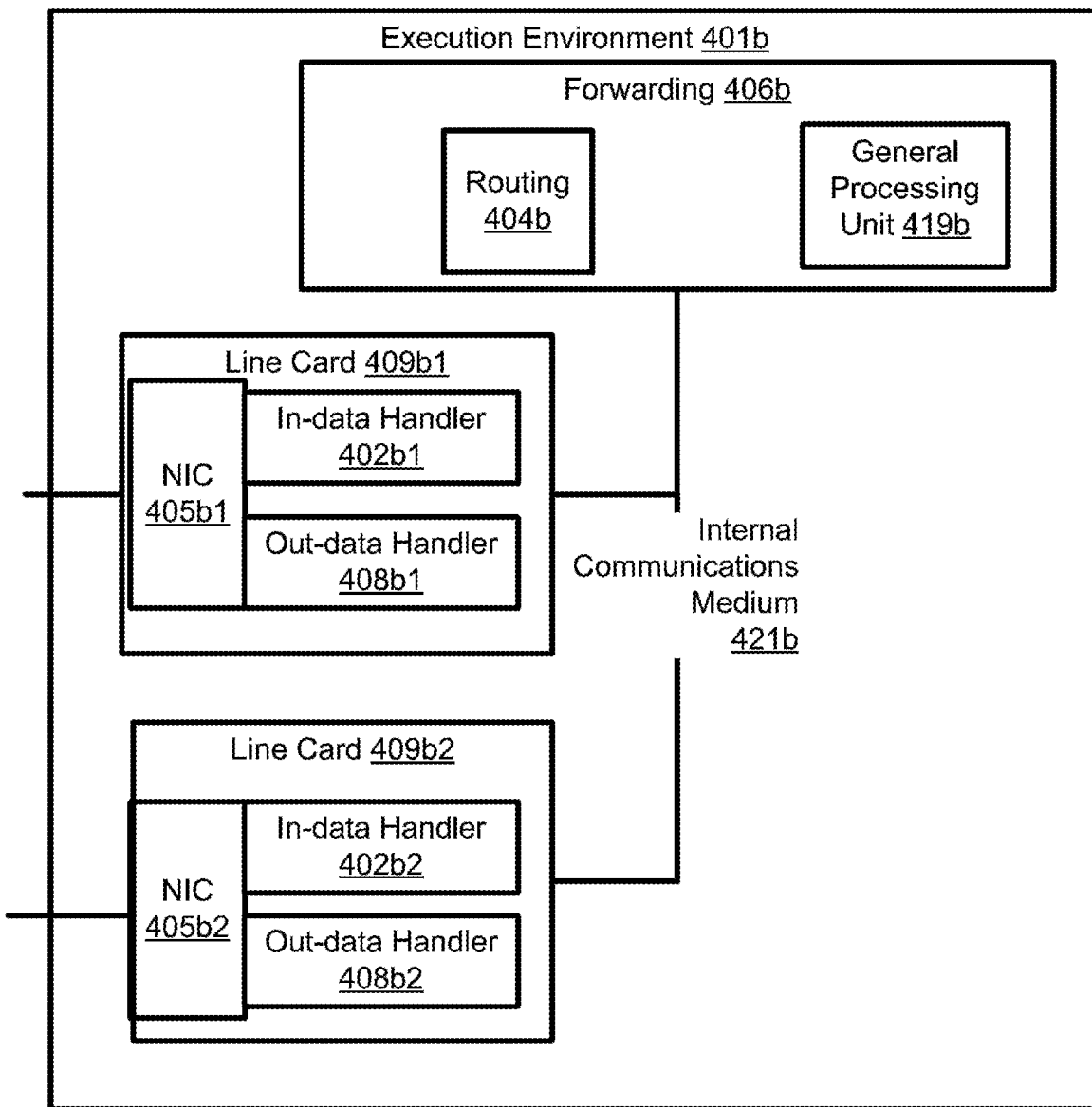
FIG. 4B is a block diagram illustrating an arrangement of components for routing based on a path-based protocol address according to another aspect of the subject matter described herein.
Figure 4C:
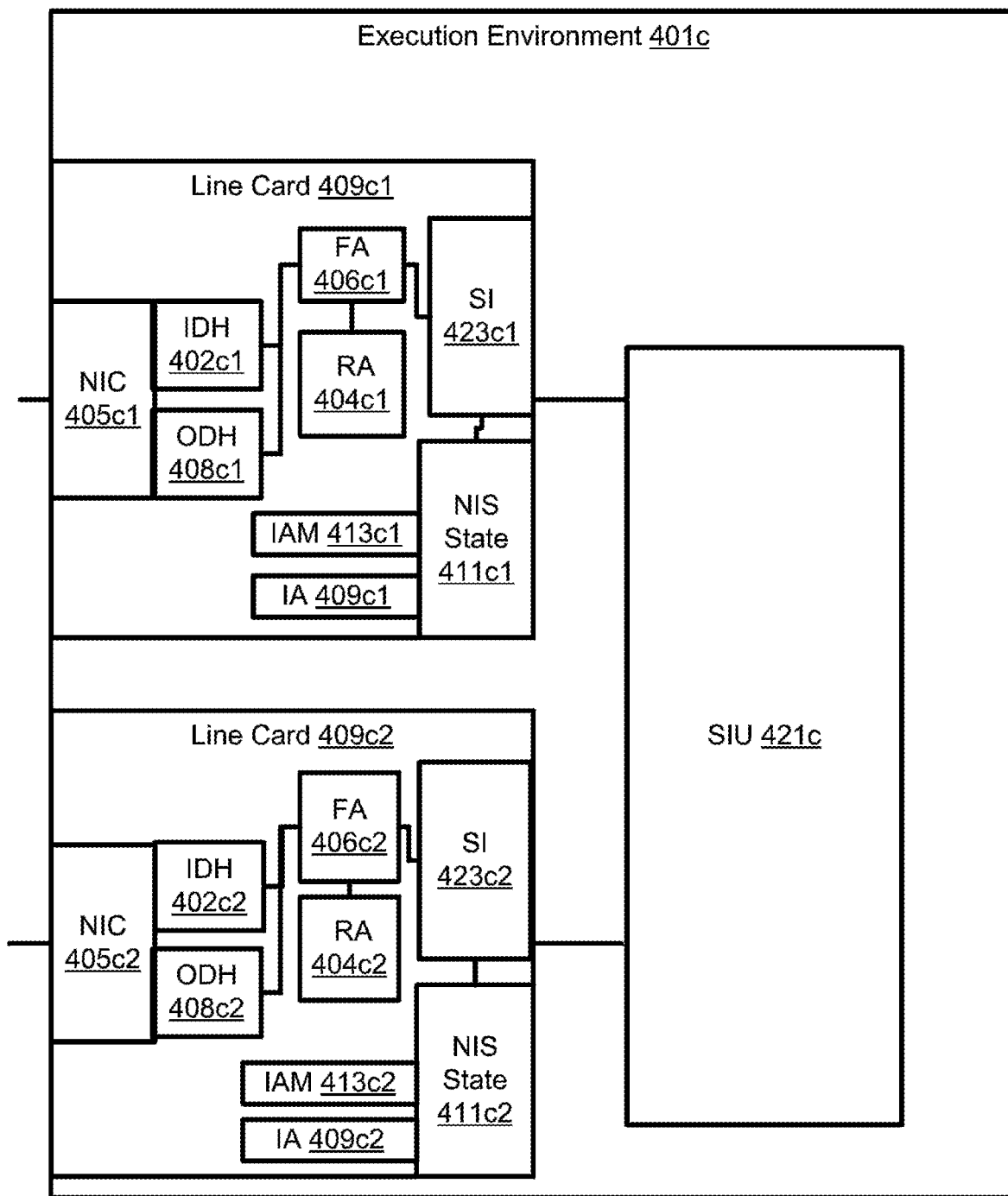
FIG. 4C is a block diagram illustrating an arrangement of components for routing based on a path-based protocol address according to another aspect of the subject matter described herein.

Some or all of the exemplary components illustrated in FIG. 3 may be adapted to perform the method illustrated in FIG. 2 in a number of execution environments. FIG. 4A, FIG. 4B, and FIG. 4C are each block diagrams illustrating the components of FIG. 3 and/or analogs of the components of FIG. 3 respectively adapted to operate in an execution environment 401a, in an execution environment 401b, and in an execution environment 401c that are included in and/or that otherwise are provided by one or more nodes.

Components, illustrated in FIG. 4A, FIG. 4B, and FIG. 4C, are respectively identified by a number followed with an alphanumeric suffix. A component may be referred to generically in the singular or the plural by dropping a suffix of a portion thereof of the component's identifier. For example, execution environments; such as the execution environment 401a, the execution environment 401b, the execution environment 401c, and their adaptations and analogs; are referred to herein generically as an execution environment 401 or, when describing more than one, execution environments 401. Other components identified with a suffix may similarly be referred to generically or as a group by dropping a suffix or a portion thereof.

FIG. 1 illustrates key components of an exemplary device that may at least partially provide and/or otherwise be included in an execution environment. Some or all of the components illustrated in FIG. 4A, FIG. 4B, and FIG. 4C may be included in and/or otherwise may be combined with the components of FIG. 1 to create a variety of arrangements of components according to the subject matter described herein. Those skilled in the art will understand other execution environments in addition to the various adaptations of the execution environments described herein are suitable for hosting an adaptation of the arrangement in FIG. 3.

Figure 5A:
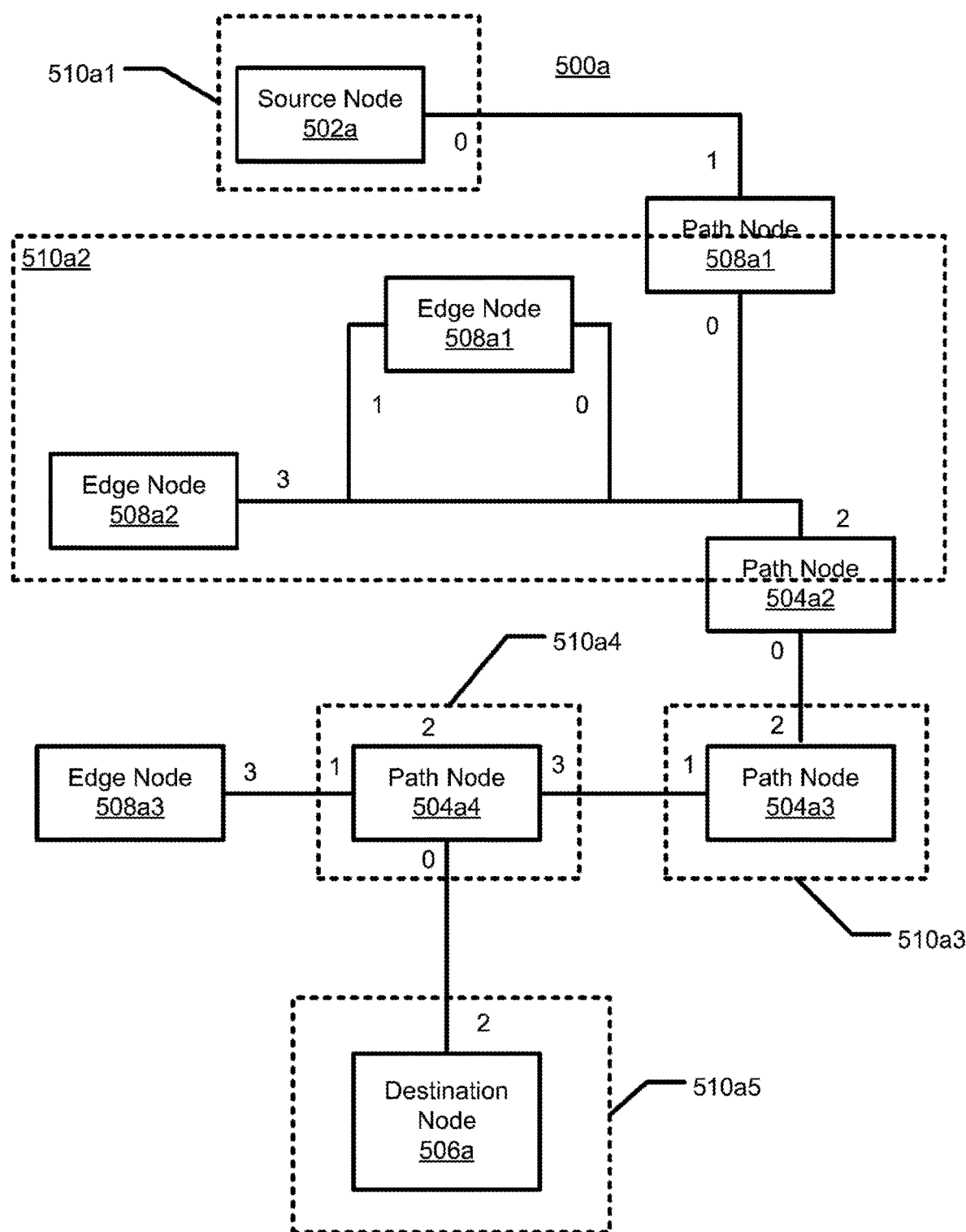
FIG. 5A is a network diagram illustrating an exemplary system for routing based on a path-based protocol address according to another aspect of the subject matter described herein.
Figure 5B:
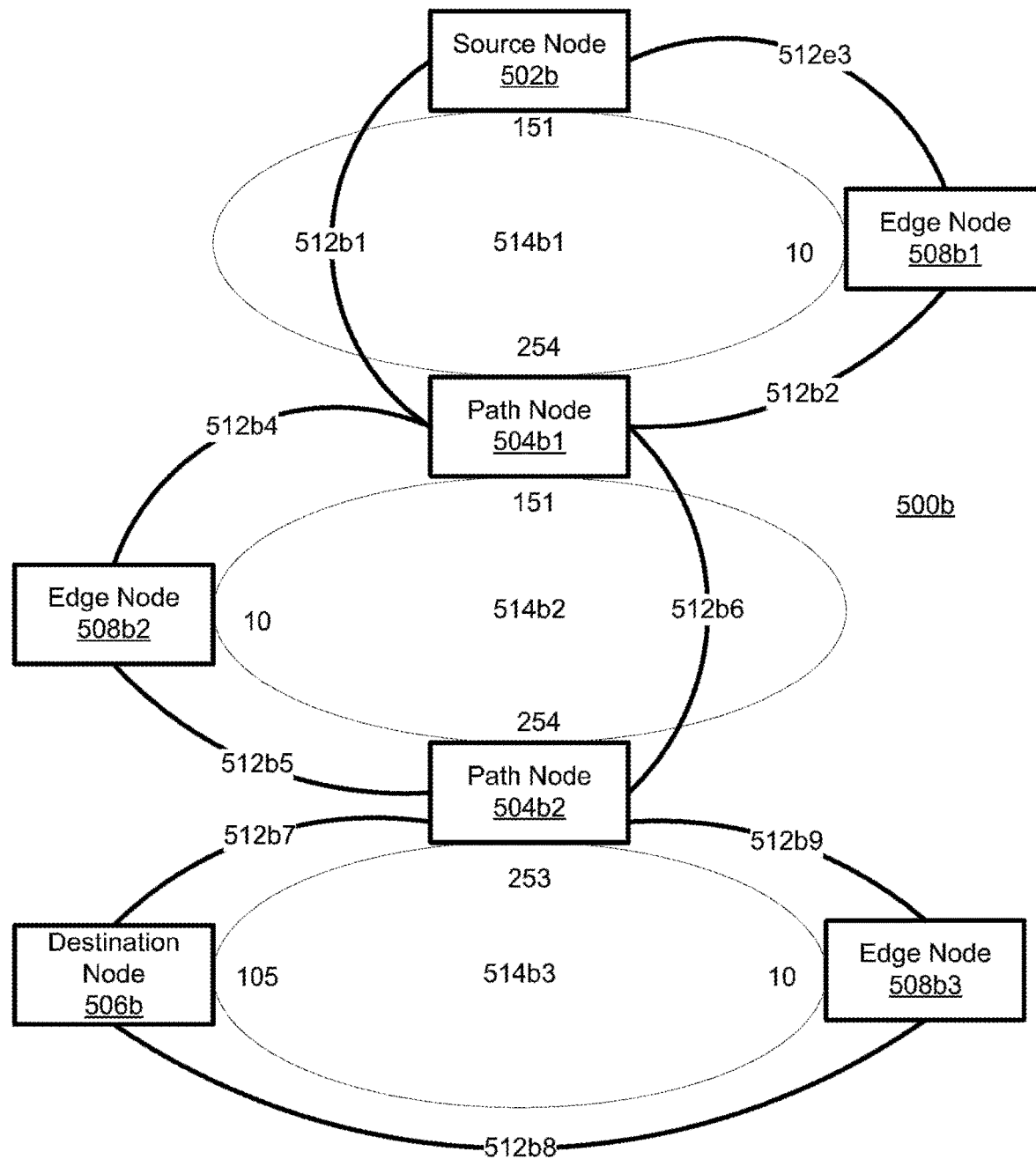
FIG. 5B is a network diagram illustrating an exemplary system for routing based on a path-based protocol address according to another aspect of the subject matter described herein.
Figure 5C:
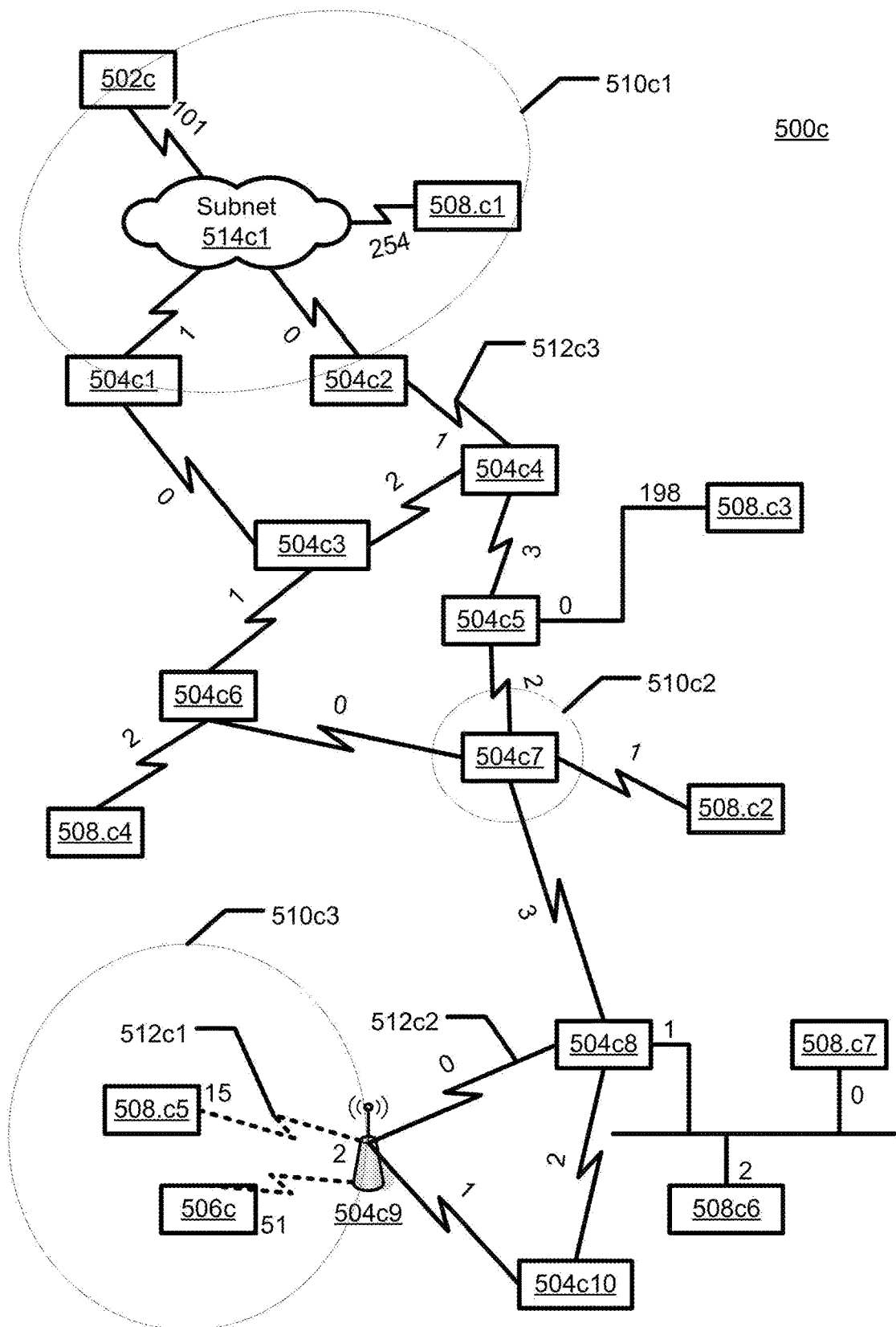
FIG. 5C is a network diagram illustrating an exemplary system for routing based on a path-based protocol address according to another aspect of the subject matter described herein.

FIGS. 5A-C respectively illustrate networks 500 including nodes that in various aspects may include adaptations of any of the execution environments 401, illustrated in FIG. 4A, FIG. 4B, and FIG. 4C. The various illustrated nodes are operatively coupled via respective network interface components to the respective networks 500 in FIGS. 5A-C. For ease of illustration and description, each of FIGS. 5A-C includes nodes identified by a role played in sending data from one node to another. FIGS. 5A-C illustrate source nodes 502 configured to initiate a transmission of data to respective recipients, path nodes 504 configured to relay the data transmitted by respective source nodes 502, and destination nodes 506 identified by the respective source nodes 502 as recipients of the data from source nodes 502. In some of FIGS. 5A-C, one or more edge nodes 508 are illustrated for describing adaptations of the arrangement in FIG. 3 performing various aspects of the method illustrated in FIG. 2 operating in one or more of the roles identified.

A network interface includes one or more NICs identified by a protocol address of a network protocol for sending data from a protocol endpoint identified by the network protocol and/or for receiving data for the protocol endpoint.

In various contexts nodes illustrated as destination nodes 506, edge nodes 508, and/or path nodes 504 may operate as source nodes; some nodes illustrated as source nodes 502, edge nodes 508, and destination nodes 506 may operate as path nodes, and nodes illustrated as source nodes 502, edge nodes, 508, and/or path nodes 504 may operate as destination nodes. Exemplary nodes configured to operate as path nodes 504 include a router, a switch, a wireless access point, a bridge, a gateway, and the like.

A path node 504 illustrated in any of FIGS. 5A-C and/or a node otherwise operating as a path node may include an adaptation of any execution environment 401 illustrated in FIG. 4A, FIG. 4B, and/or FIG. 4C. A path node 504 may include a first network interface component and a second network interface component. With respect to FIG. 5B, a first path node 504b1 may be operatively coupled to a first network 514b1 included in a network 500b via a first network interface component and may be operatively coupled to a second network 514b2 via a second network interface component. The first path node 504b1 may forward data sent from a source node 502b in the first network 514b1 for delivery via a second network 514b2 to a destination node 506b in a third network 514b3. The first network 514b1, the second network 514b2, and/or the third network 514b3 may respectively include and/or may be included in a local area network (LAN), an intranet, at least a portion of the Internet, and/or another wide area network (WAN).

The network components in some nodes may be configured according to a layered design or architecture known to those skilled in the art as a "network stack". Adaptations and/or analogs execution environments 401 in FIG. 4A, FIG. 4B, and FIG. 4C may include network components in a layered architecture, physically and/or logically. Other architectural models for network components may be included in other execution environments to send and/or receive data via a network and are considered within the scope of the subject matter described herein. Combinations of layered architectures and non-layered architectures are also considered to be within the scope of the subject matter described herein.

Some components illustrated in FIG. 4A correspond to components of the layered architecture specified by the Open System Interconnection (OSI) model, known to those skilled in the art. For example, network components in FIG. 4A may comply with specifications for protocols included in the TCP/IP protocol suite. The OSI model specifies a seven-layer network stack. The TCP/IP protocol suite may be mapped to layer three and layer four of the seven layers. Those skilled in the art will understand that fewer or more layers may be included in various adaptations and analogs of the execution environments 401 illustrated in FIG. 4A, FIG. 4B, FIG. 4C, and their various aspects described herein; and for any other execution environment suitable for hosting an adaptation and/or analog of the arrangement of components illustrated in FIG. 3.

FIG. 4A illustrates a network layer component 403a that corresponds to layer 3 of the open systems interconnection reference (OSI) model. The Internet Protocol (IP) is an exemplary layer 3 protocol, also referred to as a network layer protocol. FIG. 4A illustrates a first NIC 405a1 configured to operatively couple a node including an adaptation and/or analog of the execution environment 401a to a network. One or more NICs 405a correspond to layer one, also known as the physical layer, of the OSI model for receiving and sending signals via a physical data transmission medium. Exemplary network layer protocols include an Internet Protocol (IP), DECNet routing Protocol (DRP), an Internetwork Packet Exchange (IPX) protocol, an Internet Datagram Protocol (IDP), a VINES Internet Protocol, and a Datagram Delivery Protocol (DDP).

FIG. 4A also illustrates a link layer component 407a that corresponds to layer 2, also known as the link layer, of the OSI model for communicating, via layer 1, between nodes sharing a physical data transmission medium such as nodes in a LAN. Exemplary link layer protocols include an Ethernet protocol, a Token-ring protocol, and asynchronous transfer mode (ATM) protocol, to name a few. Some or all of a link layer component 407a may be included in one or more NICs 405, as illustrated in FIG. 4A. A portion of a link layer component may be external to and operatively coupled to one or more NICs. The external portion may be realized, at least in part, as a device driver for the one or more NICs. Exemplary physical data transmission media include Ethernet cables of various types, co-axial cables, fiber optic cables, and media suitable for transporting various types of wireless signals. FIG. 4A illustrates that some nodes included in and/or otherwise providing an adaptation and/or analog of the execution environment 401a may include more than two NICs 405a, as illustrated by a third NIC 405a3 through an Nth NIC 405an.

The network layer component 403a, illustrated in FIG. 4A, may operate to communicate across various types of link layer protocols, in various adaptations. Layer 3 protocols enable data to be exchanged between and among nodes on different networks across different types of physical data transmission media and differing link layer protocols. The Internet Protocol (IP) in the TCP/IP protocol suite is the most widely utilized network layer protocol currently in use. For ease of illustration, the description that follows provides examples based on IP networks and protocols in the TCP/IP suite due to their wide use and because they are well known in the art. Those skilled in the art will understand that the scope of the subject matter described is not limited to IP networks.

In addition to the protocols described above, protocols corresponding to layers in the OSI model above the network layer may be included in communicating via a network. The term "application protocol" as used herein refers to any protocol or combination of protocols that correspond to one or more layers in the OSI reference model above the network layer. Programs and executables operating in execution environments 401 may communicate via one or more application protocols. Exemplary application protocols include the transmission control protocol (the TCP) in the TCP/IP suite, the user datagram protocol (UDP) in the TCP/IP suite, various versions of hypertext transfer protocol (HTTP), various remote procedure call (RPC) protocols, various instant messaging protocols, various email protocols, and various other protocols for real-time communications. Data exchanged between nodes in a network may be exchanged via data units of one or more network protocols. An execution environment may include layer specific protocol components respectively configured according to the one or more network protocols. Some protocols and/or protocol components may define and/or provide services from multiple layers of the OSI model layer such as the Systems Network Architecture (SNA) protocol.

In addition to specifying schemas defining valid data units, a network protocol may define and/or otherwise be associated with a defined identifier space for identifying protocol endpoints defined according to the network protocol. The terms "identifier space" and "address space" are used interchangeably herein. For example, various versions of hypertext transfer protocol (HTTP) specify a format for HTTP uniform resource locators (URL). HTTP specifies a location in an HTTP header that identifies a URL as an identifier or address from the HTTP address space that identifies both a resource and recipient of an HTTP data unit. The transmission control protocol (TCP) specifies a format and vocabulary for a TCP header including a destination protocol endpoint identifier field referred to as a destination port number that, when combined with a destination protocol address from an IP packet, identifies a transport layer protocol endpoint of a receiver of data sent in a TCP data unit via a network. A source protocol endpoint is similarly identified by a source port number, included in a TCP header as defined by the TCP, along with a source protocol address from an IP data unit as defined by the Internet Protocol.

Other exemplary address spaces that identify protocol endpoints in various network protocols include an email address space, a telephone number address space for various telephony protocols, instant message address spaces for various instant message protocols, and media access control (MAC) addresses for various link layer protocols, to name just a few examples. The address spaces identified are shared among the senders and receivers exchanging data via any particular protocol from among those identified herein as well as others that are known. Some address spaces are shared by senders and receivers in a LAN, an intranet, and/or in another identifiable portion of a network. Other address spaces are shared globally. For example, the HTTP identifier space is a global address space shared across the Internet. An HTTP identifier is defined to identify the same resource regardless of the application and/or node identifying the resource via the HTTP identifier. An HTTP URL is a global identifier in an HTTP network, such as the World Wide Web (Web). Addresses in a shared address space are referred to as scoped addresses that serve as identifiers of protocol endpoints in nodes that share the address space in a region of a network defined by a scope.

In delivering data via a network between protocol endpoints of a particular network protocol, addresses from address spaces of the various protocols at the various layers are typically translated and/or otherwise mapped between the various layers. For example, a unicast IP address in an IP packet is mapped to a link layer address for a link via which the IP packet is transported in a network path via a path node 504 in relaying data from a source node 502 to an identified destination node 506. Addresses at the various layers are assigned from a suitable address space for corresponding network protocols.

FIG. 5B illustrates data may be received via the protocol endpoint from a network via one or more network interfaces that operatively couple a node to the network. Data may be sent via the protocol endpoint in a transmission over the network via the one or more network interfaces in the node. In FIG. 5B, a network path communicatively coupling the source node 502b and a second edge node 508b2 in the network 500b includes a sequence of nodes including of the source node 502b, a first path node 504b1, and the second edge node 508b2. In FIG. 5C, a first network path communicatively coupling a fifth edge node 508c5 and an eighth path node 504c8 includes a first sequence of nodes including the fifth edge node 508c5, a ninth path node 504c9, and the eighth path node 504c8. The first network path is included in a second network path communicatively coupling the fifth edge node 508c5 and the second edge node 508c2 that includes a second sequence of nodes including of the nodes in the first sequence, a seventh path node 504c7, and the second edge node 508c2. A network path may be physical network path or logical network path based on a particular network protocol defining protocol endpoints in the path end nodes.

FIG. 5B, illustrates a number of network paths communicatively coupling the source node 502b and the destination node 506b in the network. One network path illustrated includes a sequence of hops including a first hop 512b1, a sixth hop 512b6, and a seventh hop 512b7. In FIG. 5C, the first network path described above communicatively coupling the fifth edge node 508c5 and the eighth path node 504c8 includes a first sequence of hops including a first hop 512c1 and a second hop 512c2. A hop may be a physical hop or a logical hop based on a network protocol defining a network topology in which the hop is identified and/or otherwise represented.

Given the above definitions, note that the terms "network path" and "hop" may be defined in terms of network interfaces. A "network path" is a sequence of network interfaces in a network for transmitting data in one or more data units of a specified network protocol between a pair of path end nodes in the network. A "hop" refers to a pair of consecutive network interfaces, in a pair of nodes, in a sequence of network interfaces in a network path. A hop in a sequence in a network path corresponds to a pair of network interfaces in the sequence of network interfaces in the network path. In FIG. 5B, the network path described above communicatively coupling the source node 502b and the destination node 506b includes a sequence of network interfaces including a network interface in the first path node 504b1 in the first hop 512b1, a network interface in a second path 504b2 in a sixth hop 512b6, and network interface in the destination node 506b in a seventh hop 512b7. The network paths in FIG. 5C described above may also be described as a sequence of network interfaces.

A network topology may represent logical hops in a network. In FIG. 5B, the first network 514b1 may represented a physical topology when the first 514b1 represents a physical data transmission medium included in physically coupling nodes. The data transmission medium may be a token-ring LAN, for example. The hops 512 in FIG. 5, may illustrate logical communicative couplings at a level of the network above the data transmission medium. The hops 512 may represent network layer hops or hops at some other layer of the network above the physical layer. The domain name system (DNS) of the Internet provides another example of nodes in a logical network topology based on DNS protocol endpoints of the DNS protocol that identifies nodes in the Internet included the network topology. Hops in a DNS based network topology correspond to communicative couplings enabled by the DNS protocol.

With reference to FIG. 2, a block 202 illustrates that the method includes detecting, by a current node in a current location in a network path, data in a data unit that is specified according to a network protocol and that includes a first path-based protocol address including a plurality of path segment identifiers that identify respective path segments of a network path for transmitting data from a source node to a destination node. Accordingly, a system for routing based on a path-based protocol address includes means for detecting, by a current node in a current location in a network path, data in a data unit that is specified according to a network protocol and that includes a first path-based protocol address including a plurality of path segment identifiers that identify respective path segments of a network path for transmitting data from a source node to a destination node. For example, the arrangement illustrated in FIG. 3, includes the in-data handler component 302 that is operable for and/or otherwise is included in detecting, by a current node in a current location in a network path, data in a data unit that is specified according to a network protocol and that includes a first path-based protocol address including a plurality of path segment identifiers that identify respective path segments of a network path for transmitting data from a source node to a destination node. FIGS. 4A-C illustrate in-data handler components 402 as adaptations and/or analogs of the in-data handler component 302 in FIG. 3. One or more in-data handler components 402 operate in an execution environment 401. In FIG. 4A, an in-data handler component 402a is included in network layer component 403a. In FIG. 4B and in FIG. 4C, in-data handler components 402 operate in respective line card components 409.

In transmitting data from a source protocol endpoint in a source node 502 to a destination protocol endpoint in a destination node 506, the data is processed by a sequence of nodes in a network path that communicatively couples the source node 502 and the destination node 506. A node in the network path, that is currently processing the data to send it to the destination 506, is referred to herein as a "current node" with respect to the data. A node in the network path that has previously transmitted the data being processed by the current node is referred to herein as a "previous node". A node in the network path that has not received the data being processed by the current node is referred to herein as a "next node". For ease of description, with respect to a data unit "data" refers to data sent in the data unit via a protocol endpoint in the source node, that is being processed by a current node. As such, a source node 502 may be a current node or a previous node with respect to particular data. A path node 504 may be a current node, a previous node, or a next node with respect to the particular data. A destination node 506 may be a next node or a current node with respect to particular data.

A source node 502 may be a current node with respect to data to be transmitted to a destination node 506. The source node 502 may include an adaptation, analog, and/or instance of the execution environment 401a in FIG. 4A. An in-data handler component 402a operating in a network layer component 403a in the source node 502 may detect the data. The network layer component 403a may be configured according to a network layer protocol, such as a version of the Internet Protocol. The in-data handler component 402a may detect data in a data unit that is to be sent to the destination node 506. The data may be received from an application or other type of component configured to send data via a network to a recipient. For example, the application component may be an email client, a file transfer application, a network management client, and the like to be transmitted via one or more data units of the network protocol of the network layer component 403a. The in-data handler 402a may receive the data, directly and/or indirectly, from the application in the source node 502. The in-data handler 402 may interoperate with an out-data component 408a and/or other component of the network layer component 403a to include and/or otherwise detect the data in a data unit of the network protocol.

A path node 504 may include an adaptation, analog, and/or instance of the execution environment 401a, illustrated in FIG. 4A. Data communicated between a source node 502 and a destination node 506 may be received by the path node 504 via of a first NIC 405a1 operatively coupling the path node 504 to a previous network path including the source node 502 and the path node 504 as path end nodes. One or more link layer protocol data units may be detected by a link layer component 407a according to a compatible link layer protocol. For example, Ethernet frames may be detected as link layer protocol data units when received via a CAT 6 Ethernet cable. Data in a received link layer protocol data unit may be provided to an in-data handler component 402a in a network layer component 403a according to the specification of a particular network layer protocol, such as the IP.

An in-data handler component 402a may detect one or more network layer protocol data units in data received from the link layer component 407a. For example, the in-data handler component 402a may detect one or more IP packets in data received in one or more Ethernet frames. The in-data handler component 402a may detect a network layer data unit that includes data from the source node 502 to relay the data to the destination node 506 identified by a protocol address in address information in the detected network layer data unit as defined by a particular network layer protocol supported by the network layer component 403a in the path node 504. A network interface component 405a in a path node 504 may receive data communicated from a source node 502 via a previous network path included in a network 500. One or more network paths may exist to receive the data. A path node 504 may receive data from a source node 502 and may transmit the received data to a destination node 506 via a specified protocol. For example, a path node 504 may receive and transmit data in one or more data packets at a link layer as performed by an Ethernet bridge and a multiple protocol-labeling switch (MPLS). Further, a path node 504 may receive and transmit data in one or more data packets at a network layer as performed by an Internet protocol (IP) router. Still further, a path node 504 may receive and transmit data in one or more data packets at an application layer, as defined above.

Accordingly, data from a source node 502 may be included in and/or may include data formatted according to a link layer protocol, a network layer protocol, and/or an application layer protocol. An in-data handler component 402a may be configured according to a network layer protocol, a link layer protocol, and/or an application layer protocol.

A network protocol defines one or more of a format defining a valid structure for a data unit and a vocabulary defining valid content of the data unit. For example, data to transmit from a source node to a destination node may be included in a payload portion of a data unit of a particular network protocol. The network protocol may define a format that identifies the payload based on one or more valid data structures for a data unit. For example, a payload portion may be identified by a location with respect to the start of a data unit or relative to another portion of the data unit. Alternatively or additionally, the network protocol may define a vocabulary defining a keyword, a bit pattern, and/or other detectable marker that when detected identifies a payload or part of a payload in a data unit. The network protocol may define one or more format rules and/or vocabulary rules that an in-data handler component may detect in identifying data and/or address information in a data unit. The term "schema" refers to a definition of a structure and/or a vocabulary for constructing and/or detecting a valid data unit with respect to a network protocol. For example, both an IPv4 data packet and an IPv6 data packet are specified according to a schema for including address information in a destination protocol address field and in a source protocol address field in an IP header based on location and size.

Data received from a source node 502 by a path node 504 may be received via one or more previous path nodes 504. Data may be received by a current node 504 from a previous node based on a previous-current path segment identifier included in a path-based protocol address that identifies a destination node 506. The previous-current path segment identifier identifies a network path from the previous node to the current node for transmitting the data.

Returning to FIG. 2, a block 204 illustrates that the method further includes detecting, based on the current location, a current-next path segment identifier that identifies a current-next path segment in the plurality for transmitting the data from the current node to a next node in the network path. Accordingly, a system for routing based on a path-based protocol address includes means for detecting, based on the current location, a current-next path segment identifier that identifies a current-next path segment in the plurality for transmitting the data from the current node to a next node in the network path. For example, the arrangement illustrated in FIG. 3, includes the routing component 304 that is operable for and/or otherwise is included in detecting, based on the current location, a current-next path segment identifier that identifies a current-next path segment in the plurality for transmitting the data from the current node to a next node in the network path. FIGS. 4A-C illustrate routing components 404 as adaptations and/or analogs of the routing component 304 in FIG. 3. One or more routing components 404 operate in an execution environment 401.

In FIG. 4A, a routing component 404a is illustrated as a component of a network layer component 403a. In FIG. 4B, a routing component 404b is illustrated operatively coupled to multiple line card components 409b to relay data between and/or among portions of a network coupled to the line cards

409b. Routing component 404b may operate at a network layer of a network stack and/or at another layer. In FIG. 4C, a routing component 404c is illustrated as distributed throughout line card components 409c of an execution environment 401c. The routing component in the execution environment 401c includes a first routing agent (RA) component 404c1 in a first line card component 409c1 and a second RA component 404c2 in a second line card component 409c2.

FIGS. 6A-E illustrate a number of types of address representations 602 illustrating aspects of various address formats and vocabularies for representing a path-based protocol address. Various portions of the respective address representations 602 are illustrated as contiguous but need not be so in various embodiments. The address representations 602 in FIGS. 6A-E may be identified based on an aspect of a format of a data unit and/or an aspect of a vocabulary of a data unit as defined by a schema of a network protocol. Routing component 404a may detect a protocol address of a next node based on a schema for including address information in a data unit of a network protocol. In another aspect, address information may be detected by an in-data handler component 402a configured to provide some or all of the address information to the routing component 404a to detect a protocol address of a next node in a path-based protocol address in the address information.

Address representations 602 in FIGS. 6A-E are described with respect to their inclusion in data units of a network protocol. Each of the address types shown in FIGS. 6A-E may be adapted to be included in a destination protocol address portion and/or a source protocol address portion of an IPv4 packet header and/or of an IPv6 packet header. Each may be identified as a path-based protocol address, by a routing component 404a, by a bit pattern and/or other type identifier defined to identify a protocol address type as a path-based protocol address type. The bit pattern or identifier may be located by the routing component 404a stored in a type bits portion of an IP packet and/or in some other specified location. Those skilled in the art will realize that neither the schemas, which define a format rule(s) and/or a vocabulary rule(s) for a protocol address, described nor the protocols in which their use is described are exhaustive.

Figure 6A:
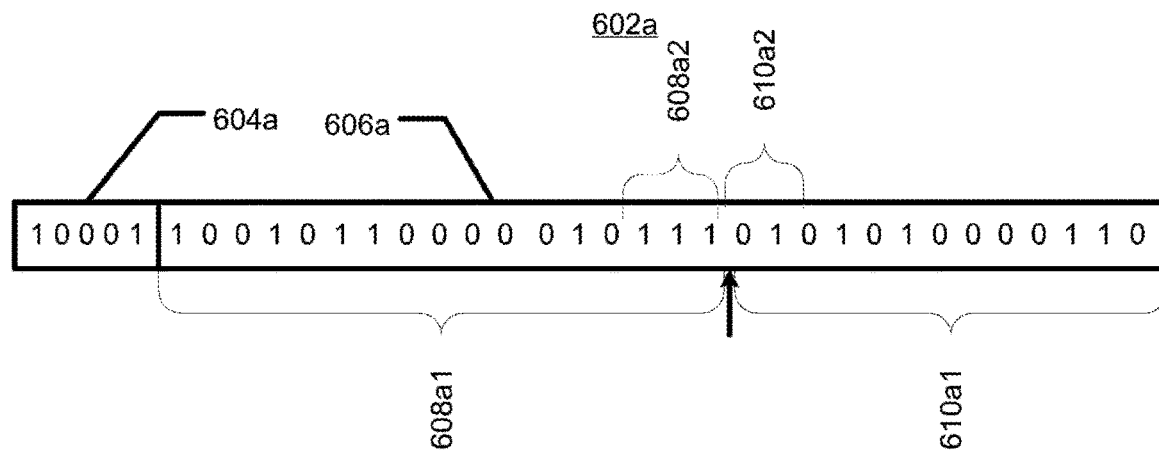
FIG. 6A is a diagram illustrating an exemplary representation of a path-based protocol address according to another aspect of the subject matter described herein.

FIG. 6A illustrates an address representation 602a that may be detected by an in-data handler component 402a and/or a routing component 404a in a data unit or packet of an Internet Protocol or other network layer protocol. An address representation 602a may identify a path-based protocol address identifying multiple path segments in a network path for transmitting data from a source node to a destination node via the network path. In an aspect, an address representation 602a may be processed by an in-data handler component 402a and/or a routing component 404a as including multiple portions. An address information field 606a may include a path-based protocol address that identifies the destination node and/or the source node. An address separator field 604a is illustrated, in FIG. 6A, including a binary number. The exemplary binary number equals seventeen in FIG. 6A. The value in the address separator field 604a may be defined to identify the size in the address information field 606a of a previous address field 608a to identify the previous address field 608a and a next address field 610a. A routing component 404a, in a current node 504, may process information in a previous address field 608a to identify a previous-current path segment identifier, in the path-based protocol address, that identifies the current node 504 with respect to a previous node in the network path. A routing component 404a may identify, based on information in a next address field 610a, a current-next path segment identifier, in the path-based protocol address, that identifies a next node in the network path. In FIG. 6A previous portion 608a2 may be a path-segment identifier of the current node that identifies a network path in the network path from the source node to the current node. A next portion 610a2 may be a path-segment identifier of a path segment to a next node from the current node. The next node follows the current node in a sequence of nodes in a network path including the current node and the destination node.

Alternatively or additionally, a routing component 404a may identify, based on information in a next address field 610a, a next-current path segment identifier, in the path-based protocol address, that identifies the current node with respect to a next node. A routing component 404a interoperating with an in-data handler component 402 may determine the current-next path segment identifier, that identifies the next node, based on the next-current path segment identifier. In another aspect, a routing component may determine the next-current path segment identifier based on the current-next path segment identifier.

With respect to FIG. 5A, an address representation 602a may be included in a data unit including data from a source node 502a to transmit to a destination node 506a. An address information field 606a may include a path-based protocol address that identifies the sequence 1.2.2.3.2 that, in the data unit, identifies the destination node 506a. Note that the source node 502a is illustrated in a first region 510a1 in the network 500a. A first scope-specific address space may be specific to the first region 510a1. The sequence 1.2.2.3.2 may be represented in an address information field 606a to identify a protocol address that, in the first scope-specific address space, identifies the destination node 506a. Further, the sequence may be included in a path-based protocol address that identifies the destination node 506a in a data unit including data sent from the source node 502a.

In an aspect of the method illustrated in FIG. 2, address information in a data unit may identify a source-destination path-based protocol address that identifies a destination node with respect to a source node. Alternatively, or additionally the address information may identify a destination-source path-based protocol address that, with respect to the destination node, identifies the source node. A current-next path segment identifier may be included in at least one of the source-destination protocol address and the destination-source protocol address. The current-next path segment identifier may include one or more of a nested protocol address; a scope-specific protocol address that, in a current scope-specific address space specific to a current region including a current node, identifies a next node with respect to the current node; and a path-based protocol address that identifies a network path from the current node to the next node.

At the source node 502a, the address separator field 604a may be set to include a size of zero for a previous address field 608a. The address information field 606a, thus, includes a next address field 610a at the source node 502a and identifies the destination node 506a with respect to nodes in the first region 510a1 by identifying a specific network path included in transmitting data from the source node 502a to the destination node 506a.

At a first path node 504a1, outside the first region 510a1, an address separator field 604a in a data unit including the data from the source node 502a, may include a value of 1 that identifies, in a previous address field 608a, a previous-current path segment identifier, in destination protocol address, identifies the first path node 504a1. A routing component 404a in a first path node 504a1 may detect the value. The routing component 404a may also identify, based on the value in the address separator field 604a, a next address field 610a that identifies 2.2.3.2 as a current-next path segment identifier that, in the destination protocol address, also identifies the destination node 506a. The routing component 404a may detect the current-next path segment identifier.

At the destination node 506a a data unit including the data from the source node 502a may include a value in an address separator field 604a that indicates that the address information field includes only a previous address field 608a identifying the network path 1.2.2.3.2, which is included in the destination path-based protocol address.

In another aspect, the method illustrated in FIG. 2 may include detecting, in a data unit by a current node, address-separating information specified according to a network protocol to detect the next address information and/or the previous address information. The address separating information may be updated in a next data unit for identifying, by the next node, at least one of next-previous path segment identifier and next-next path segment identifier in the address information, wherein the next-previous address information includes a path segment identifier that identifies the current node as a previous node. In yet another aspect, address separating information may be updated in a data unit received by a current node to identify, by the current node, the previous address information and the next address information in the address information. As the data from the source node 502a is transmitted from node to node in the network path the value represented in an address separator field 604a in an address representation 602a in a data unit including the data or a portion thereof may be adjusted to identify a path segment identifier in a path-based protocol address to identify a next node for each node operating as a current node in the network path.

The above description describes an address representation 602a processed in the role of a destination path-based protocol address in a data unit of a network protocol, such as a version of the internet protocol. An address information field 606a may include source address information sent in one or more data units included in sending data from a source node to a destination node. Returning to FIG. 5A, a data unit including data sent from the source node 502a to the destination node 506a may include source address information including a representation of a source path-based protocol address in an address information field 606a. At the second path node 504a2, an address separator field may identify a previous address field 608a identifying the sequence 0.0 that identifies a path segment identifier that, in the source path-based protocol address, identifies the source node 502a to the second path node 504a2. Note that the address 0.0 identifies the source node 502a node to all nodes in the second region 510a2 that communicate with the source node 502a via data units of the network protocol and may be an address in a scope-specific address space specific to the second region 510a2. The address information field 606a including the source address information at the second path node 504a2 may include a next address field 610a, identified by the address separator field 604a, identifying the sequence 0.1.0 that identifies a path segment identifier, in the source path-based protocol address, that identifies the second path node 504a2 to the destination node 506a.

Figure 6B:
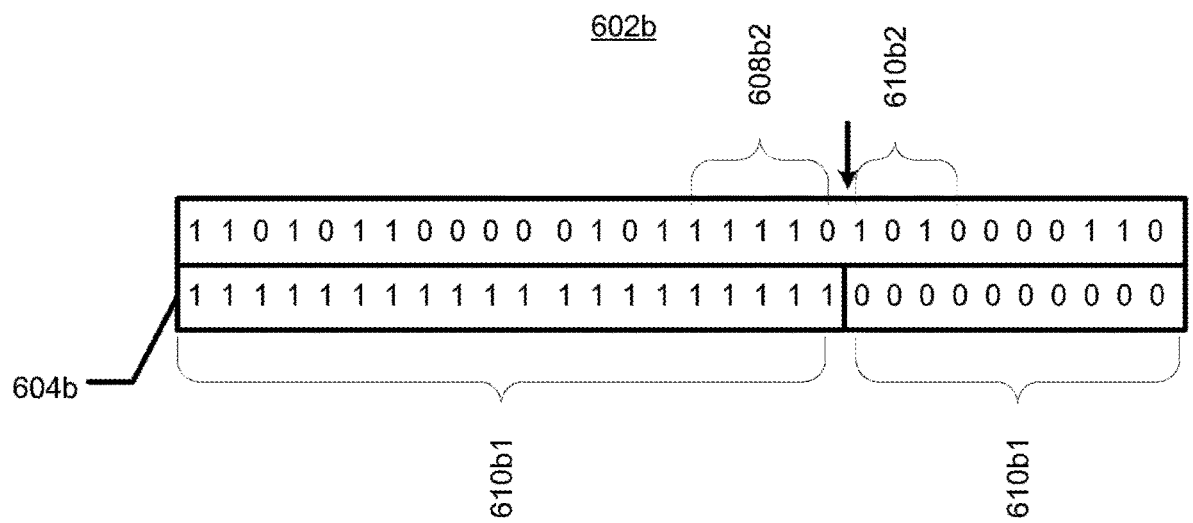
FIG. 6B is a diagram illustrating an exemplary representation of a path-based protocol address according to another aspect of the subject matter described herein.

FIG. 6B illustrates a variant of the address type illustrated in FIG. 6A. Instead of or in addition to including an address separator field that distinguishes a previous address field from a next address field based on a size, a bit-mask may be specified as one or more address separator fields 604b to identify a previous address field 608b and a next address field 610b in an address information field 606b in an address representation 602b of a data unit formatted according to a particular network protocol, such as IP or IPX. Address information formatted as illustrated in FIG. 6B may be processed by a routing component 404a interoperating with an in-data handler component 402a in an analogous manner to that described for the address information in FIG. 6A based on the bit mask address separator field(s) 604b rather than and/or in addition to a size address separator field 604a illustrated in FIG. 6A.

As described above and further described below, a path-based protocol address may include and/or may otherwise be based on path information for a network path included in communicatively coupling a pair of nodes in a network. Detecting a path-based protocol address and/or a protocol address in a path-based protocol address may include determining path information identifying a network path included in communicatively coupling a pair of path end nodes included in transmitting data from a source node to a destination node.

Figure 6C:
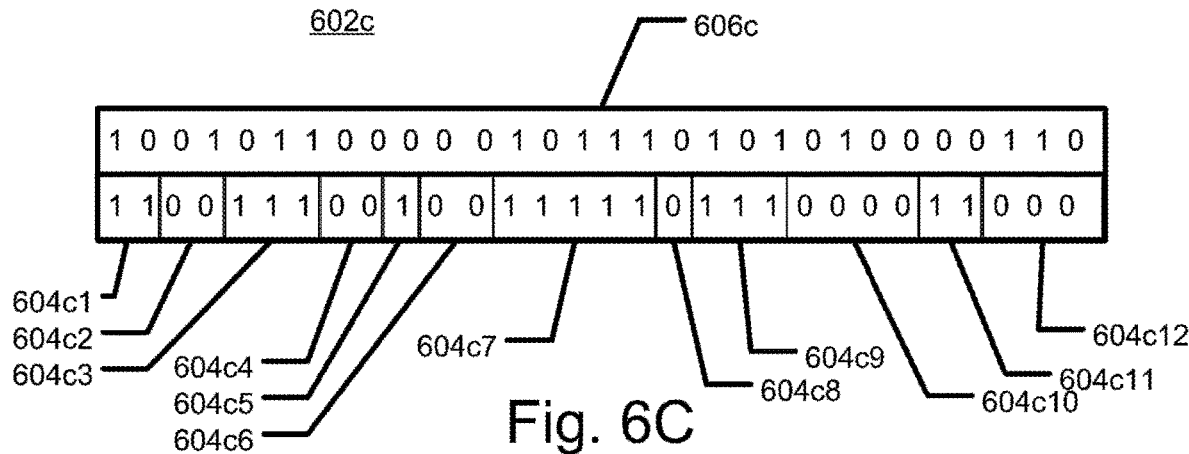
FIG. 6C is a diagram illustrating an exemplary representation of a path-based protocol address according to another aspect of the subject matter described herein.

FIG. 6C illustrates an address representation 602c identifying a path-based protocol address including path information that may be detected by a routing component 404a. An address information field 606c may include a path-based protocol address that may be interpreted as including a network path identifier based on address separator field(s) 604c in a data unit. Address separator fields are specified according to a network protocol to distinguish one path segment identifier from another path segment identifier in an address information field 606c. Each path segment identifier and/or group of consecutive path segment identifiers may be a representation of a protocol address of the network protocol of a data unit including an address representation 606c.

In an aspect, illustrated in FIG. 6C, a routing component 404a and/or an in-data handler component 402a may distinguish hop identifiers, since a single hop is a network path and/or a path segment. A routing component 404a may distinguish separate hop identifiers based on changes in values in bits of consecutive address separator fields 604c. In FIG. 6C, a first address separator field 604c1 includes one or more 1-valued bits that correspond to bit positions in the address information field 606c to identify a previous address field referred to in FIG. 6C as a first hop information field. Network paths that include more than one hop may be distinguished similarly as shown in FIG. 6B. Combinations of hop identifiers and path segment identifiers may be distinguished by a routing component 404a and/or an in-data handler component 402a based on information in address separator fields 604. The routing component 402a may detect protocol addresses that correspond to the various combinations of hop identifiers and/or path segment identifiers. A second hop information field 604c2, in FIG. 6C, includes two 0-valued bits to identify a second hop information field in address information field 606c. Additional alternating sequences of 1-valued bits and 0-valued bits illustrated by address separator fields 604c3-12c correspond to and identify other hop information fields identifying hops in a network path communicatively coupling a source node 502 and a destination node 506.

Path information may include hop information identifying a hop. Next address information may be defined by a network protocol to include next path information identifying a current-next path identifier of a next network path included in communicatively coupling a current node and destination node. Alternatively or additionally, previous address information may be defined by the network protocol to include previous path information identifying a previous-current path segment identifier of previous network path included in communicatively coupling the current node and the source node. Next path information may include next hop information identifying a hop in the next network path. Previous path information may include previous hop information identifying a hop in the previous network path. A network protocol may define a hop identifier to be a valid protocol address that identifies a protocol endpoint.

In FIG. 5C, a hop may be identified by an interface identifier that may identify directly and/or indirectly one or more network interfaces in a pair of communicatively coupled nodes included in the hop. For example, the number 1 may serve as a hop identifier specific to a second path node 504c2 to identify a third hop 512c3 including the second path node 504c2 and a fourth path node 504c4. The number 1 may also identify a network path for exchanging data between the two nodes. The number 1 may also be a protocol address that, in a path-based protocol address identifying a destination node in a data unit including data from a source node, identifies the fourth path node 504c4 in a network path from the source node to the destination node. The number 1 may also identify a hop for the fourth path node 504c4 to exchange data with the second path node 504c2 and may also be a protocol address that identifies the second path node 504c2 and identifies a particular network interface of the second path node 504c2 in a data unit sent from the fourth path node 504c4.

A source node 502c may identify a destination node 506c by a destination path-based protocol address. The protocol address may be based on a sequence of hop identifiers 0.1.3.2.3.0.51. Note that other network paths are illustrated for transmitting data from the source node 502c to the destination node 506c and may also identify path-based protocol addresses that identify the destination node 506c to the source node 502c.

A seventh path node 504c7 in the identified network path may identify the destination node 506c based on another sequence of hop identifiers 3.0.51 that identifies a path segment. The sequence of hop identifiers may identify a protocol address that, in the destination path-based protocol address, identifies the destination node 506c. Note that a routing component 404a operating in the seventh path node 504c7 may detect the path segment identifier sequence 3.0.51, in and/or otherwise based on the path-based protocol address of the destination node 506c. Further, the routing component 404a may detect a path segment identifier for the eighth path node 504c8 as well as a path segment identifier for the ninth path node 504c4, in and/or otherwise based on the protocol address based on the path segment identifier 3.0.51.

The destination node 506c is illustrated in a third region 510c3. Within the third region 510c3, the destination node 506c may be identified by a local scoped address 51, which identifies a path segment. Nodes in the third region 510c3 may identify nodes outside the third region 510c3 by path-based protocol addresses, and may use local scoped addresses to identify nodes in the third region 510c3.

The hop identifiers 0.1.3.2.3.0.51 may be represented in a path-based protocol address in an address representation 602c in a data unit included in sending data from the source node 502c to the destination node 506c. At the seventh path node 504c7, a routing component 404a may determine and/or otherwise detect a path segment identifier identifying a network path to a next node based on a next address field identifying the path segment identifier 3.0.51 in the path-based protocol address. The identifiers may be given a bit or binary representation and the hop identifiers may be distinguished or separated via address separator fields 604c as described above with respect to FIG. 6C. An address separator field analogous to that shown in FIG. 6A may also or alternatively be included and processed as described above. Assignment of hop identifiers is described in application Ser. No. 13/727,649 filed on 2012 Dec. 27, entitled "Methods, Systems, and Computer Program Products for Assigning an Interface identifier to a Network Interface", application Ser. No. 13/727,655 filed on 2012 Dec. 27, entitled "Methods, Systems, and Computer Program Products for Determining a Shared identifier for a Hop in a Network".

Note that the address information that identifies one or more path segment identifiers for the seventh path node 504c7 and for the destination node 506c in the preceding description may include information to identify a return path or a portion thereof. For example, the path-based protocol address 3.0.51 includes the path segment identifier 0.3, which may be included in a path-based protocol address that identifies the seventh path node nodes in the third region 510c3 and may be path-based protocol address that identifies the seventh path node 504c7 to the ninth path node 504c9. The path-based protocol address 0.1.3.2 includes another path-based protocol address 2.3.1 that identifies a network path from the seventh path node 504c7 to a node having a network interface in first region 510c1, illustrated by a second path node 504c2.

Separate source address information may be included in a data unit received by the seventh path node 504c7 that includes data sent from the source node 502c. Address information in the data unit may include a source path-based protocol address representation 602c that may identify 2.3.1.101 as a protocol address that identifies the source node 502c. Note that 101 may identify a hop in the first region 510c1 from the second path node 504c2 to the source node 502c, in some aspects. For example, subnet 514c1 may be a LAN. In another aspect, 101 may be a scoped address that identifies the source node 502c in the scope of the first region 510c1. Thus, a path-based protocol address may include a scoped address, which may identify a path segment.

Figure 6D:
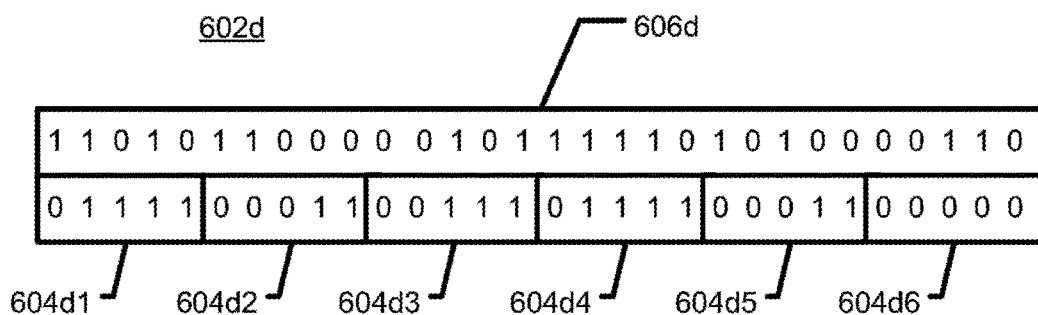
FIG. 6D is a diagram illustrating an exemplary representation of a path-based protocol address according to another aspect of the subject matter described herein.

FIG. 6D includes an address representation 602d illustrating a schema for representing a path-based protocol address including path information based on identifiers of network interfaces included in a hop and/or in path end nodes in a network path. A routing component 404a and/or an in-data handler component 402a may operate based on the schema or a portion of the schema. An address information field 606d includes a path-based protocol address to identify a network path to communicatively couple a pair of path end nodes. FIG. 6D illustrates that an address representation 602d may include one or more address separator fields 604d that correspond to and/or otherwise identify respective one or more portions of the address information field 606d that are based on one or more pairs of identifiers of network interfaces of path end nodes. An address separator field 604d includes series of 1-valued bits and 0-valued bits. A change from a 1-valued bit to a 0-valued bit and vice versa may indicate, to a routing component 404a and/or an in-data handler component 402a, a boundary separating interface identifiers. Since a protocol address may consist of a single hop, a pair of interface identifiers corresponding to an address separator portion 604d may identify network interfaces in a hop identified in a protocol address. An address separator field 604d1 includes one 0-valued bit followed by four 1-valued bits. The 0-valued bit may be defined to indicate that a first network interface in a first hop identifier is 1 bit long with a corresponding position in the address information field 606d. FIG. 6D identifies the first interface identifier as the number 1 in base ten. The four 1-valued bits in the first address separator field 604d1 may be similarly defined to identify the location of a second interface identifier in the first hop identifier. The second interface identifier, as illustrated in FIG. 6D, has the value 10 in base ten. The first hop identifier includes the numbers 1 and 10. A second hop identifier is located by the end of the series of four 1-valued bits in the first address separator field 604d1 to a series of three 0-valued bits that identify a boundary of a second address separator field 604d2 for second hop information identifying a second hop identifier, and the three 0-valued bits also identify the location of a first interface identifier in second hop information in the address information field 606d. Two subsequent 1-valued bits identify the location in the address field 606d of a second interface identifier in the second hop information. The second hop identifier includes the numbers 6 and 0 in base ten. The remaining address separator fields 604d may be processed similarly.

The path-based protocol address illustrated FIG. 6D may be represented textually as 1-10.6-0.0-5.1-14.5-0.6. Note that the last hop mask does not identify a pair of identifiers and is similar to address portions identified based on address separator fields 604c described with respect to FIG. 6C or may be a local scoped address. This is illustrated to demonstrate that path-based protocol addresses may be uniform or non-uniform in their format and content. FIG. 6D illustrates that hop identifiers may be protocol addresses with respect to one or both nodes in the respective hops identified by the hop identifiers. A hop identifier may serve as a protocol address to identify a next node in the context of a path node, in a network path, identified the hop. A hop identifier may serve as a protocol address to identify a previous node for a path node in the network path.

In FIG. 5B, a source node 502b may identify a destination node 506b by a destination path-based protocol address, where the path-based protocol address is based on pairs of interface identifiers that identify path segments as described in the previous paragraphs. For example, FIG. 5B illustrates a sequence of pairs of interface identifiers 151-254.151-254.253-105 may be a path-based protocol address that identifies the destination node 506b. The source node 502b may send a data unit including an address representation 602d illustrated in FIG. 6D. Note that reversing the interface identifiers yields the identifier 105-253.254-151.254-151 that may be a path-based protocol address that identifies the source node 502b in a data unit exchanged by the source node 502b and the destination node 506b For the first path node 504b1, an address representation 602d in a data unit including data received from the source node 502b may include previous address information, identified by a routing component 404a based on one or more address separator fields 604, that identifies the path segment identifier 151-254 and/or that identifies the path segment identifier 254-151. The sequence ordered as 151-254 may be a path segment identifier, in a destination path-based protocol address, that identifies the first path node 504b1. The sequenced ordered as 254-151 may be a path segment identifier, in source path-based protocol address, that identifies the source node.

Further for the first path node 504b1, the address representation 602d may include next address information identified by the routing component 404a based on one or more address separator fields 604d that identify the sequence 151-254.253-105 in a first order and/or in a second order. The sequence 151-254.253-105 in the first order may identify a path-based protocol address that identifies the destination node 506b. The sequence 105-253.254-151 in the second order may identify a path-based protocol address that identifies the first path node 504b1.

Still further, for the first path node 504b1, the next address information identified by the routing component 404a identifies the sequence 151-254 in a first order and/or in a second order. The sequence 151-254 in the first order may be a path segment identifier, in the destination path-based protocol address, that identifies a second path node 504c2 in a network path to the destination node 506b. The sequence 254-151 in the second order may be a path segment identifier, in the source path-based protocol address, that identifies the first path node 504b1. A sequence of hop identifiers based on interface identifiers may serve as a first path-based protocol address when processed in one order of the sequence and may serve as a second path-based protocol address when processed according to another order of the sequence.

Figure 6E:
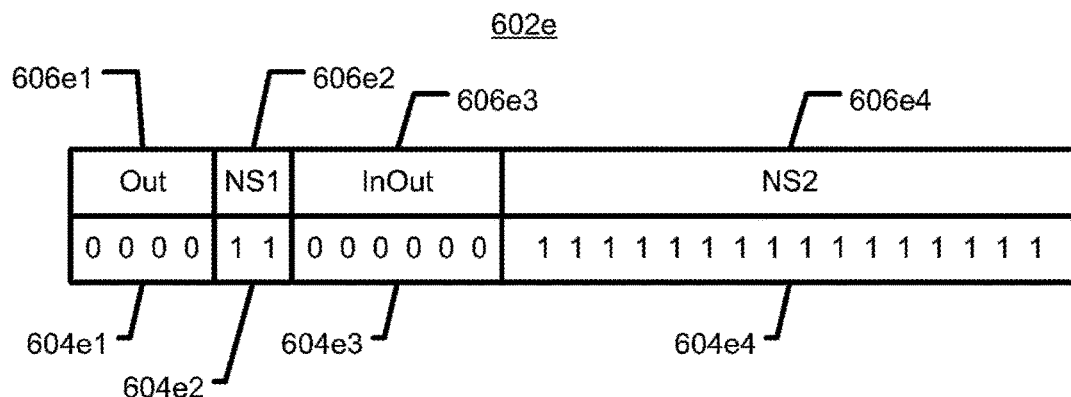
FIG. 6E is a diagram illustrating an exemplary representation of a path-based protocol address according to another aspect of the subject matter described herein.

FIG. 6E illustrates an address representation 602e that further demonstrates that an address handler component 404a may detect a path segment identifier that identifies a network path to a next node, in a path-based protocol address. An address representation 602e may include portions that include path information and/or portions that include scoped protocol addresses. A routing component 404a may distinguish path segment identifiers in portions of a path-based protocol address based on address separator fields 604e. Address separator fields 604e may be defined to identify path segment identifiers in the portions in a manner similar to the method described for distinguishing hop identifiers in FIG. 6C. A previous address information field 606e1, in FIG. 6E, corresponding to a first address separator field 604e1 includes a single interface identifier for an outbound network interface for the source node 502c as described above with respect to FIG. 6A and FIG. 5C. A next address information field 606e2 corresponding to a second address separator field 604e2 may include a scoped protocol address having an inside scope, an outside scope, or both. A node processing the second address information field 606e2 may be included in a portion of a network spanned by the scope of the scoped protocol address. The node may process the scoped protocol address accordingly. See application Ser. No. 11/962,285, by the present inventor, filed on 2007 Dec. 21, entitled "Methods and Systems for Sending Information to a Zone Included in an Internet Network" for a description of addresses having outside scope and/or inside scope and processing of such addresses. A third address information field 606e3 corresponding to a third address separator field 604e3 may include a pair of identifiers as described with respect to FIG. 6D. A fourth address information field 606e4 corresponding to a fourth address separator field 604e4 may include a path segment identifier as described with respect to the next address information field 606e2 such as a local scoped address.

In FIG. 5B, a source node 502b may be included in a first region that includes network interfaces coupling nodes to a first network 514b1 included in a network 500b. A destination node 506b may be included in a third region that includes network interfaces coupling nodes to a third network 514b3. Each of the two nodes may identify the other by a path-based protocol address. For example, a sequence of local scoped addresses 254.254.105 may be a sequence of path segment identifiers in a protocol address that may identify the destination node 506*b* to the source node 502*b* as well as to other nodes in the first region defined by the first network 514*b*1. A data unit including an address representation 602*e* in FIG. 6E may identify path segment identifiers based on a sequence of scoped addresses.

For a second path node 504*b*2, an address representation 602*e* in a data unit including data received from the source node 502*b* may include previous address information identified by a routing component 404*a* in the second path node 504*b*2 based on one or more address separator fields 604*e* that identifies a previous path segment identifier 254.254 in previous address information in the address representation 602*e*. The previous path segment identifier may identify a protocol address that identifies the second path node 504*b*2. Further, for the second path node 504*b*2, the previous address information identified by a routing component 404*a* in the second path node 504*b*2 identifies a first path segment identifier 254 that identifies a network interface of the second path node 504*b*2 to nodes with network interfaces in the second network 514*b*2. Yet further for the second path node 504*b*2, the address representation 602*e* may include next address information identified by the routing component 404*a* in the second path node 504*b*2 based on one or more address separator fields 604*e* that identifies a scoped address 105. The scoped address 105 in the scope of the third network 514*b*3 identifies the destination node 506*b* to nodes with network interfaces in the third network 514*b*3, such as the second path node 504*c*2.

Returning to FIG. 2, a block 206 illustrates that the method yet further includes determining, based on the current-next path segment identifier, a current-next network interface that is included in the current-next path segment. Accordingly, a system for routing based on a path-based protocol address includes means for determining, based on the current-next path segment identifier, a current-next network interface that is included in the current-next path segment. For example, the arrangement illustrated in FIG. 3, includes the forwarding component 306 that is operable for and/or otherwise is included in determining, based on the current-next path segment identifier, a current-next network interface that is included in the current-next path segment; and. FIGS. 4A-C illustrate forwarding components 406 as adaptations and/or analogs of the forwarding component 306 in FIG. 3. One or more forwarding components 406 operate in an execution environment 401.

In FIG. 4A, a routing component 404*a* may provide a path segment identifier of a network path to a next node and/or forwarding information based on the path segment identifier to a forwarding component 406*a* to determine a network interface to send data from a source node 502 to a destination node 506 via a next node in a network path from a current node 504 including the forwarding component 406*a*. In FIG. 4A, a forwarding component 406*a* is illustrated operatively coupled to a network layer component 403*a* and operatively coupled to the routing component 404*a*.

In an aspect, determining a next network interface based on a path segment identifier of a next node may include detecting an interface identifier in the path segment identifier. In FIG. 5C, data in a data unit may be received by the seventh path node 504*c*7 from the source node 502*c*. Address information in the data unit may identify the destination node 506*c* via a protocol address 0.1.3.2.3.0.51 representing a sequence of hops in a network path including the source node 502*c* and the destination node 506*c*.

As described above, the routing component may determine that a path segment identifier based on the sequence 3.0.51 identifies a network path to the destination node 506*c*. Further, the hop identifier 3 may be a path segment identifier identifying a network path to the eighth path node 504*c*8 as a next node. The number 3, as described above is assigned to identify a hop including the seventh path node 504*c*7 and the eighth path node, and thus identifies a network interface, in the seventh path node 504*c*7, that is included in the hop.

Identifying a next network interface may include performing a mapping and/or lookup that maps a portion of a path segment identifier identifying a network path to a next node to an identifier that identifies a NIC 405*a* to a link layer component 407*a*. A next network interface may be identified by mapping a path segment identifier to a link layer address by means of a lookup table or record associating the path segment identifier with the link layer address.

A path-based protocol addresses illustrated in any of FIGS. 6A-E may include a path segment identifier identifying network path to next nodes. In some aspects, a path segment identifier of a network path to a next node includes an identifier of a network interface for transmitting data to a destination protocol address via a network path that includes the network path to the next node identified by the path segment identifier. Routing tables and/or routing policies are not required when protocol addresses include path segment identifiers.

Returning to FIG. 2, a block 208 illustrates that the method yet further includes sending, via the current-next network interface, the data to the next node. Accordingly, a system for routing based on a path-based protocol address includes means for sending, via the current-next network interface, the data to the next node. For example, the arrangement illustrated in FIG. 3, includes the out-data handler component 308 that is operable for and/or otherwise is included in sending, via the current-next network interface, the data to the next node. FIGS. 4A-C illustrate out-data handler components 407*a* as adaptations and/or analogs of the out-data handler component 308 in FIG. 3. One or more out-data handler components 407*a* operate in an execution environment 401.

In FIG. 4A, a forwarding component 406*a* may provide data to an out-data handler component 408*a* to send the data to a next node via an identified network interface identified by forwarding component 406*a*. The next node may be a destination node 506 or a path node 504 in a network path for transmitting data from a source node 502 to the destination node 506. In FIG. 4A, an out-data handler 406*a* is illustrated operating in a network layer component 403*a*. The out-data handler component 402*a* may include the data in one or more network layer protocol data units including a path-based protocol address, as described above, identifying the destination node 506 according to a network layer protocol of the network protocol component 403*a*.

The one or more network layer protocol data units may be provided to a link layer component 407*a* as data to include in one or more link layer protocol data units to transmit via a NIC 405*a* based on the network interface identified by the forwarding component 406*a*. In a node with one NIC operatively coupled to a physical data transmission medium or with multiple NICs operatively coupled to the shared data transmission medium, an out-data handler component 408*a* may send network layer data packets via the one NIC or any of the multiple NICs over the physical data transmission medium for delivery to the destination node 506 according to network interface identified by the forwarding component 406*a*. Link layer protocol data units may be sent by the link layer component 407*a* according to a compatible link layer protocol and link layer address information. For example, Ethernet frames may be sent as link layer protocol data units via an Ethernet cable operatively coupled to a NIC 405a1 included in a suitable network path for transmitting the data to the destination node 506.

FIG. 4B illustrates another exemplary execution environment 401b that may include and/or otherwise be provided by a path node 504 in FIGS. 5A-C. In FIG. 4B, the execution environment 401b includes a first line card 409b1 that includes a first NIC 405b1. The first NIC 405b1 may operatively couple the path node 504 to a previous network path with respect to data from a source node 502 to relay to a destination node 506. The execution environment 401b also includes a second line card 409b2 including a second NIC 405b2 to operatively couple the path node 504 to a next network path with respect to the data from the source node 502.

Data sent from a source node 502 to an identified destination node 506 may be received in a data unit of a network protocol by the first NIC 405b1 in the path node 504. The data may be detected by an in-data handler component 402b1 operatively coupled to the first NIC 405b1. A path-based protocol address may be detected in an address representation included in the data unit according to the network protocol. The in-data handler component 402b1 may send the some or all of the path-based protocol address to a routing component 404b via an internal communications medium 421b, such as a bus 116 in FIG. 1, to determine a path segment identifier, in a path-based protocol address, that identifies a next node. The routing component 404b may include, be processed by, and/or otherwise interoperate with a general processing unit 419b and/or other hardware in processing the address information. A routing component 404b may be included, in some aspects, to also process protocol addresses that do not include an identifier of the next network interface component or for routing IP addresses from global address spaces as currently specified by RFC 791 and RFC 3513.

The routing component 404b may determine the path segment identifier of the next node as describe above and/or in an analogous manner. The routing component 404b may provide some or all of the path segment identifier to a forwarding component 406b. The forwarding component 406 may identify a second line card 409b2 including a second NIC 405b2, based on some or all of the path segment identifier. The forwarding component 406b may interoperate with the GPU 419b to configure the internal data transmission medium 421b to deliver the data received in the data unit from the first line card 409b1 to the second line card 409b2 for final packaging in one or more data units of the network protocol by an out-data handler component 408b2. The out-data handler component 402b2 may interoperate with a second NIC 405b to transmit the data via a data transmission medium to which the second NIC 405b2 is operatively coupled.

FIG. 4C illustrates still another exemplary execution environment 401c that may include and/or otherwise be provided by a path node 504 illustrated in FIGS. 5A-C. In FIG. 4C, the execution environment 401c includes a first line card 409c1 that includes a first NIC 405c1. The first line card 405c1 may operatively couple the path node 504 to a previous network path with respect to data from a source node 502 to relay to a destination node 506. The execution environment 401c also includes a second line card 409c2 including a second NIC 405c2 to operatively couple the path node 504 to a next network path with respect to the data from the source node 502.

In FIG. 4C, a routing component may be a distributed component. FIG. 4C illustrates that a routing component may be realized as routing agent components 404c included in line cards 409c in a path node 504. A forwarding component may also be distributed as illustrated in FIG. 4C by forwarding agent components 406c included in the line cards 409c. An FA component 406c1 may configure a switch interconnect unit (SIU) 421c to provide a communication channel from a first line card 409c1 to a second line card 409c2 and vice versa, as needed. Each line card 409c may include a switch interface (SI) component 423c to write data to a channel configured in the SIU component 421c and/or to read data from a channel.

A routing agent (RA) component, such as a first RA component 404c1, may identify a path segment identifier based on address information detected by a first in-data handler (IDH) component 402c1. Based on some or all of the path segment identifier, the first FA component 406c1 may identify a next line card 409c, such as the second line card 409c2, to transmit data received from a source node 502 to a next node identified by the path segment identifier as described above with respect to FIG. 4A and FIG. 4B. The first FA 406c1 may setup a channel in the SIU component 421c for communicating the data via a first SI component 423c1 to a second SI component 423c2 of the second line card 409c2. The second SI component 423c2 may read the data communicated via the SIU component 421c and provide the data to a second out-data handler (ODH) component 408c2 in the second line card 409c2 to transmit to the next node. Data may be relayed from the destination node 506 to the source node 502 via a second IDH component 402c2 and a first ODH component 408c1 in an analogous manner.

The following aspects of the method illustrated in FIG. 2 have been described above and illustrated in the drawings identified above.

Detecting the data may include receiving the data in a data unit sent by a previous node based on a previous-current path segment identifier, in the plurality, that identifies the current node with respect to the previous node.

The first path-base protocol address may identify a destination node for receiving the data from a source node, via the current node and the next node, according to the network protocol. The first path-base protocol address may include the plurality in an identified first order that identifies the destination node, and the plurality in an identified second order may be included in a second path-based protocol address for transmitting data from the destination node to the source node in one or more data units of the network protocol. The first order and/or the second order may be identified by sequence information represented separately from the plurality. The current node may be the source node. The next node may be the destination node.

The first path-base protocol address may be a scope-specific protocol address that, in a source scope-specific address space specific to a first region of the network that includes the source node, identifies the destination node included in the network outside the first region. In still another aspect, the first path-base protocol address may be a nested protocol address that includes a protocol address that identifies a node in the network path other than the source node and the destination node.

The current-next path segment identifier may include a local scoped address that identifies the next node in a region of the network that includes both the next network interface of the current node a network interface of the next node for receiving the data. In another aspect, the current-next path segment identifier may be included in a nested protocol address that includes a protocol address that identifies a node in a network path for transmitting the data from the current node to the next node. In an additional aspect, the current-next path segment identifier may be included in a scope-specific protocol address that, in a current scope-specific address space specific to a current region of the network that includes the current node, identifies the next node that is outside the current region.

In yet another aspect, the current-next path segment identifier may include a next hop identifier that identifies a next pair of consecutive nodes in a network path from the current node to the next node for transmitting the data to the next node. One or more of the current node and the next node may be included in the next hop. The next hop identifier may identify the next hop to one or more of the current node and the next node. The next hop identifier may include one or more of a next interface identifier that identifies the network interface and next-current interface identifier that identifies a next-current network interface in the next node for receiving the data. The next hop identifier may be the smallest identifier available, according to a size criterion, in an identifier space for at least one of the current node and the next node.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that operate to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a non-transitory computer readable medium for use by or in connection with an instruction execution machine, system, apparatus, or device, such as a computer-based or processor-containing machine, system, apparatus, or device. As used here, a "non-transitory computer readable medium" may include one or more of any suitable media for storing the executable instructions of a computer program in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. A non-exhaustive list of conventional exemplary non-transitory computer readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-ray™ disc; and the like Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

Figure 7:
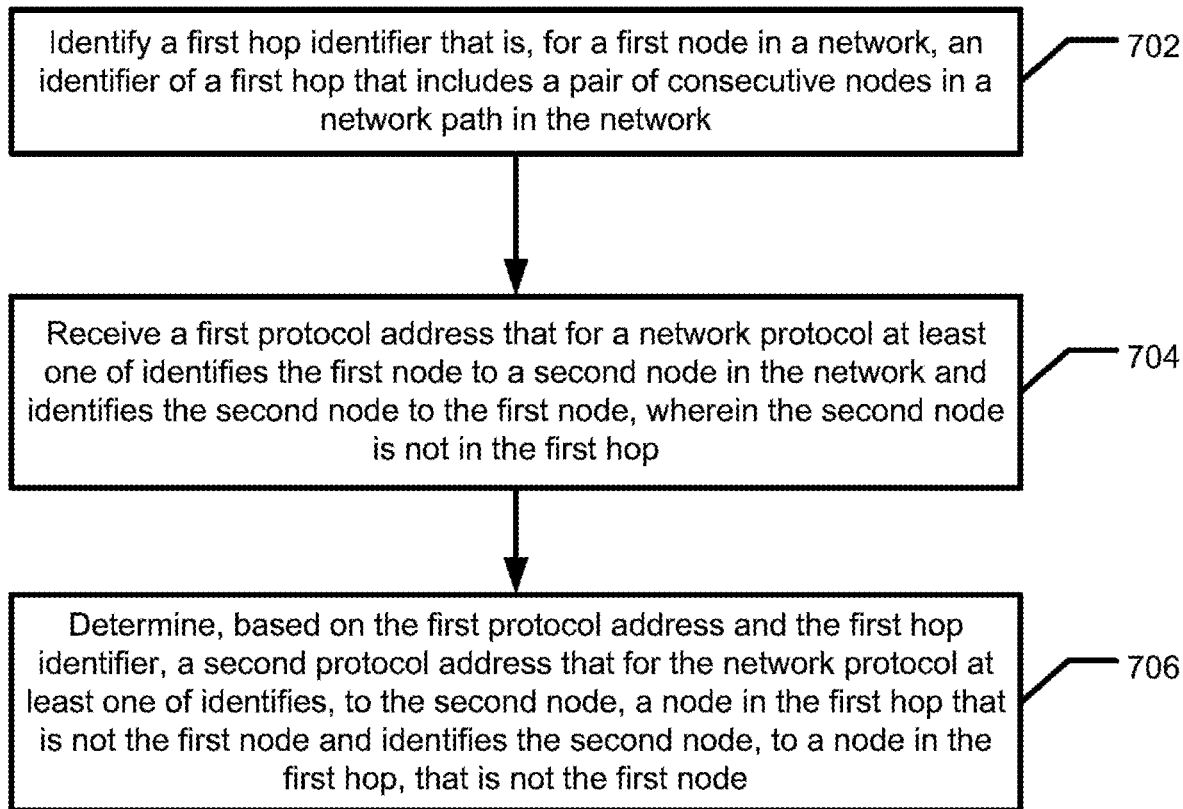
FIG. 7 is a flow diagram illustrating a method for determining a protocol address for a node according to an aspect of the subject matter described herein.
Figure 8:
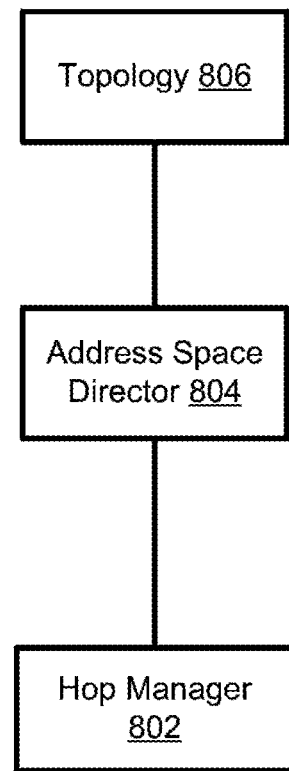
FIG. 8 is a block diagram illustrating an arrangement of components for determining a protocol address for a node according to another aspect of the subject matter described herein

FIG. 8 illustrates an arrangement of components in a system that operates in an execution environment, such as execution environment 102 in FIG. 1. The arrangement of components in the system operates to perform the method illustrated in FIG. 7. The system illustrated includes a hop manager component 802, an address space director component 804, and a topology component 806. The execution environment includes a processor, such as the processor 104, to process an instruction in at least one of the hop manager component 802, the address space director component 804, and the topology component 806.

With reference to FIG. 7, a block 702 illustrates that the method includes identifying a first hop identifier that is, for a first node in a network, an identifier of a first hop that includes a pair of consecutive nodes in a network path in the network. Accordingly, a system for determining a protocol address for a node includes means for identifying a first hop identifier that is, for a first node in a network, an identifier of a first hop that includes a pair of consecutive nodes in a network path in the network. For example, the arrangement illustrated in FIG. 8, includes a hop manager component 802 operable for and/or otherwise included in identifying a first hop identifier that is, for a first node in a network, an identifier of a first hop that includes a pair of consecutive nodes in a network path in the network.

In an aspect, hop information may be received in an exchange between a first node in a hop and one or more of a second node in the hop and a third node in the network. A hop may be detected in response to exchanging and/or otherwise receiving the hop information.

Further, hop information for a network protocol may be detected by detecting an active protocol end point, such as a TCP port, for the network protocol and/or any network protocol included in activating the protocol endpoint.

Hop information may be received in response to a user input detected by an input device. In an aspect, the hop information may be included in topology information that identifies a network topology or part of a network topology.

In FIG. 5A, the third edge node 508a3 as described above may host a topology service that maintains network topology information. Such a node may be referred to as a topology node. Some or all of the network topology information may be received via an input device in response to a user input. A user may provide, via one or more input devices, hop information that identifies one or more of the first path node 504a1, the second path node 504a2, and a communicative relationship that identifies the hop.

Hop information for a hop may be exchanged and/or received in response to detecting a change in a state of an operable coupling between a network and a network interface included in the hop and included in a node in the hop. Detecting the change may include detecting that the state indicates that the operable coupling is inoperative and subsequently detecting that the state indicates the operable coupling is operative. Detecting the change may include detecting that the state indicates that the operable coupling is operative and subsequently detecting that the state indicates the operable coupling is inoperative.

Hop information may identify an interface identifier that identifies at least one of a first network interface by which a first node is included in a hop and a second network interface by which a second node is included in the hop.

Determining that a hop identifier meets an identified hop identifier criterion may include determining that the hop identifier is the smallest, available hop identifier in an identifier space of hop identifiers.

Determining that a hop identifier meets an identified hop identifier criterion may include identifying a threshold condition that is based on the hop identifier criterion. The determining may further include detecting that the threshold condition is met by the hop identifier. The hop identifier may be determined in response to detecting that the threshold condition is met. A threshold condition may be evaluated based on a count of network interfaces included in one or more nodes in a hop, a size of a location in a data storage medium to store a hop identifier, a size of a representation of a hop identifier in a signal propagated by a specified data transmission medium, a size of a hop identifier included in a protocol address in a data unit that is valid according to a network protocol, and/or a time period to process a hop identifier included in a protocol address, to name a few examples.

A hop identifier criterion may specify and/or otherwise identify some or all of a schema that defines a valid format and/or a valid vocabulary for a representation of a hop identifier when included in a protocol address identifying a protocol endpoint of a network protocol. In an aspect, the schema may specify and/or otherwise identify a format rule defining a valid size of the representation in the protocol address included in a data unit of the network protocol. A size specified by a schema may identify a maximum size for a representation of a hop identifier. A size specified by a schema may identify a minimum size for a representation of a hop identifier. A size may identify an optimum or preferred size, based on a specified criterion, for a representation of a hop identifier. A size specified by a schema may identify a maximum size for an interface identifier included in a hop identifier. A size specified by a schema may identify a minimum size for an interface identifier included in a hop identifier. A size may identify an optimum or preferred size, based on a specified criterion, for an interface identifier included in a hop identifier.

A hop identifier may be based on one of more network interfaces in nodes in the hop. More generally a hop identifier may be based on one or more network interfaces in one more nodes for which a hop identifier serves to identify a particular hop. Thus, with respect to the method in FIG. 7 the first hop identifier may be identified based on one or more of a first network interface in the first node and a second network interface in a node in the first hop, and/or a network interface in a node in a network path that from the first node to a node in the first hop. Further, with respect to the method in FIG. 7, the first hop identifier may include a path identifier that identifies a network path included in communicatively coupling the first node to a node in the first hop. The first hop identifier of FIG. 7 may include a protocol address for the network protocol that at least one of identifies the first node to a node in the hop and identifies a node in the hop to the first node.

Returning to FIG. 7, block 704 illustrates that the method further includes receiving a first protocol address that for a network protocol at least one of identifies the first node to a second node in the network and identifies the second node to the first node, wherein the second node is not in the first hop. Accordingly, a system for determining a protocol address for a node includes means for receiving a first protocol address that for a network protocol at least one of identifies the first node to a second node in the network and identifies the second node to the first node, wherein the second node is not in the first hop. For example, the arrangement illustrated in FIG. 8, includes an address space director component 804 operable for and/or otherwise included in receiving a first protocol address that for a network protocol at least one of identifies the first node to a second node in the network and identifies the second node to the first node, wherein the second node is not in the first hop.

Returning to FIG. 7, a block 706 illustrates that the method yet further includes determining, based on the first protocol address and the first hop identifier, a second protocol address that for the network protocol at least one of identifies, to the second node, a node in the first hop that is not the first node and identifies the second node, to a node in the first hop, that is not the first node. Accordingly, a system for determining a protocol address for a node includes means for determining, based on the first protocol address and the first hop identifier, a second protocol address that for the network protocol at least one of identifies, to the second node, a node in the first hop that is not the first node and identifies the second node, to a node in the first hop, that is not the first node. For example, the arrangement illustrated in FIG. 8, includes an topology component 806 operable for and/or otherwise included in determining, based on the first protocol address and the first hop identifier, a second protocol address that for the network protocol at least one of identifies, to the second node, a node in the first hop that is not the first node and identifies the second node, to a node in the first hop, that is not the first node.

In a further aspect, a hop identifier may identify a hop to a node where the node is not in the hop.

As described above, one or more nodes in a network 500, as illustrated in FIGS. 5A-C, may individually or cooperatively operate to perform the method of FIG. 7. An adaptation, analog, and/or instance of the arrangement of components in FIG. 8 may operate in a topology service that includes a topology node in a network. Hop information and protocol addresses may be detected and/or reported to the topology node. The topology node may create, update, and/or otherwise maintain a representation of a topology of some or all of a network. The topology node may be included in a group of topology nodes in a topology service or system. Each of the topology nodes may maintain a representation of a topology for a portion of the network and/or for the entire network. As used herein, the term topology node is used interchangeably with the term topology execution environment, which is an execution environment that hosts a topology service or a portion thereof. A topology execution environment may include and/or otherwise be hosted by one or more nodes.

In an aspect, a topology system may include topology nodes organized as a hierarchy of topology nodes that maintain a hierarchy of the representations of respective portions of a topology of a network. In another aspect, topology nodes may operate in a peer-to-peer system.

In yet another aspect of the method, in FIG. 7, the second protocol address may be associated with a symbolic identifier of one of the path end nodes of the network path. The symbolic identifier may be resolved to the second protocol address and vice versa.

Figure 9:
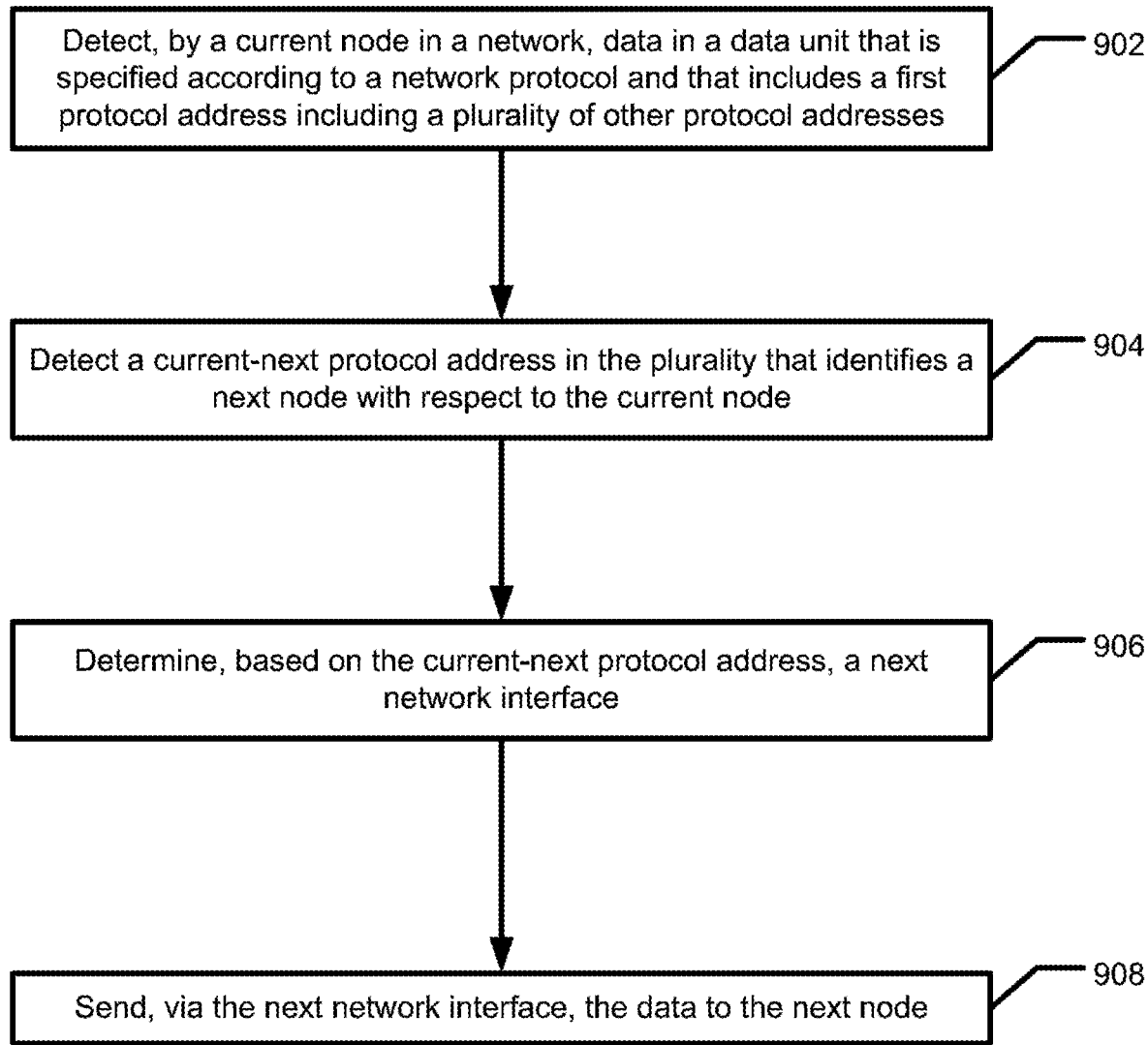
FIG. 9 is a flow diagram illustrating a method for routing based on a nested protocol address according to an aspect of the subject matter described herein.

With reference to FIG. 9, a block 902 illustrates that the method includes detecting, by a current node in a network, data in a data unit that is specified according to a network protocol and that includes a first protocol address including a plurality of other protocol addresses. Accordingly, a system for routing based on a nested protocol address includes means for detecting, by a current node in a network, data in a data unit that is specified according to a network protocol and that includes a first protocol address including a plurality of other protocol addresses. For example, the arrangement illustrated in FIG. 3, includes the in-data handler component 302 operable for and/or otherwise included in detecting, by a current node in a network, data in a data unit that is specified according to a network protocol and that includes a first protocol address including a plurality of other protocol addresses. FIGS. 4A-C illustrate in-data handler components 402 as adaptations and/or analogs of the in-data handler component 302 in FIG. 3. One or more in-data handler components 402 operate in an execution environment 401. In FIG. 4A, an in-data handler component 402a is included in network layer component 403a. In FIG. 4B and in FIG. 4C, in-data handler components 402 operates in respective line card components 409.

Returning to FIG. 9, a block 904 illustrates that the method further includes detecting a current-next protocol address in the plurality that identifies a next node with respect to the current node. Accordingly, a system for routing based on a nested protocol address includes means for detecting a current-next protocol address in the plurality that identifies a next node with respect to the current node. For example, the arrangement illustrated in FIG. 3, includes the routing component 304 operable for and/or otherwise included in detecting a current-next protocol address in the plurality that identifies a next node with respect to the current node. FIGS. 4A-C illustrate routing components 404 as adaptations and/or analogs of the routing component 304 in FIG. 3. One or more routing components 404 operate in an execution environment 401.

Returning to FIG. 9, a block 906 illustrates that the method yet further includes determining, based on the current-next protocol address, a next network interface. Accordingly, a system for routing based on a nested protocol address includes means for determining, based on the current-next protocol address, a next network interface. For example, the arrangement illustrated in FIG. 3, includes the forwarding component 306 operable for and/or otherwise included in determining, based on the current-next protocol address, a next network interface. FIGS. 4A-C illustrate forwarding components 406 as adaptations and/or analogs of the forwarding component 306 in FIG. 3. One or more forwarding components 406 operate in an execution environment 401.

Nested protocol addresses illustrated in FIGS. 6A-E may include protocol addresses that identify a next node. In some aspects, a protocol address of next node includes an identifier of a network interface to transmit data to a destination protocol address via a network path that includes a next node identified by the protocol address. Routing tables and/or routing policies are not required when protocol addresses include identifiers of next nodes. In some aspects, routing tables and routing policies may be supported for some addresses included in destination and/or source protocol address.

Returning to FIG. 9, a block 908 illustrates that the method yet further includes sending, via the next network interface, the data to the next node. Accordingly, a system for routing based on a nested protocol address includes means for sending, via the next network interface, the data to the next node. For example, the arrangement illustrated in FIG. 3, includes the out-data handler component 308 operable for and/or otherwise included in sending, via the next network interface, the data to the next node. FIGS. 4A-C illustrate out-data handler components 408a as adaptations and/or analogs of the out-data handler component 308 in FIG. 3. One or more out-data handler components 408a operate in an execution environment 401.

Figure 10:
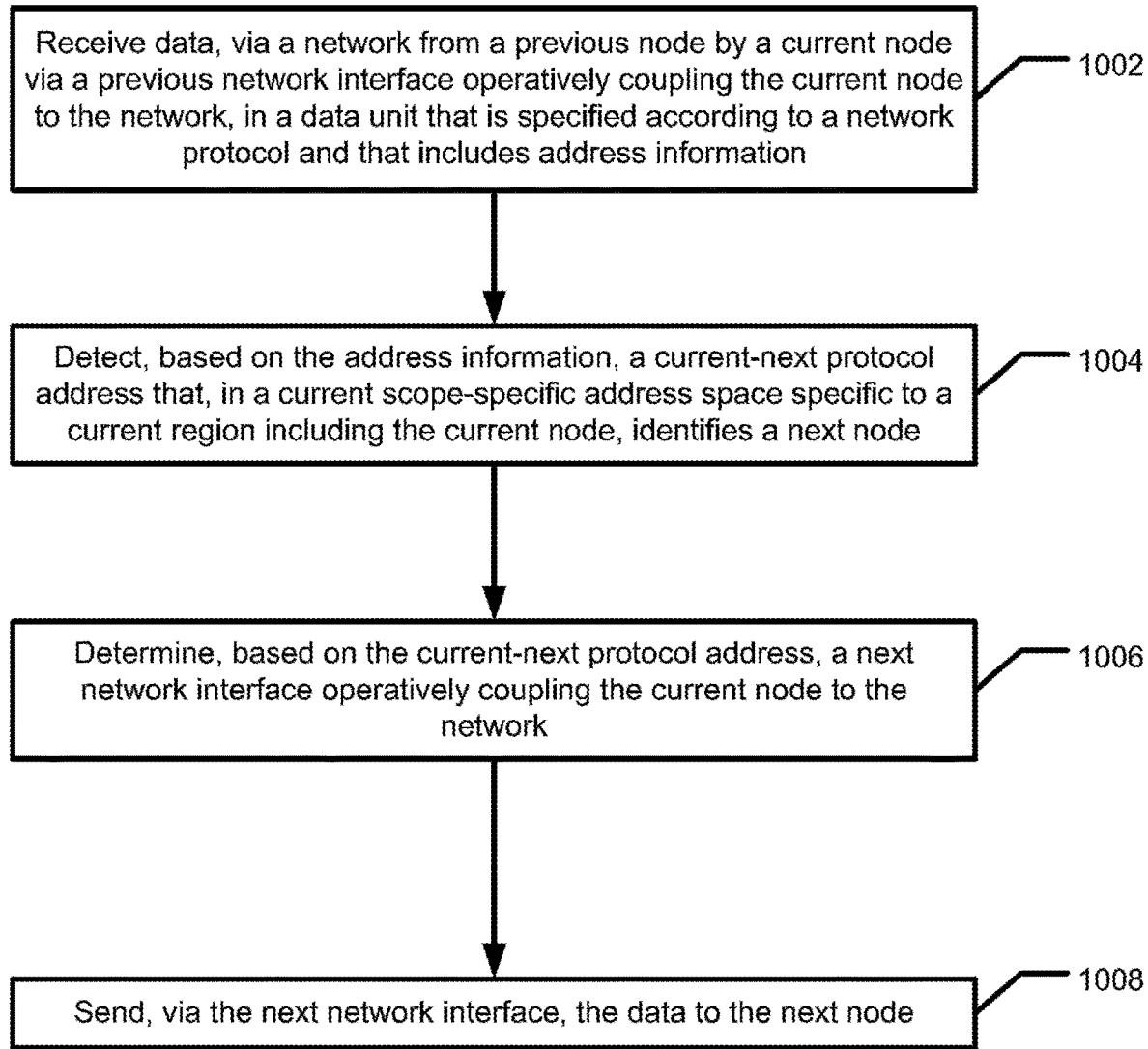
FIG. 10 is a flow diagram illustrating a method for routing based on a scope-specific address space according to an aspect of the subject matter described herein.

With reference to FIG. 10, a block 1002 illustrates that the method includes receiving data, via a network from a previous node by a current node via a previous network interface operatively coupling the current node to the network, in a data unit that is specified according to a network protocol and that includes address information. Accordingly, a system for routing based on a scope-specific address space includes means for receiving data, via a network from a previous node by a current node via a previous network interface operatively coupling the current node to the network, in a data unit that is specified according to a network protocol and that includes address information. For example, the arrangement illustrated in FIG. 3, includes the in-data handler component 302 operable for and/or otherwise included in receiving data, via a network from a previous node by a current node via a previous network interface operatively coupling the current node to the network, in a data unit that is specified according to a network protocol and that includes address information. FIGS. 4A-C illustrate in-data handler components 402 as adaptations and/or analogs of the in-data handler component 302 in FIG. 3. One or more in-data handler components 402 operate in an execution environment 401. In FIG. 4A, an in-data handler component 402a is included in network layer component 403a. In FIG. 4B and in FIG. 4C, in-data handler components 402 operates in respective line card components 409.

Returning to FIG. 10, a block 1004 illustrates that the method further includes detecting, based on the address information, a current-next protocol address that, in a current scope-specific address space specific to a current region including the current node, identifies a next node. Accordingly, a system for routing based on a scope-specific address space includes means for detecting, based on the address information, a current-next protocol address that, in a current scope-specific address space specific to a current region including the current node, identifies a next node. For example, the arrangement illustrated in FIG. 3, includes the routing component 304 operable for and/or otherwise included in detecting, based on the address information, a current-next protocol address that, in a current scope-specific address space specific to a current region including the current node, identifies a next node. FIGS. 4A-C illustrate routing components 404 as adaptations and/or analogs of the routing component 304 in FIG. 3. One or more routing components 404 operate in an execution environment 401.

Address representations 602 in FIGS. 6A-E are described with respect to their inclusion in data units of a network protocol. Each may be identified as scope-specific, by a routing component 404a, by a bit pattern or identifier defined to identify a protocol address type as a scope-specific address type. The bit pattern or identifier may be located by the routing component 404a stored in a type bits portion of an IP packet and/or in some other specified location.

FIG. 6A illustrates an address representation 602a that may be detected by an in-data handler component 402a and/or a routing component 404a in a data unit or packet of an Internet Protocol or other network layer protocol. An address representation 602a may identify one or more scope-specific addresses for a respective one or more nodes in a network path to transmit data from a source node to a destination node via the network path. A routing component 404a, in a current node 504, may process information in a previous protocol address field 608a to identify a previous protocol address that, in a previous protocol address space of a previous node in the network path, identifies the current node 504. A routing component 404a may identify, based on information in a next protocol address field 610a, a next protocol address, that, in a current scope-specific address space of the current node, identifies a next node in the network path. In FIG. 6A previous portion 608a2 may be a scope-specific address of the current node in a region that includes a previous node in a network path from the source node to the current node. A next portion 610a2 may be scope-specific address of a next node to the current node, where the next node is outside a region that includes the current node.

Alternatively or additionally, a routing component 404a may identify, based on information in a next protocol address field 610a, a current protocol address, that, in a next scope-specific address space specific to a next region that includes the next node, identifies the current node. A routing component 404a interoperating with an in-data handler component 402 may determine a next protocol address, in the current scope-specific address space, that identifies the next node, based on the current protocol address. Further, the next scope-specific address space may be a node-specific address space specific to the next node. In another aspect, a routing component may determine the current protocol address based on the next protocol address.

In still another aspect, a scope-specific address may conform to a currently known schema defining a valid Internet Protocol address as specified by RFC 791 and/or RFC 3513 in a scope-specific address spaces specific to a region. The scope-specific address is processed as scope-specific as opposed to interpreting it as included in a global address space as is currently done. In one aspect, a mapping may be specified between two scope-specific address space. In another aspect, a mapping may be specified from a scope-specific address space to a global address space. A mapping may be ruled-based and/or may be specified by associations such as represented by a lookup table.

A routing component 404a in a current node 504 may detect first address information identifying a current-first protocol address that, in a current scope-specific address space specific to a current region that includes the current node 504, identifies a first node in the network. Second address information identifying a first-second protocol address that, in a first scope-specific address space specific to a first region that includes the first node, identifies a second node in a network path including the current node to transmit data from a source node 502 and an identified destination node 506. The routing component 404a operating in the current node 504 may detect a relationship between the current-first protocol address and the first-second protocol address. The routing component 404a may generate a first-to-current mapping rule based on the relationship. The routing component 404a may process the first-second protocol address based on the first-to-current mapping rule to determine a current-second protocol address that, in the current scope-specific address space, identifies the second node in the network path. The second node may be a next node with respect to the current node 504 and the data from the source node 502. The second node may be the destination node 506.

A current-first protocol address 10.22.106.3 from a current scope-specific address space, may serve as an identifier with respect to the current node of a first node in the network. A first-second protocol address 40.88.58.1 in a first scope-specific address space, may serve as an identifier with respect to the first node of a second node. The current-first protocol address and first-second protocol address, in the example, include four parts. A first-first protocol address may be represented as 0.0.0.0 that, in the first scope-specific address spaces identifies the first node. A routing component 404 in the current node 504 may determine that the current-second protocol address, in the current scope-specific address space, for the second node may be calculated based on the mapping rule represented here as 40+10 mod 256.88+22 mod 256.106+58/mod 256.3+1 mod/256, or 50.110.164.4.

The mapping rule may be specific to the current scope-specific address space and the second scope-specific address space, may be specific to an identified group of scope-specific address spaces specific to a respective group of regions, and/or may apply among all scope-specific address spaces in use by nodes in a network. Those skilled in the art will see given the examples than many mapping rules exist that allow protocol addresses to be determined from previous protocol address information and next protocol address information according to the method illustrated in FIG. 10.

A next protocol address and/or a previous protocol address may be determined and/or otherwise identified based on one or more of a schema of one or more of a destination protocol address and/or a source protocol address identified in an address information portion of a data unit, a schema of a scope-specific hop identifier, a mapping between two or more of the schemas or portions thereof of two or more respective scope-specific address spaces, relationships between the nodes to which the protocol addresses are specific, relationships between the scope-specific address spaces of the protocol addresses, and relationships between the nodes in a network that includes them. Some of the relationships listed may be represented in a network topology of the network. A routing component 404 may detect some or all of the network topology in determining a next protocol address and/or a previous protocol address.

Returning to FIG. 10, a block 1006 illustrates that the method yet further includes determining, based on the current-next protocol address, a next network interface operatively coupling the current node to the network. Accordingly, a system for routing based on a scope-specific address space includes means for determining, based on the current-next protocol address, a next network interface operatively coupling the current node to the network. For example, the arrangement illustrated in FIG. 3, includes the forwarding component 306 operable for and/or otherwise included in determining, based on the current-next protocol address, a next network interface operatively coupling the current node to the network. FIGS. 4A-C illustrate forwarding components 406 as adaptations and/or analogs of the forwarding component 306 in FIG. 3. One or more forwarding components 406 operate in an execution environment 401.

For scope-specific protocol addresses that do not include an identifier of a next node, a similar lookup operation may be performed. In an aspect, a scope-specific address may be mapped to another address space such as global protocol address space or subnet-specific protocol address space shared by nodes in a portion of a network such as a LAN and/or a sub-network. Performing a mapping operation may reduce the number of lookup tables and/or records that must be maintained and/or otherwise accessed.

Protocol addresses illustrated in FIGS. 6A-E may include identifiers from scope-specific address spaces that identify a next node. In some aspects, a protocol address of next node includes an identifier of a network interface to transmit data to a destination protocol address via a network path that includes a next node identified by the protocol address. Routing tables and/or routing policies are not required when protocol addresses include identifiers of next nodes. In some aspects, routing tables and routing policies may be supported to support addresses from a global protocol address space and may be supported when a hop identifier identifies a pair of nodes in a network path that are communicatively coupled via one or more other path nodes.

Returning to FIG. 10, a block 1008 illustrates that the method yet further includes sending, via the next network interface, the data to the next node. Accordingly, a system for routing based on a scope-specific address space includes means for sending, via the next network interface, the data to the next node. For example, the arrangement illustrated in FIG. 3, includes the out-data handler component 308 operable for and/or otherwise included in sending, via the next network interface, the data to the next node. FIGS. 4A-C illustrate out-data handler components 407a as adaptations and/or analogs of the out-data handler component 308 in FIG. 3. One or more out-data handler components 407a operate in an execution environment 401.

The following aspects of the method illustrated in FIG. 10 have been described above and illustrated in the drawings identified above. The address information referred to FIG. 10 may include next protocol address information for identifying one or more of the current-next protocol address and a next-current protocol address that, in a next scope-specific address space specific to a next region including the next node, identifies the current node. Further, the address information may include previous protocol address information for identifying at least one of a previous-current protocol address that, in a previous scope-specific address space specific to a previous region that includes the previous node, identifies the current node and a current-previous protocol address that, in the current scope-specific address space, identifies the previous node.

A first hop including a first hop node and a second hop node, both in the network path, may be identified with respect to the previous node by a previous hop identifier in a previous scope-specific address space specific to a previous region that includes the previous node, identified with respect to the current node by a current hop identifier in the current scope-specific address space, and identified with respect to the next node by a next hop identifier in a next scope-specific address space specific to a next region that includes the next node.

The first hop identifier may be assigned from a first scope-specific address space specific to a first region that includes a network interface in the first hop node to identify the first hop in response to a negotiation between the nodes in the first hop.

A current-first path hop identifier that, in the current scope-specific address space, identifies the first hop and the current-first path identifier includes the first hop identifier, wherein the current-first path identifier identifies a network path that includes the current node as a path end node, the first hop node, and the second hop node. The first hop may be included in communicatively coupling the current node and one of the source node and the destination node. The current node may be either the first hop node or the second hop node. The previous-current protocol address may include the first hop identifier or the current-next protocol address may include the first hop identifier.

Figure 11:
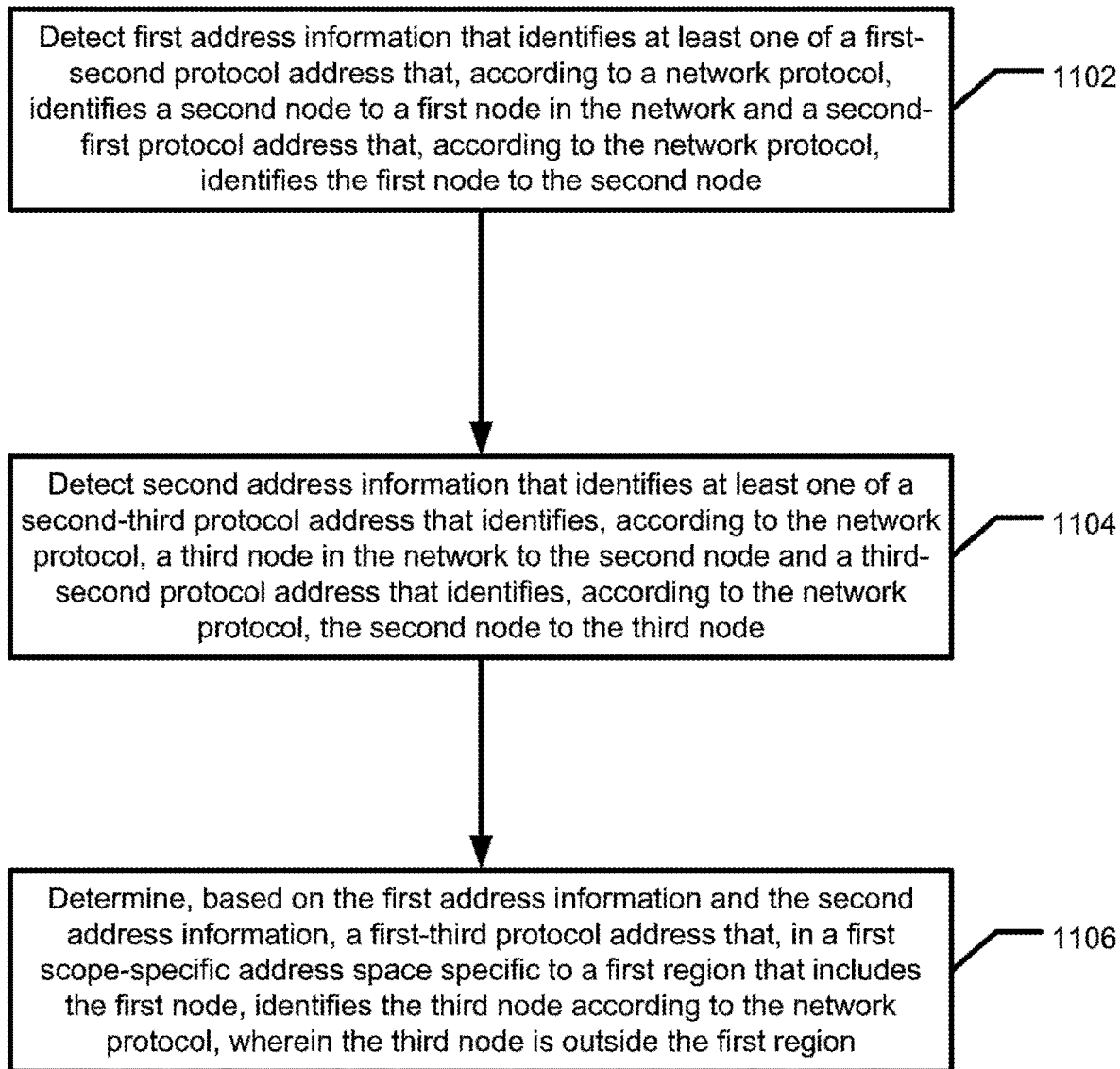
FIG. 11 is a flow diagram illustrating a method for identifying a protocol address in a scope-specific address space according to an aspect of the subject matter described herein.
Figure 12:
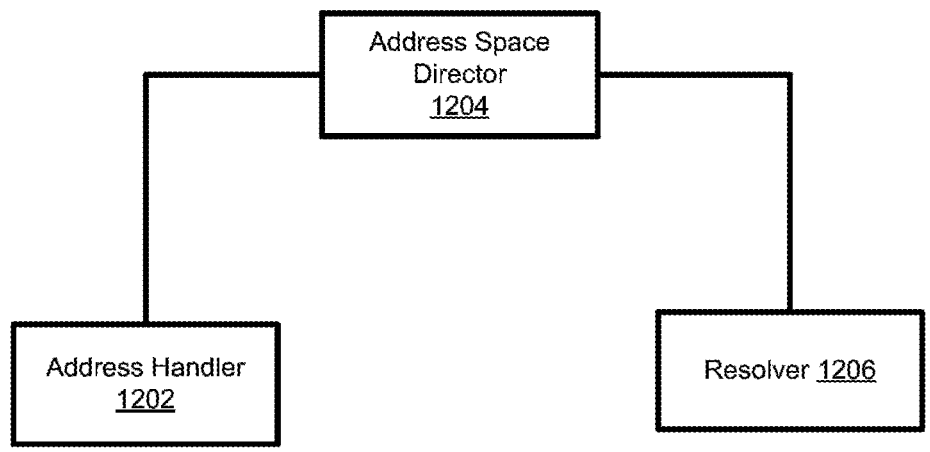
FIG. 12 is a block diagram illustrating an arrangement of components for identifying a protocol address in a scope-specific address space according to another aspect of the subject matter described herein.

FIG. 12 illustrates an arrangement of components in a system that operates in an execution environment, such as execution environment 102 in FIG. 1. The arrangement of components in the system operates to perform the method illustrated in FIG. 11. The system illustrated includes an address handler component 1202, an address space director component 1204, and a resolver component 1206. A suitable execution environment includes a processor, such as processor 104, to process an instruction in at least one of the address handler component 1202, the address space director component 1204, and the resolver component 1206.

With reference to FIG. 11, block 1102 illustrates that the method includes detecting first address information that identifies at least one of a first-second protocol address that, according to a network protocol, identifies a second node to a first node in the network and a second-first protocol address that, according to the network protocol, identifies the first node to the second node. Accordingly, a system for identifying a protocol address in a scope-specific address space includes means for detecting first address information that identifies at least one of a first-second protocol address that, according to a network protocol, identifies a second node to a first node in the network and a second-first protocol address that, according to the network protocol, identifies the first node to the second node. For example, the arrangement illustrated in FIG. 12, includes an address handler component 1202 that is operable for and/or otherwise is included in detecting first address information that identifies at least one of a first-second protocol address that, according to a network protocol, identifies a second node to a first node in the network and a second-first protocol address that, according to the network protocol, identifies the first node to the second node.

As described herein, a first node may detect address information that identifies a first-second protocol address that, in a first scope-specific address space specific to a first region that includes the first node, identifies the second node. Alternatively or additionally, the second node may detect address information that identifies a second-first protocol address that, in a second scope-specific address space specific to a second region that includes the second node, identifies the first node to the second node. Alternatively or additionally, the second node may receive address information identifying the first-second protocol address. The second node may determine the second-first protocol address based on the first-second protocol address. Alternatively or additionally, the first node may receive the second-first protocol address. The first node may determine the first-second protocol address based on the second-first protocol address.

Returning to FIG. 11, block 1104 illustrates that the method further includes detecting second address information that identifies at least one of a second-third protocol address that identifies, according to the network protocol, a third node in the network to the second node and a third-second protocol address that identifies, according to the network protocol, the second node to the third node. Accordingly, a system for identifying a protocol address in a scope-specific address space includes means for detecting second address information that identifies at least one of a second-third protocol address that identifies, according to the network protocol, a third node in the network to the second node and a third-second protocol address that identifies, according to the network protocol, the second node to the third node. For example, arrangement illustrated in FIG. 12, includes address space director component 1204 that is operable for and/or otherwise is included in detecting second address information that identifies at least one of a second-third protocol address that identifies, according to the network protocol, a third node in the network to the second node and a third-second protocol address that identifies, according to the network protocol, the second node to the third node.

Returning to FIG. 11, block 1106 illustrates that the method yet further includes determining, based on the first address information and the second address information, a first-third protocol address that, in a first scope-specific address space specific to a first region that includes the first node, identifies the third node according to the network protocol, wherein the third node is outside the first region. Accordingly, a system for identifying a protocol address in a scope-specific address space includes means for determining, based on the first address information and the second address information, a first-third protocol address that, in a first scope-specific address space specific to a first region that includes the first node, identifies the third node according to the network protocol, wherein the third node is outside the first region. For example, the arrangement in FIG. 12, includes resolver component 1206 that is operable for and/or otherwise is included in determining, based on the first address information and the second address information, a first-third protocol address that, in a first scope-specific address space specific to a first region that includes the first node, identifies the third node according to the network protocol, wherein the third node is outside the first region.

As described various types of protocol addresses may conform to various schemas defining rules for formatting valid protocol addresses and/or defining vocabularies specifying valid content of a protocol address. Given first address information identifying a first protocol address and second address information identifying a second protocol address as described above with respect to the method illustrated in FIG. 11, a resolver component may determine a scope-specific first-third protocol address based on one or more of a schema of one or more of the first protocol address, a schema of the second protocol address, a schema of the third protocol address, a mapping between two or more of the schemas or portions thereof, relationships between the nodes to which the protocol addresses are specific, relationships between the scope-specific address spaces of the protocol addresses, and/or relationships between the nodes in a network that includes them. Some of the relationships listed may be represented in a network topology of the network. A resolver component may detect some or all of the network topology in determining the first-third protocol address.

A mapping rule may indicate that addresses in a first scope-specific address space have a one-to-one mapping between the first scope-specific address space and a second scope-specific address space that is based on an addend for each of the four portions of the various addresses, additionally taking the modulus of the result based on a maximum value for each address information field, and determining the absolute value to determine the final result. A third protocol address from the second scope-specific address space may serve to identify a third node in a third region. The second protocol address may be represented as, 200.10.150.33. A resolver component in the first node may determine that a third protocol address that, in the first scope-specific address space, identifies the third node may be calculated based on the mapping rule as "(200+30) mod 256.(10+66) mod 256.(150+198) mod 256.(33+254) mod 256", or 230.76.92.31.

Nodes may exchange mapping information. In an aspect, the address information may identify a mapping rule when exchanged between nodes. The mapping rule may be determined by second node and sent to a first node. The mapping rule may include mapping information for mapping addresses from the third scope-specific address space to the first scope-specific address space.

As described above and illustrated in the accompanying drawings, the method illustrated in FIG. 11 may include additional aspects supported by various adaptations and/or analogs of the arrangement of components in FIG. 12. With respect to FIG. 11, in one aspect one or more of the first-third protocol address and the third-first protocol address may identify a third network path for exchanging data between the first node and the third node.

In another aspect, detecting the first address information may include detecting first path information identifying a first network path. The first network path includes a first sequence of nodes included in transmitting data between the first node and the second node. Analogously, detecting the second address information may include detecting second path information identifying a second network path. The second network path includes a second sequence of nodes included in exchanging data between the second node and the third node. One or more of the first-third protocol address and the third-first protocol address may be determined based on the first path information and the second path information. The first-third protocol address and/or the third-first protocol address may identify a third network path including a third sequence of nodes included in communicatively coupling the first node and the third node.

In another aspect of the method illustrated in FIG. 11, the first-second protocol address may be in the first scope-specific address space, the second-first protocol address may be in a second-scope-specific address space specific to a second region that includes the second node, the second-third protocol address may be in the second scope-specific address space, and/or the third-second protocol address may be in the third scope-specific address space. One or more of the scope-specific address spaces may be node-specific address spaces specific to the respective one or more of the first node, the second node, and the third node.

Hop information may be exchanged between a first node in a hop and one or more of a second node in the hop and a third node in the network. A hop may be detected in response to exchanging the hop information. In another aspect, hop information may be exchanged in response to detecting a hop.

Hop information may be received in response to a user input detected by an input device. In an aspect, the hop information may be included in topology information that identifies a network topology or part of a network topology.

A hop including pair of nodes may include a first network interface in a first node in the pair and a second network interface in a second node in the pair.

In another, aspect, a first node may be included in a first hop that includes a second node via a first network interface and the first node may be included in a second hop that includes the second node via a second network interface. The two NICs may be associated with different internet protocol addresses. Data units including one of the IP addresses are processed by one of the NICs and data units including the other IP address are processed by the other NIC.

A first node may be included in a first hop along with a second node. The first node may be included in the first hop via a first network interface in the first node. The first node may be included in a second hop including a third node. The first node may be included in the second hop via a second network interface in the first node.

A first node and a second node may be included in a first hop in a first network path from a source node to a destination node. The first node may be included in the first hop via a first network interface in the first node included in communicatively coupling the first node and the second node. The first node and the second node may be included in a second hop in a second network path from the source node to the destination node. The first node may be included in the second hop via a second network interface in the first node included in communicatively coupling the first node and the second node.

Hop information for a hop may be exchanged in response to detecting a change in a state of an operable coupling between a network and a network interface included in the hop and included in a node in the hop. Detecting the change may include detecting that the state indicates that the operable coupling is inoperative and subsequently detecting that the state indicates the operable coupling is operative. Detecting the change may include detecting that the state indicates that the operable coupling is operative and subsequently detecting that the state indicates the operable coupling is inoperative.

A network protocol may be specified to exchange data between and/or among nodes that include hop agent components to determine whether certain network interfaces in the nodes are operative or inoperative. The protocol may include and/or be an extension of one more existing protocols such as the address resolution protocol (ARP), the dynamic host configuration protocol (DHCP), and/or any of numerous network protocols for announcing and/or detecting the presence of a node, a network interface, and/or other resource on a network. The protocol may be a yet unspecified protocol to count network interfaces in a region of a network.

An interface identifier included in hop information for a hop including a pair of nodes may be specified according to the requirements of a network protocol. The network protocol may be a network layer protocol, such the IPv4 and/or IPv6 protocols. The interface identifier may identify at least one node in a hop to the other. The interface identifier may be suitable to include in a data unit of a network protocol to transmit data in the data unit between the nodes in the hop. Hop information for a hop may be exchanged in more than one communication sent and/or received by a node in the hop.

Determining a hop identifier for a hop may include determining the hop identifier based on an interface identifier that identifies at least one network interface in the hop. The interface identifier may identify at least one of a first network interface in a first node in the hop and a second network interface in a second node in the hop to at least one of the first node and the second node.

A hop identifier for a hop may be based on a first interface identifier that identifies a first network interface in a first node in the hop and/or may be based on a second interface identifier that identifies a second network interface in a second node in the hop. The first interface identifier may identify the first network interface to one or both of the nodes in the hop. The second interface identifier may identify the second network interface to at least one of the first node and the second node. The hop identifier may include the first interface identifier and/or the second interface identifier.

Figure 13:
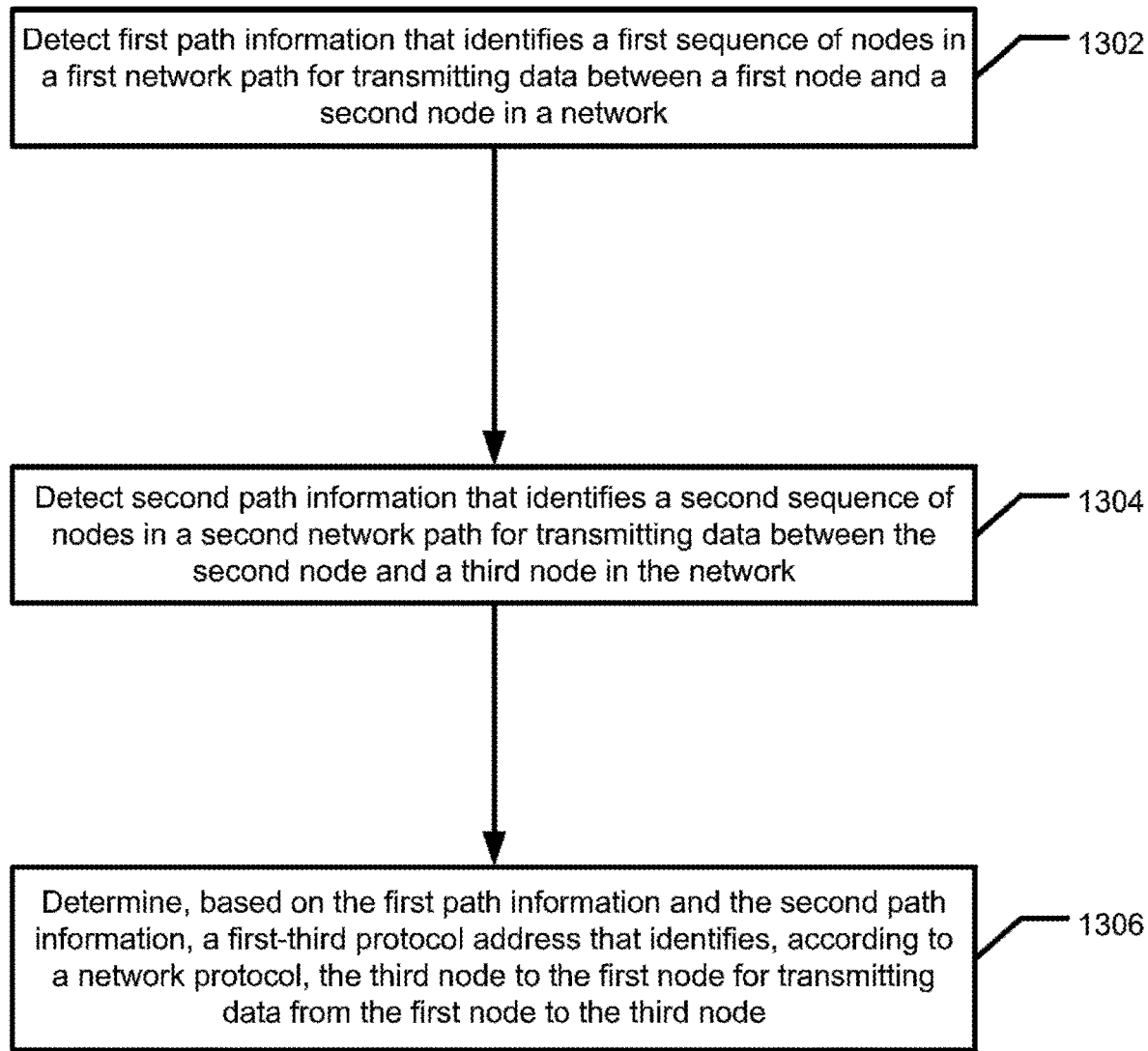
FIG. 13 is a flow diagram illustrating a method for identifying a protocol address based on path information according to an aspect of the subject matter described herein.
Figure 14:
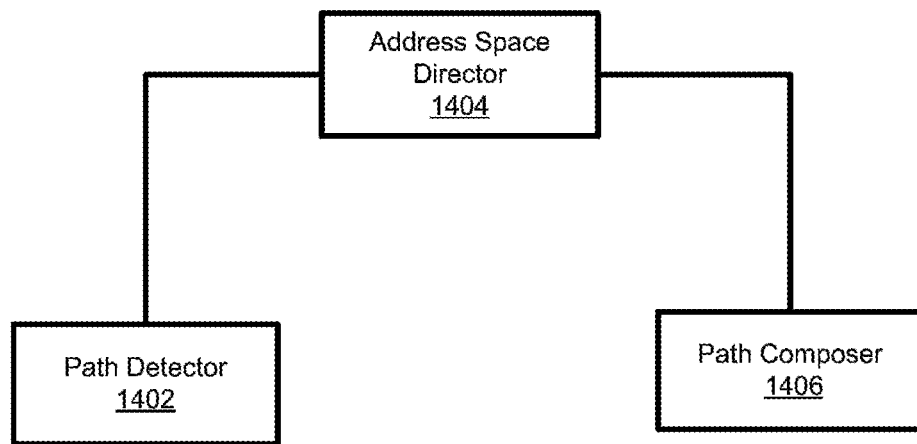
FIG. 14 is a block diagram illustrating an arrangement of components for identifying a protocol address based on path information according to another aspect of the subject matter described herein.

FIG. 14 illustrates an arrangement of components in a system, that operates in an execution environment, such as execution environment 102 in FIG. 1. The arrangement of components in the system operates to perform the method illustrated in FIG. 13. The system illustrated includes a path detector component 1402, an address space director component 1404, and a path composer component 1406. A suitable execution environment includes a processor, such as processor 104, to process an instruction in at least one of the path detector component 1402, the address space director component 1404, and the path composer component 1406.

Some or all of the exemplary components illustrated in FIG. 14, their adaptations, and/or their analogs may operate in a number of execution environments to perform the method illustrated in FIG. 13.

With reference to FIG. 13, block 1302 illustrates that the method includes detecting first path information that identifies a first sequence of nodes in a first network path for transmitting data between a first node and a second node in a network. Accordingly, a system for identifying a protocol address based on path information includes means for detecting first path information that identifies a first sequence of nodes in a first network path for transmitting data between a first node and a second node in a network. For example, in the arrangement in FIG. 14, detecting first path information that identifies a first sequence of nodes in a first network path for transmitting data between a first node and a second node in a network is performed via operation of the path detector component 1402.

Returning to FIG. 13, block 1304 illustrates that the method further includes detecting second path information that identifies a second sequence of nodes in a second network path for transmitting data between the second node and a third node in the network. Accordingly, a system for identifying a protocol address based on path information includes means for detecting second path information that identifies a second sequence of nodes in a second network path for transmitting data between the second node and a third node in the network. For example, as illustrated in FIG. 14, detecting second path information that identifies a second sequence of nodes in a second network path for transmitting data between the second node and a third node in the network is performed via operation of the address space director component 1404.

As described above and further below, path information for a network protocol may be detected in a data unit of the network protocol. The path information may be detected by a node transmitting the data unit and/or may be detected by a node receiving the data unit.

In another aspect, a message may be sent to a network directory service to register a name or symbolic identifier for a node and/or a network interface of a node. The network directory service may associate the symbolic identifier with address information, which as described herein may be path information. Path information may be detected in the registration message and/or in one or more data units of a network protocol for which an association is to be created and/or otherwise maintained by a network directory service. Further, a response to the registration message may be exchanged between the registering node and the network directory service node. The response message and/or one or more data units included in transmitting the response may include and/or otherwise identify path information that may be detected by either node. Nodes in a network path transmitting the response and/or the registration request may detect path information in one or more data units received and/or sent in relaying some or all of one or both messages. Still further, a node may send a symbolic identifier to a network directory service in a resolve message in order to resolve the symbolic identifier to a protocol address of a node and/or a network interface identified by the symbolic identifier. Path information may be detected in the resolve message and/or in one or more data units of a protocol that the symbolic identifier is associated with in an association maintained by a network directory service. Further, a response to the resolve message may be exchanged between the requesting node and the network directory service node. The response message and/or one or more data units included in transmitting the response may include and/or otherwise identify path information that may be detected by either node. Nodes in a network path transmitting the response and/or the registration request may detect path information in one or more data units that they receive and/or send in relaying some or all of one or both messages.

Returning to FIG. 13, block 1306 illustrates that the method yet further includes determining, based on the first path information and the second path information, a first-third protocol address that identifies, according to a network protocol, the third node to the first node for transmitting data from the first node to the third node. Accordingly, a system for identifying a protocol address based on path information includes means for determining, based on the first path information and the second path information, a first-third protocol address that identifies, according to a network protocol, the third node to the first node for transmitting data from the first node to the third node. For example, as illustrated in FIG. 14, determining, based on the first path information and the second path information, a first-third protocol address that identifies, according to a network protocol, the third node to the first node for transmitting data from the first node to the third node is performed via operation of path composer component 1406.

With respect to the method in FIG. 13 and as described above, a first-second protocol address that identifies the second node with respect to the first node may be determined and/or otherwise identified based on the first path information. Alternatively or additionally, a second-first protocol address that identifies the first node with respect to the second node may be determined and/or otherwise identified based on the first path information. Further, a second-third protocol address that identifies the third node with respect to the second node may be determined and/or otherwise identified based on the second path information. Alternatively or additionally, a third-second protocol address that identifies the second node with respect to the third node may be determined and/or otherwise identified based on the second path information. The first-third protocol address may be determined based on at least one of the first-second protocol address and the second-first protocol and based on at least one of the second-third protocol address and the third-second protocol address.

In an aspect of the method illustrated in FIG. 13, the first-third protocol address may be in a first scope-specific identifier space specific to a first network region that includes the first node. Refer to application Ser. No. 13/727,653 filed on 2012 Dec. 27, entitled "Methods, Systems, and Computer Program Products for Identifying a Protocol address in a Scope-specific Address Space".

Figure 15:
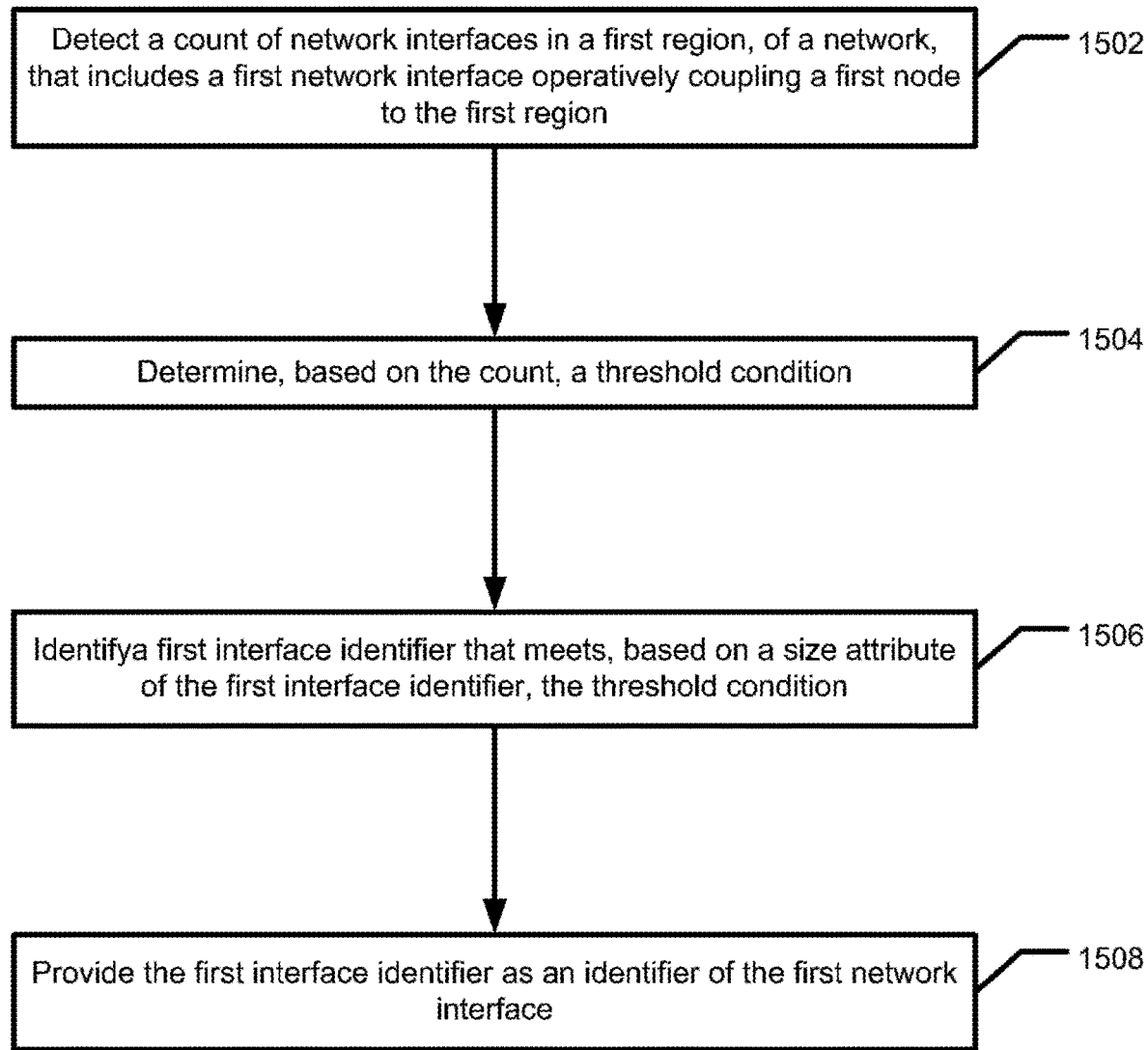
FIG. 15 is a flow diagram illustrating a method for assigning an interface identifier to a network interface according to an aspect of the subject matter described herein.
Figure 16:
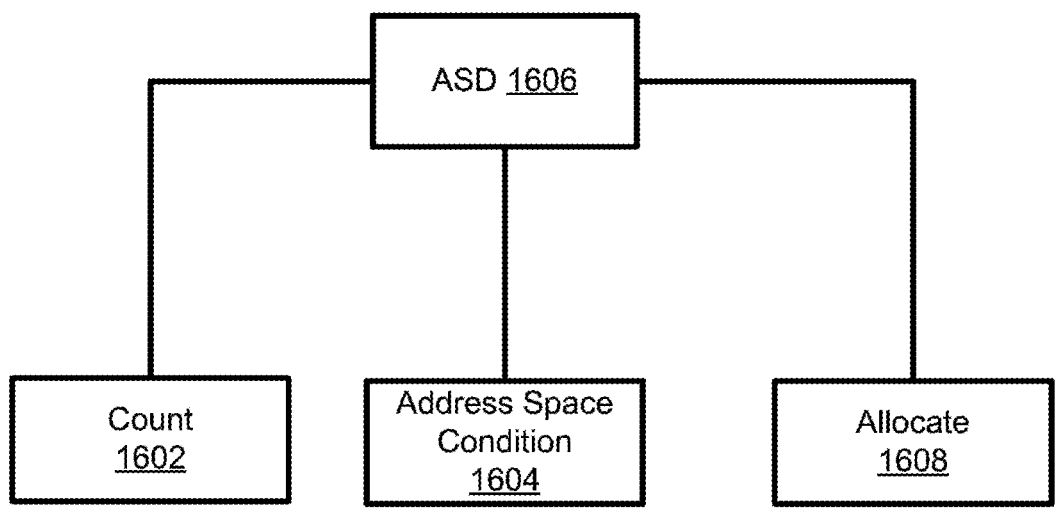
FIG. 16 is a block diagram illustrating an arrangement of components for assigning an interface identifier to a network interface according to another aspect of the subject matter described herein.

FIG. 16 illustrates an arrangement of components in a system that operates in an execution environment, such as execution environment 102 in FIG. 1. The arrangement of components in the system operates to perform the method illustrated in FIG. 15. The system illustrated includes a count component 1602, an address space condition component 1604, an address space director component 1606, and an allocate component 1608. A suitable execution environment includes a processor, such as the processor 104, to process an instruction in at least one of the count component 1602, the address space condition component 1604, the address space director (ASD) component 1606, and the allocate component 1608.

Some or all of the exemplary components illustrated in FIG. 16 may be adapted to perform the method illustrated in FIG. 15 in a number of execution environments.

As the term "network topology" is defined herein, a network may have different network topologies with respect to different layers and/or network protocols and their corresponding protocol endpoints. A network topology may represent physical communicative couplings between nodes in the network. A network topology may represent logical hops in a network. In FIG. 5B, the first network 514b1 may represent a physical topology when the first network 514b1 represents a physical data transmission medium included in physically coupling nodes. The data transmission medium may be an Ethernet LAN, for example. The hops 512 in FIG. 5 may illustrate logical communicative couplings at a level of the network above the data transmission medium. The hops 512 may represent link layer hops, network layer hops, or hops at some other layer of the network above the data transmission medium or physical layer.

With reference to FIG. 15, a block 1502 illustrates that the method includes detecting a count of network interfaces in a first region, of a network, that includes a first network interface operatively coupling a first node to the first region. Accordingly, a system for assigning an interface identifier to a network interface includes means for detecting a count of network interfaces in a first region, of a network, that includes a first network interface operatively coupling a first node to the first region. For example, the arrangement illustrated in FIG. 16, includes count component 1602 operable for and/or otherwise included in detecting a count of network interfaces in a first region, of a network, that includes a first network interface operatively coupling a first node to the first region.

A region may include a single node with one or more network interfaces in the region and with no other network interfaces of other nodes in the region. All of the one or more network interfaces in the node may be in the region. Such a region is illustrated by a first region 510a1 including a source node 502a in FIG. 5A. The first region 510a1 illustrates a region that includes a single node, the source node 502a.

A node may include a network interface included in a region and may include another network interface not in the region. In FIG. 5A, a second path node 504a2 is illustrated having a network interface included in a second region 510a2 and another network interface included in a third region 510a3. A node may have a single network interface in a region and/or multiple network interfaces in a region.

A count or a partial count of network interfaces in a node in a particular region may be detected by a node in the region or by a node in another region. Detecting a count may include receiving count information identifying the count or a portion of the count, in response to a user input detected by an input device via a node. In an aspect, a count of network interfaces and/or of NICs in one or more network interfaces in the source node 502a may be a configuration setting set in response to an input detected from a user via an input device, such as described with respect to FIG. 1.

Detecting a count may include detecting whether network interface components in a region are in the same node. Detecting the count may further include determining that the network interface components are coupled to a same data transmission medium. Whether network interface components in the same node are coupled to a same data transmission medium may affect how network interfaces are counted. The network interface components in the network interface may be assigned the same protocol address for a particular protocol, such a network layer protocol. The internet protocol in the TCP/IP suite is an exemplary network layer protocol. Network interface components assigned the same protocol address may be counted as a single network interface when a count is for a network protocol of the protocol addresses.

In another aspect, multiple network interface components in a node may be operatively coupled to a same data transmission medium and may be included in more than one network interface for counting. Thus a node that includes multiple network interface components coupled to a same data transmission medium, may have a network interface component in the multiple network interface components in one network interface and another network interface component in the multiple network interface components may be included in another network interface.

As described above, detecting a change in a state of an operable coupling may include detecting that the state indicates the coupling is inoperative, and subsequently detecting that the state indicates the coupling is operative. Further, detecting a change in a state of a coupling may include detecting that the state indicates the coupling is operative and subsequently detecting that the state indicates the coupling is inoperative.

A count component may monitor one or more operations included in sending data and/or receiving data via an operable coupling including a network and a network interface. Detecting a change in an operable coupling may include performing an operation to send a data unit and/or to receive a data unit via the coupling, then determining whether the operation was successful.

A count may be based on whether a network interface in a region is in a node that is configured to send and/or receive a data unit of a particular network protocol via the network interface. A count of network interfaces may be performed according to the method illustrated in FIG. 15 for the purpose of assigning an identifier to a network interface for a particular network protocol.

Returning to FIG. 15, a block 1504 illustrates that the method further includes determining, based on the count, a threshold condition. Accordingly, a system for assigning an interface identifier to a network interface includes means for determining, based on the count, a threshold condition. For example, the arrangement illustrated in FIG. 16, includes address space condition component 1604 operable for and/or otherwise included in determining, based on the count, a threshold condition.

Returning to FIG. 15, a block 1506 illustrates that the method yet further includes identifying a first interface identifier that meets, based on a size attribute of the first interface identifier, the threshold condition. Accordingly, a system for assigning an interface identifier to a network interface includes means for identifying a first interface identifier that meets, based on a size attribute of the first interface identifier, the threshold condition. For example, the arrangement illustrated in FIG. 16, includes address space director component 1606 operable for and/or otherwise included in identifying a first interface identifier that meets, based on a size attribute of the first interface identifier, the threshold condition.

Identifying a network interface may include identifying a schema or part of a schema defining a valid format and/or a valid vocabulary for a representation of an interface identifier. Interface identifiers are assigned to network interfaces for a purpose. Interface identifiers may be assigned to network interfaces for routing data, received via a network interface in a node, to another network interface component in the node to relay some or all of data received to another node. Interface identifiers may be included in a protocol address and/or may be included in generating a protocol address for a network protocol as described below. An interface identifier may be included in identifying a network path in a network and/or a hop including a pair of communicatively coupled nodes. As described above interface identifiers may be selected for saving power when processed in performing specific tasks, selected to save storage space, selected to save processing time, and/or selected to save on any number of other costs in performing one or more tasks. A schema may be defined based on one or more tasks and/or purposes associated with processing an interface identifier.

Schemas explicitly and/or implicitly define rules for a valid format of an interface identifier and/or rules defining a vocabulary for defining valid content of a representation of an interface identifier. A rule may define a constraint on the format or structure of an interface identifier and/or a constraint on the content of an interface identifier. Such constraints may specify or otherwise identify threshold conditions. A threshold condition may be specified by and/or otherwise based on a schema defining a valid protocol address to identify a protocol endpoint for a particular network protocol. The threshold condition may be determined based on size information defined by the schema for representing the protocol address in the data unit of the network protocol. The size information may identify at least one of a maximum size and a minimum size for a valid representation, according to the schema, of the protocol address in the data unit.

A count of network interfaces may place a constraint on the minimum size of a representation of an interface identifier that is valid according to a specified schema. A schema may define a format rule and/or a vocabulary rule that may identify a maximum count and/or a minimum count. For example, in a schema that defines and/or otherwise allows an interface identifier to be represented by a number, the number of digits or number of identifiers in a suitable address space must be large enough to accommodate the value of the count detected. In binary, a single network interface may be represented by a single digit or bit. A count of seven network interfaces requires an identifier space that includes at least seven identifiers and at least some identifiers in the space require three digits or bits when represented in a binary or base two numeric representation. A schema may define and/or otherwise may be included in determining a constraint on the number of bits that may be used in representing an interface identifier.

In FIG. 5A, the first region 510$a$1 is illustrated with one network interface. A schema including a rule constraining and/or otherwise allowing identifiers to be represented numerically may be determined by an address space condition component 404$a$ operating in the source node 502$a$ to determine an identifier space that includes at least one identifier.

A threshold condition may be based on size information defined by the schema for representing a protocol address in the valid data unit. The size information may identify at least one of a maximum size and minimum size for a valid representation of a protocol address in a data unit.

Determining an interface identifier space may include determining size information identifying at least one of a maximum size for an interface identifier. The maximum size may be based on the count, for an interface identifier; and determining the threshold condition based on the size information. The maximum size may be based on a schema rule.

Returning to FIG. 15, a block 1508 illustrates that the method yet further includes providing the first interface identifier as an identifier of the first network interface. Accordingly, a system for assigning an interface identifier to a network interface includes means for providing the first interface identifier as an identifier of the first network interface. For example, the arrangement illustrated in FIG. 16, includes allocate component 1608 operable for and/or otherwise included in providing the first interface identifier as an identifier of the first network interface.

An ordering of interface identifiers in an identifier space may be determined based on a metric. The metric may be for measuring of any of various attributes accessible within an execution environment. Examples of metrics for interface identifiers are provided above in describing threshold conditions.

Further, an ordering of interface identifiers may correspond to an ordering of network interfaces. Interface identifiers may be assigned based on the correspondence. In an aspect, interface identifiers may be order based on a size of their respective representations in data units of a network protocol. For example, an interface identifier with the value 1 may be represented by a single bit in a data unit. An identifier with a value of '255' may require 4 bits according to a particular type of representation. Network interfaces in a node may be ordered based on one or more of data units sent and/or received; bytes sent and/or received; types of data transmission media coupled to respective network interface; a measure of congestion; a measure of energy or power utilization; measure of heat; an attribute of specified protocol configured to communicate via the network interfaces; and a role of a next node included in a hop that includes a network interface.

Assigning an interface identifier to a first network interface in a first node may include receiving, via the first network interface, a message, sent via a second network interface in a second node, that includes criterion information to identify and/or assign an interface identifier. A criterion may be based on and/or may identify any of the measures described above. Assigning the interface identifier may further include determining that the first interface identifier meets the criterion. A threshold condition determined by an address space component may be determined based on such a criterion. The first interface identifier may be assigned to the first network interface in response to determining that the criterion is met by the first interface identifier.

In an aspect, a first node may receive data from a second node in a data unit of a network protocol via a first network interface. The first network interface may have an assigned first interface identifier. The data may be received based on a protocol address of the network protocol that includes the first interface identifier. The protocol address may identify a third node. In an aspect, the protocol address may include a second interface identifier. The second interface identifier may be assigned to identify a second network interface in the first node. The first node may transmit the data to the third node via the second network interface identified by the second interface identifier in the protocol address. In another aspect, the protocol address may include a third interface identifier assigned to a third network interface in the third node. The third network interface may be included in communicatively coupling the first node and the third node via the second network interface in the first node. In an aspect, the first node may transmit the data to the third node via the second network interface based on an association between the third interface identifier and the second network interface.

In another aspect, a first node may receive a message via a second network interface in the first node. The message may be from a second node in a network path that includes the second network interface. The message may include and/or may be received in one or more data units that include and/or identify a protocol address of a network protocol of the message or of the data units that include the message. The network protocol includes a first interface identifier assigned to a first network interface in the first node. The first node identifies the first network interface based on the first interface identifier in the protocol address. In response, the first node may send the message to a third node in a network path from the first node, where the network path includes the first network interface. The protocol address may be a valid address according to the network protocol of the third node. Alternatively, the third node may be a node in a network path to a destination node identified by the protocol address.

As described in the previous paragraph, a hop may be assigned an identifier that is shared by the pair of nodes in the hop. In still another aspect, a first-second protocol address may indicate a first ordering of the first interface identifier and the second interface identifier. The first-second protocol address may identify the second node to the first node based on the first ordering. A second-first protocol address may include and/or otherwise indicate a second ordering of the first interface identifier. The second-first protocol address may identify the first node to the second node based on the second ordering.

In an additional aspect, the method illustrated in FIG. 15 may include detecting a portion of a data unit, that is valid according to a network layer protocol, for representing a protocol address. The protocol address may identify a sender and/or a receiver of data included in the data unit. A hop threshold size may be determined for including a representation of a hop identifier in the detected portion. The hop threshold size may be determined based on a size of the hop identifier. A representation of the hop identifier may be stored in a hop location where the hop location has a size that meets a threshold condition based on the hop size.

The method illustrated in FIG. 15 may include additional aspects supported by various adaptations and/or analogs of the arrangement of components in FIG. 16. In an aspect, the method may include determining that a protocol address, that is specified according to a network protocol, includes a first interface identifier assigned to a first network interface. Further, the method may include determining that the protocol address includes an identifier of a second node in a network path that includes the first network interface. Determining that the second node is included in the network path that includes the first network interface may be based on the first interface identifier. The first interface identifier may identify the first network interface to transmit a data unit, of the network protocol, that includes and/or otherwise identifies the protocol address.

In another aspect a count may be detected by a count component based on whether a network interface in the region is in a node configured to at least one of send and receive a data unit specified according to a network protocol.

An address space condition component may determine a threshold condition based on an interface identifier space to identify a protocol endpoint of a network protocol. Determining the threshold condition may include determining, based on the count, a maximum count of interface identifiers in the interface identifier space Further, a threshold condition may be based on a metric to measure an address portion of a data unit, of a network protocol, in a data transmission when transmitted via a data transmission medium. The threshold condition may be based on a metric to measure a size of an interface identifier in a protocol address when stored in the address portion.

In a further aspect identifying an interface identifier may include identifying an interface identifier space based on a threshold condition. The interface identifier interface identifier may be selected from the interface identifier space for assigning to a network interface.

In another aspect a first node may receive data, from a second node via a first network interface, in a data unit including a protocol address, of a protocol endpoint of a network protocol, that includes a first interface identifier of the first network interface. The protocol address may be a valid identifier of a third node that is included in a network path that includes a second network interface in the first node. The first node may send the data to the third node via the second network interface. The protocol address includes a second interface identifier assigned to identify the second network interface.

An interface identifier may be assigned to a first network interface in a first region in a node including a second network interface in a second region of a network. Assigning the first network interface may include determining that the first interface identifier is the smallest available interface identifier.

The invention claimed is:

1. A method comprising:
receiving information that identifies an explicit path from a first node to a second node in a communications network, wherein
the information comprises an identification of a sequence of nodes or links defining the explicit path for a packet to traverse through the communications network;
generating a set of segment identifiers, wherein
the set of segment identifiers encodes the explicit path, each segment identifier within the set of segment identifiers is included in one or more respective segment routing forwarding tables stored at each node along the explicit path, and
generating the set of segment identifiers comprises selecting a segment identifier type from among
a nodal segment identifier type in which a nodal segment identifier is assigned uniquely to a single node within the network, or
an adjacency segment identifier type in which an adjacency segment identifier is assigned to a link between two contiguous nodes; and
storing the set of segment identifiers at the first node, wherein
the first node is configured to add the set of segment identifiers to a header of the packet.

2. The method of claim 1, wherein a first segment identifier of the set of segment identifiers identifies a nodal segment, and the nodal segment comprises a shortest path to a node associated with the nodal segment.

3. The method of claim 2, wherein a second segment identifier of the set of segment identifiers identifies an adjacency segment.

4. The method of claim 1, further comprising: computing a shortest path from the first node to the second node; and comparing an explicit path node identifier with a shortest path node identifier.

5. The method of claim 2, further comprising: determining, for a node along the explicit path, whether the shortest path represented by a nodal segment associated with the node diverges from the explicit path.

6. The method of claim 5, further comprising: selecting, as one of the segment identifiers within the set of segment identifiers, a nodal segment identifier identifying a nodal segment encoding the longest path unambiguously following the explicit path.

7. The method of claim 6, wherein the selecting comprises selecting the nodal segment identifier identifying the nodal segment encoding the longest path starting at the first node, and further comprising: selecting, as an additional one of the segment identifiers within the set of segment identifiers, a nodal segment identifier identifying a nodal segment encoding the longest path starting at the second node and unambiguously following the explicit path.

8. The method of claim 1, further comprising: calculating a number of hops that represents an overlap between the explicit path and a shortest path from the first node to the second node.

9. The method of claim 1, wherein the information further identifies a second explicit path, and the generating comprises generating a second set of segment identifiers, and combining at least a portion of the set of segment identifiers and at least a portion of the second set of segment identifiers to form a combined set of segment identifiers.

10. The method of claim 1, wherein the generating comprises calculating a reverse shortest path from the second node towards the first node.

11. The method of claim 1, wherein the path is specified using a first number of identifiers that is fewer than a second number of identifiers required to specify the path deterministically.

12. The method of claim 1, wherein data is capable of being transmitted by the first node along different ones of a plurality of path segments based on a policy and a current state of a network domain, where a first path segment of the plurality of path segments, via which the data is transmitted from the first node, is not already selected at packet receipt and is therefore selected, in response to the packet receipt, based on the policy and the current state of the network domain, and without control signaling communications with another one or nodes in response to packet receipt.

13. The method of claim 1, wherein a current state of a network domain is not maintained by the first node.

14. The method of claim 1, wherein contents of the header of the packet includes everything necessary for routing data.

15. The method of claim 1, wherein a number of protocols used to transmit data is reduced.

16. The method of claim 1, wherein the set of segment identifiers are generated regardless as to whether one or more of the segment identifiers of the set and one or more segment identifiers of a previous set is identical or not.

17. The method of claim 1, wherein the set of segment identifiers is generated without changing the path.

18. The method of claim 1, wherein the generation of the set of segment identifiers results in a modification of a first segment identifier without changing the path.

19. The method of claim 1, wherein a first virtual identifier space for a first plurality of nodes in a network domain is realized by configuring each node in the first plurality to have a respective identifier space that includes a particular identifier that identifies, for the each node in the first plurality, the first node, where the particular identifier in the respective identifier space for the each node in the first plurality matches the particular identifier in the respective identifier space for every other node in the first plurality.

20. The method of claim 19, wherein the first node is included in the first plurality; and the first virtual identifier space includes the particular identifier that takes the form of a scoped identifier with a scope that spans within the first plurality, and that identifies the first node within a span of the first virtual identifier space.

21. The method of claim 1, wherein an index value and a base value are predetermined by a topology service.

22. The method of claim 1, wherein an index value and a base value are predetermined by a transmitting node, and the set of segment identifiers are generated based on the index value and the base value.

23. The method of claim 1, wherein a first path segment, via which data is transmitted from the first node, is not known when the information is received and therefore determined in response to the receipt thereof.

24. The method of claim 1, wherein a network path segment, via which data is transmitted from the first node, is selected without network-based control signaling after the receipt of the information.

25. The method of claim 1, wherein at least one of:
the segment routing forwarding tables include routing tables;
the segment routing forwarding tables include mapping information;
the segment routing forwarding tables look up tables;
the segment routing forwarding tables correspond with at least one identifier space;
the segment routing forwarding tables correspond with node scope-specific identifier spaces;
the nodal segment identifier type includes a region scoped identifier type;
the nodal segment identifier type includes a region scoped identifier;
the sequence of nodes or links includes the nodes;
the sequence of nodes or links includes the links;
the sequence of nodes or links includes the nodes and the links;
the two contiguous nodes includes two nodes with no intermediate nodes therebetween;
the terms system and first node all do not invoke U.S.C. 112, sixth paragraph;
the generating the set of segment identifiers comprises selecting the segment identifier type from among a closed set including the nodal segment identifier type and the adjacency segment identifier type;
the generating the set of segment identifiers comprises selecting the segment identifier type from among an open set including the nodal segment identifier type and the adjacency segment identifier type;
the generating the set of segment identifiers comprises selecting the segment identifier type from only among the nodal segment identifier type or the adjacency segment identifier type;
the generating the set of segment identifiers comprises selecting the segment identifier type from a set that does not only include the nodal segment identifier type and the adjacency segment identifier type;
the generating the set of segment identifiers comprises selecting another segment identifier type other than the nodal segment identifier type and the adjacency segment identifier type;
the generating the set of segment identifiers comprises: selecting the segment identifier type as the nodal segment identifier type in a first case scenario, selecting the segment identifier type as the adjacency segment identifier type in a second case scenario; selecting another segment identifier type other than the nodal segment identifier type and the adjacency segment identifier type in a third case scenario;
each node is segment routing enabled by being capable of supporting a segment routing protocol;
the first node is segment routing enabled by being capable of storing the set of segment identifiers;
the adjacency segment identifier type includes a node scoped network interface identifier type;
the adjacency segment identifier type includes a node scoped network interface identifier;
the adjacency segment identifier type includes a node scoped network interface of a particular node; or
the adjacency segment identifier type includes a node scoped network interface that identifies a network interface of a node.

26. A system comprising:
a first node configured to
receive information that identifies an explicit path from the first node to a second node in a communications network, wherein
the information comprises an identification of a sequence of nodes or links defining the explicit path for a packet to traverse through the communications network;
generate a set of segment identifiers, wherein
the set of segment identifiers encodes the explicit path,
each segment identifier within the set of segment identifiers is included in one or more respective segment routing forwarding tables stored at each node along the explicit path, and
generating the set of segment identifiers comprises selecting a segment identifier type from among
a nodal segment identifier type in which a nodal segment identifier is assigned uniquely to a single node within the network, or
an adjacency segment identifier type in which an adjacency segment identifier is assigned to a link between two contiguous nodes; and add the set of segment identifiers to a header of the packet.

\* \* \* \* \*